(12) United States Patent
Tanji et al.

(10) Patent No.: US 12,531,088 B2
(45) Date of Patent: Jan. 20, 2026

(54) FLUORINE-CONTAINING ETHER COMPOUND, LUBRICANT FOR MAGNETIC RECORDING MEDIUM, AND MAGNETIC RECORDING MEDIUM

(71) Applicant: Resonac Corporation, Tokyo (JP)

(72) Inventors: Yutaka Tanji, Tokyo (JP); Tsuyoshi Kato, Tokyo (JP); Daisuke Yagyu, Tokyo (JP); Natsumi Yoshimura, Tokyo (JP); Takuma Kuroda, Tokyo (JP); Chizuru Kasahara, Tokyo (JP); Naoya Fukumoto, Tokyo (JP); Ayano Asano, Tokyo (JP)

(73) Assignee: Resonac Corporation, Tokyo (JP)

( * ) Notice: Subject to any disclaimer, the term of this patent is extended or adjusted under 35 U.S.C. 154(b) by 0 days.

(21) Appl. No.: 18/687,629

(22) PCT Filed: Aug. 31, 2022

(86) PCT No.: PCT/JP2022/032804
§ 371 (c)(1),
(2) Date: Feb. 28, 2024

(87) PCT Pub. No.: WO2023/033055
PCT Pub. Date: Mar. 9, 2023

(65) Prior Publication Data
US 2024/0386913 A1 Nov. 21, 2024

(30) Foreign Application Priority Data
Sep. 2, 2021 (JP) .................................. 2021-143417

(51) Int. Cl.
*C10M 107/38* (2006.01)
*C08G 65/331* (2006.01)
(Continued)

(52) U.S. Cl.
CPC ........ *G11B 5/7257* (2020.08); *C08G 65/3312* (2013.01); *C08G 65/3317* (2013.01);
(Continued)

(58) Field of Classification Search
CPC ................ C07C 233/18; C07C 233/25; C07C 235/06; C07C 235/46; C08G 65/3312;
(Continued)

(56) References Cited

U.S. PATENT DOCUMENTS 10,047,317 B2 * 8/2018 Sagata .................... C07C 43/13
10,540,997 B2 1/2020 Yang

FOREIGN PATENT DOCUMENTS

JP 6763980 B2 9/2020
JP 6804981 B2 12/2020
(Continued)

*Primary Examiner* — Holly Rickman
*Assistant Examiner* — Linda N Chau
(74) *Attorney, Agent, or Firm* — Sughrue Mion, PLLC

(57) ABSTRACT

There is provided a fluorine-containing ether compound represented by the following formula: $R^1-R^2-CH_2-R^3$ $[-CH_2-R^4-CH_2R^{3'}]_n-CH_2-R^5-R^6$ (n is 1 or 2; $R^3$ and $R^{3'}$ are a perfluoropolyether chain; $R^4$ is a divalent linking group having one polar group; $R^2$ and $R^5$ are a divalent linking group having one or more polar groups; $R^2$ has an oxygen atom at an end that is bonded to $R^1$; $R^5$ has an oxygen atom at an end that is bonded to $R^6$; $R^1$ and $R^6$ in end group bonded to an oxygen atom at an end of $R^2$ or $R^5$; and $R^1$ and $R^6$ are an organic group having 1 to 50 carbon atoms, and at least one of them is a group in which a carbonyl carbon atom or nitrogen atom constituting an amide bond is bonded to a carbon atom of an organic group having 1 to 8 carbon atoms).

17 Claims, 1 Drawing Sheet

(51) Int. Cl.
   *C08G 65/333* (2006.01)
   *C10M 107/42* (2006.01)
   *G11B 5/725* (2006.01)
   *C10N 20/04* (2006.01)
   *C10N 40/18* (2006.01)

(52) U.S. Cl.
   CPC ............ *C08G 65/3318* (2013.01); *C08G 65/33396* (2013.01); *C10M 107/38* (2013.01); *C10M 107/42* (2013.01); *C10M 2213/0623* (2013.01); *C10M 2217/065* (2013.01); *C10N 2020/04* (2013.01); *C10N 2040/18* (2013.01)

(58) Field of Classification Search
   CPC ............ C08G 65/3317; C08G 65/3318; C08G 65/33396; C10M 107/38; C10M 107/42; C10M 2213/0623; C10M 2217/065; C10N 2020/04; C10N 2040/18; G11B 5/7257; H01F 10/14; H01F 10/16
   See application file for complete search history.

(56) References Cited

FOREIGN PATENT DOCUMENTS

| WO | 2017/154403 A1 | 9/2017 |
| WO | 2019/039265 A1 | 2/2019 |

\* cited by examiner

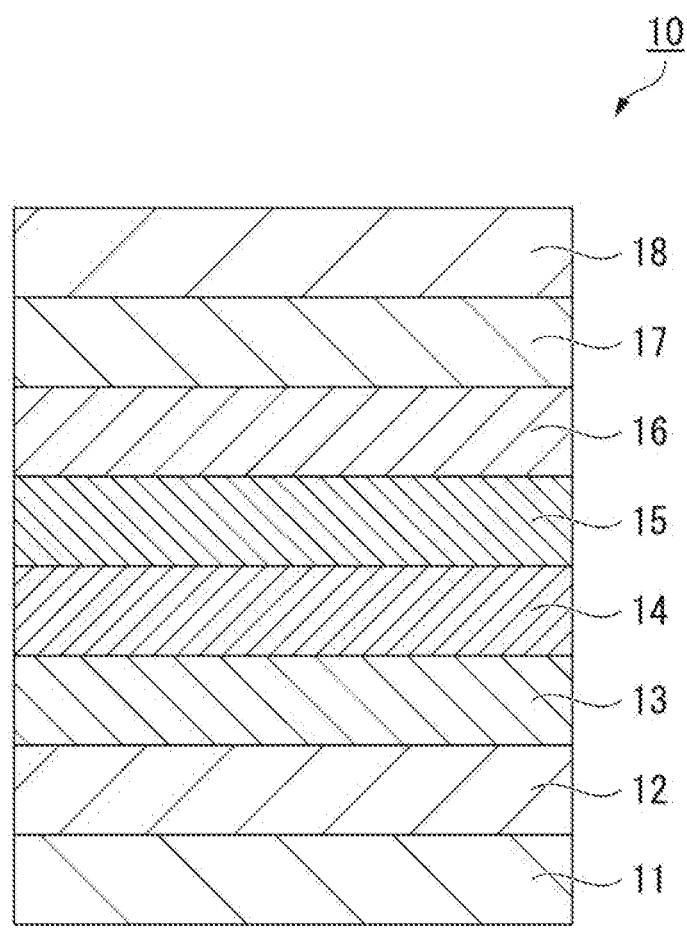

FLUORINE-CONTAINING ETHER COMPOUND, LUBRICANT FOR MAGNETIC RECORDING MEDIUM, AND MAGNETIC RECORDING MEDIUM

TECHNICAL FIELD

The present invention relates to a fluorine-containing ether compound, a lubricant for a magnetic recording medium, and a magnetic recording medium.

This application is a National Stage of International Application No. PCT/JP2022/032804 filed on Aug. 31, 2022, claiming priority based on Japanese Patent Application No. 2021-143417, filed Sep. 2, 2021, the content of which is incorporated herein by reference.

BACKGROUND ART

The development of magnetic recording media suitable for high recording densities has progressed in order to improve the recording densities of magnetic recording and reproducing devices.

In the related art, there is a magnetic recording medium in which a recording layer is formed on a substrate and a protective layer made of carbon or the like is formed on the recording layer. The protective layer protects information recorded in the recording layer and enhances the slidability of a magnetic head. However, sufficient durability of the magnetic recording medium cannot be obtained by simply providing the protective layer on the recording layer. Therefore, generally, a lubricant is applied to the surface of the protective layer to form a lubricating layer.

As a lubricant used when the lubricating layer of the magnetic recording medium is formed, for example, one containing a compound having a polar group such as a hydroxyl group and an amino group at an end of a fluorine polymer having a repeating structure containing —$CF_2$— has been proposed.

For example, Patent Document 1 and Patent Document 2 disclose a fluoropolyether compound in which a perfluoropolyether is bonded to both sides of an aliphatic hydrocarbon chain having a hydroxyl group present in the center of a molecule.

In addition, Patent Document 3 discloses a fluoropolyether compound in which a plurality of perfluoropolyether groups are linked by an aliphatic hydrocarbon group having a hydroxyl group.

In addition, Patent Document 4 discloses a fluorine-containing ether compound in which a divalent linking group having a polar group is linked to both ends of a perfluoropolyether chain, and an end group in which one or more hydrogen atoms of a chain organic group having 1 to 8 carbon atoms are substituted with a group having an amide bond is bonded to at least one of them.

CITATION LIST

Patent Documents

Patent Document 1
U.S. Pat. No. 10,540,997
Patent Document 2
Japanese Patent No. 6804981
Patent Document 3
Japanese Patent No. 6763980
Patent Document 4
PCT International Publication No. WO 2019/039265
Patent Document 5
PCT International Publication No. WO 2017/154403

SUMMARY OF INVENTION

Technical Problem

In a magnetic recording and reproducing device, it is required to further reduce a floating height of the magnetic head. Therefore, it is required to further reduce the thickness of the lubricating layer in a magnetic recording medium.

However, generally, when the thickness of the lubricating layer is reduced, the chemical substance resistance and wear resistance of the magnetic recording medium tend to be lowered. In addition, when the thickness of the lubricating layer is reduced, the corrosion resistance of the magnetic recording medium may become insufficient. For this reason, there is a need for a lubricating layer that has excellent chemical substance resistance and wear resistance and a strong effect of inhibiting corrosion of the magnetic recording medium.

The present invention has been made in view of the above circumstances, and an object of the present invention is to provide a fluorine-containing ether compound which can form a lubricating layer having excellent chemical substance resistance and wear resistance and a strong effect of inhibiting corrosion of a magnetic recording medium and can be suitably used as a material for a lubricant for a magnetic recording medium.

In addition, an object of the present invention is to provide a lubricant for a magnetic recording medium which contains the fluorine-containing ether compound of the present invention and allows a lubricating layer having favorable chemical substance resistance and wear resistance and excellent corrosion resistance to be formed.

In addition, an object of the present invention is to provide a magnetic recording medium having a lubricating layer containing the fluorine-containing ether compound of the present invention and having favorable chemical substance resistance and wear resistance and excellent corrosion resistance.

Solution to Problem

The present invention includes the following aspect.
A first aspect of the present invention provides the following fluorine-containing ether compound.
[1] A fluorine-containing ether compound represented by the following Formula (1):

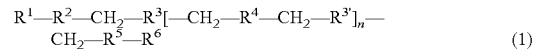

(1)

(in Formula (1), n is 1 or 2; $R^3$ and $R^{3'}$ are a perfluoropolyether chain; some or all of $R^3$ and one or two $R^{3'}$'s may be the same, or all of them may be different from each other; $R^4$ is a divalent linking group having one polar group; when n is 2, two $R^4$'s may be the same as or different front each other; $R^2$ and $R^5$ are a divalent linking group having one or more polar groups, and may be the same as or different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom at an end of $R^2$ or $R^5$, and may be the same as or different from each other; and $R^1$ and $R^6$ are an organic group having 1 to 50 carbon atoms, and at least one of them is a group in which a carbonyl carbon atom or nitrogen atom constituting an amide bond is bonded to a carbon atom of an organic group having 1 to 8 carbon atoms).

The fluorine-containing ether compound according to the first aspect of the present invention preferably has characteristics described in the following [2] to [11]. It is also preferable to arbitrarily combine two or more characteristics described in the following [2] to [11].

[2] The fluorine-containing ether compound according to [1],
wherein at least one of $R^1$ and $R^6$ in Formula (1) is a group in which a carbonyl carbon atom or nitrogen atom constituting an amide bond is bonded to a carbon atom of a phenyl group or an alkyl group having 1 to 6 carbon atoms.

[3] The fluorine-containing ether compound according to [1] or [2],
wherein the polar groups of $R^2$, $R^4$, and $R^5$ in Formula (1) are all hydroxyl groups.

[4] The fluorine-containing ether compound according to [3],
wherein a total number of hydroxyl groups of $R^2$ and hydroxyl groups of $R^5$ in Formula (1) is 2 to 6.

[5] The fluorine-containing ether compound according to any one of [1] to [4],
wherein $R^1$ and $R^6$ in Formula (1) are a group in which a carbonyl carbon atom or nitrogen atom constituting an amide bond is bonded to a carbon atom of a phenyl group or an alkyl group having 1 to 6 carbon atoms.

[6] The fluorine-containing ether compound according to any one of [1] to [5],
wherein $R^2$ in Formula (1) is a linking group represented by the following Formula (2-1) or (2-2), and
wherein $R^5$ in Formula (1) is a linking group represented by the following Formula (2-3) or (2-4):

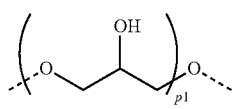

(2-1)

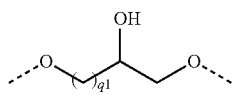

(2-2)

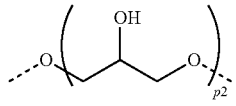

(2-3)

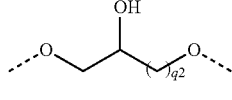

(2-4)

(in Formula (2-1), p1 represents an integer of 1 to 3)
(in Formula (2-2), q1 represents and integer of 2 to 4)
(in Formula (2-3), p2 represents an integer of 1 to 3)
(in Formula (2-4), q2 represents an integer of 2 to 4)

[7] The fluorine-containing ether compound according to any one of [1] to [6],
wherein $R^3$ and one or two $R^{3'}$'s in Formula (1) are all the same, and $R^1$—$R^2$— and $R^6$—$R^5$— are the

[8] The fluorine ether compound according to any one of [1] to [7],
wherein in Formula (3-1) is a link group represented by any of the following Formulae (3-1) to (3-3);

(3-1)

(3-2)

(3-3)

(in Formula (3-2), r is an integer of 2 to 4)
(in Formula (3-3), s is an integer of 2 to 4).

[9] The fluorine-containing ether compound according to any one of [1] to [8],
wherein $R^3$ and one or two $R^{3'}$'s in Formula (1) each independently represent a perfluoropolyether chain represented by the following Formula (4);

(4)

(in Formula (4), w2, w3, w4, and w5 indicate an average degree of polymerization, and each independently represent 0 to 20, provided that w2, w3, w4, and w5 are not all 0 at the same time; w1 and w6 are an average value indicating the number of $CF_2$'s, and each independently represent 1 to 3; and an arrangement order of repeating units in Formula (4) is not particularly limited).

[10] The fluorine-containing ether compound according to any one of [1] to [9],
wherein $R^3$ and one or two $R^{3'}$'s in Formula (1) are each independently any one selected from among perfluoropolyether chains represented by the following Formulae (4-1) to (4-4):

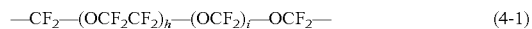

(4-1)

(in Formula (4-1), h and i indicate an average degree of polymerization, h represents 1 to 20, and i represents 0 to 20)

(4-2)

(in Formula (4-2), j indicates an average degree of polymerization, and represents 1 to 15)

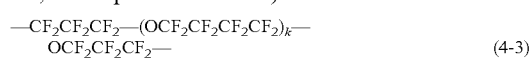

(4-3)

(in Formula (4-3), k indicates an average degree of polymerization, and represents 1 to 10)

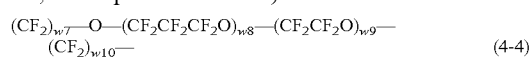

(4-4)

(in Formula (4-4), w8 and w9 indicate an average degree of polymerization, and each independently represent 1 to 20; and w7 and w10 are an average value indicating the number of $CF_2$'s, and each independently represent 1 to 2).

[11] The fluorine-containing ether compound according to any one of [1] to [10],
wherein a number-average molecular weight thereof is in a range of 500 to 10,000.

A second aspect of the present invention provides the following lubricant for a magnetic recording medium.

[12] A lubricant for a magnetic recording medium including the fluorine-containing ether compound according to any one of [1] to [11].

A third aspect of the present invention provides the following magnetic recording medium.

[13] A magnetic recording medium in which at least a magnetic layer, a protective layer, and a lubricating layer are sequentially provided on a substrate.
wherein the lubricating layer contains the fluorine-containing ether compound according to any one of [1] to [11].

The magnetic recording medium according to the third aspect of the present invention preferably has characteristics described in the following [14].

[14] The magnetic recording medium according to [13], wherein the lubricating layer has an average film thickness of 0.5 am to 2.0 mm.

Advantageous Effects of Invention

The fluorine-containing ether compound of the present invention is a compound represented by Formula (1), and is suitable as a material for the lubricant for a magnetic recording medium.

Since the lubricant for a magnetic recording medium of the present invention contains the fluorine-containing ether compound of the present invention, it is possible to form a lubricating layer having favorable chemical substance resistance and wear resistance and a strong effect of inhibiting corrosion of the magnetic recording medium.

The magnetic recording medium of the present invention has a lubricating layer containing the fluorine-containing ether compound of the present invention. Therefore, the magnetic recording medium of the present invention has favorable chemical substance resistance and wear resistance, excellent corrosion resistance, and excellent reliability and durability. In addition, the lubricating layer of the magnetic recording medium of the present invention has favorable chemical substance resistance and wear resistance and a strong effect of inhibiting corrosion of the magnetic recording medium, and thus, the thickness can be reduced.

BRIEF DESCRIPTION OF DRAWINGS

The FIGURE is a schematic cross-sectional view showing one preferable embodiment of a magnetic recording medium of the present invention.

DESCRIPTION OF EMBODIMENTS

In order to achieve the above objects, the inventors conducted extensive studies as follows.

In the related art, as a material for a lubricant for a magnetic recording medium (hereinafter abbreviated as a "lubricant" in some cases) applied to the surface of a protective layer, a fluorine-containing ether compound having a polar group such as a hydroxyl group at an end of a chain structure is preferably used. The polar group in the fluorine-containing ether compound binds to an active site on the protective layer and improves the adhesion of the lubricating layer to the protective layer. For this reason, as a material of the lubricant, a fluorine-containing ether compound having a polar group not only at an end of a chain structure but also in the chain structure is particularly preferably used.

However, when a thin lubricating layer is formed on a protective layer using a conventional lubricant, as shown below, it is difficult to realize a lubricating layer having favorable chemical substance resistance and wear resistance and excellent corrosion resistance.

That is, when the adhesion of the lubricant to the protective layer is insufficient, the lubricant applied onto the protective layer becomes bulky. Therefore, the coating of the lubricating layer with respect to the protective layer tends to be non-uniform. When the coating of the lubricating layer is non-uniform, the chemical substance resistance and corrosion resistance of the lubricating layer become insufficient. Therefore, when the adhesion of the lubricating layer is insufficient, sufficient chemical substance resistance and corrosion resistance cannot be obtained unless the film thickness is increased to make the coating of the lubricating layer uniform with respect to the protective layer.

Regarding a method of improving the adhesion of the lubricant to the protective layer, it is conceivable to use a fluorine-containing ether compound in which polar groups are bonded to a terminal end carbon atom at both ends of a chain structure, a carbon atom bonded to the terminal end carbon atom, and other carbon atoms in the chain structure as a material for a lubricant.

However, in the lubricating layer formed using such a fluorine-containing ether compound, since the adhesion to the protective layer is too strong, the lubricity may be impaired, and the wear resistance may be insufficient.

In addition, in the lubricating layer formed using such a fluorine-containing ether compound, the hydrophilicity of the lubricant is too high, which allows water to easily enter, and the corrosion of the magnetic recording medium has sometimes been observed.

The adhesion of the lubricant to the protective layer can be adjusted, for example, by changing a thermal treatment temperature in a thermal treatment that is performed as necessary after a lubricant containing a fluorine-containing ether compound is applied onto a protective layer. Specifically, the adhesion of the lubricant to the protective layer becomes stronger when the thermal treatment temperature is raised and becomes weaker when the thermal treatment temperature is lowered.

Therefore, when the adhesion of the lubricant to the protective layer is too strong, the adhesion between the lubricating layer and the protective layer is weakened using a method of lowering the thermal treatment temperature or the like, the adhesion between the lubricating layer and the protective layer is set to have an appropriate strength, and thus, the wear resistance of the lubricating layer can be improved, However, in a lubricating layer formed using a fluorine-containing ether compound in which polar groups are bonded to a terminal end carbon atom at both ends of a chain structure, a carbon atom bonded to the terminal end carbon atom, and other carbon atoms in the chain structure, when the adhesion to the protective layer is weakened by using the above method or the like, the chemical substance resistance and corrosion resistance of the lubricating layer deteriorate. This is presumed to be because the proportion of polar groups that are not involved in binding to the active sites on the protective layer among polar groups in the fluorine-containing ether compound increases. That is, this is presumed to be because polar groups in the fluorine-containing ether compound that are not involved in binding to the active sites on the protective layer attract environmental substances and water that produce contamination substances and water that causes corrosion of the magnetic recording medium to the lubricating layer, and deteriorate the chemical substance resistance of the lubricating layer and the corrosion resistance of the magnetic recording medium, Thus, the inventors have focused on binding between polar groups contained in the fluorine-containing ether compound and the active sites on the protective layer. Therefore, they conducted extensive studies in order to realize a fluorine-containing ether compound in which polar groups that are not involved in binding to the active sites on the protective layer are unlikely to occur and which can form a lubricating layer that has uniform coating and excellent adhesion with respect to the protective layer, favorable chemical substance resistance and wear resistance, and an excellent effect of inhibiting corrosion of the magnetic recording medium.

As a result, they found that a fluorine-containing ether compound is preferable which has a skeleton in which a plurality of perfluoropolyether chains are bonded via a linking group having one polar group, a divalent linking group having a polar group and an end group which is an organic group having 1 to 50 carbon atoms are bonded in that order to both sides of the skeleton via a methylene group (—$CH_2$—), and at least one of the end groups is a group in which a carbonyl carbon atom or nitrogen atom constituting an amide bond is bonded to a carbon atom of an organic group having 1 to 8 carbon atoms.

In such a fluorine-containing ether compound, for the following reasons, polar groups that are not bonded to a plurality of functional groups (active sites) present on the protective layer are less likely to occur. In addition, in such a fluorine-containing ether compound, for the following reasons, the amide contained in at least one of the end groups and the polar group of the divalent linking group each independently exhibit a favorable interaction with the protective layer, and each of them can be independently bonded to a plurality of functional groups (active sites) present on the protective layer. Accordingly, it is presumed that the fluorine-containing ether compound can form a lubricating layer having favorable adhesion to the protective layer and can form a lubricating layer having favorable chemical substance resistance and wear resistance and a strong effect of inhibiting corrosion of the magnetic recording medium.

That is, in the fluorine-containing ether compound, at least one end group thereof contains an amide bond. It is difficult for the bond of the carbon atom, which is adjacent to a carbonyl carbon atom or nitrogen atom constituting an amide bond of the end group, to rotate freely. Therefore, it is difficult to cause the interaction between the amide contained in at least one of the end groups and the polar group of the divalent linking group in the fluorine-containing ether compound. Therefore, the amide contained in at least one of the end groups of the fluorine-containing ether compound and the polar group of the divalent linking group have a very low ability to inhibit each other their interaction with the protective layer.

In addition, in the fluorine-containing ether compound, a perfluoropolyether chain is arranged between divalent linking groups in the fluorine-containing ether compound. Therefore, the distance between polar groups of adjacent divalent linking groups is appropriate. In addition, at least one end group is an organic group having an amide bond for which it is difficult to rotate freely. For these reasons, polar groups of the divalent linking groups in the fluorine-containing ether compound are less likely to be inhibited from binding to the active sites on the protective layer by the amide contained in at least one end group or the polar groups of adjacent divalent linking groups.

Therefore, in the fluorine-containing ether compound, the amide contained in at least one of the end groups and the polar group of the divalent linking group do not inhibit binding with the active sites on the protective layer, but are likely to be involved in binding with the active sites on the protective layer. As a result, polar groups that do not bond to the active site on the protective layer are less likely to occur, and the number of polar groups that are not involved in binding to the active site on the protective layer is minimized. Therefore, in the fluorine-containing ether compound, the amide contained in at least one of the end groups and the polar group of the divalent linking group are less likely to inhibit binding to the active sites on the protective layer, and thus, each independently exhibits a favorable interaction with the protective layer. As a result, the amide contained in at least one of the end groups and the polar group of the divalent linking group each can be independently bonded to the functional groups (active sites) present on the protective layer.

In addition, in the fluorine-containing ether compound described above, since the distance between polar groups of the divalent linking groups is appropriate, the polar groups of the divalent linking group are less likely to aggregate with each other. Furthermore, both ends of each perfluoropolyether chain are brought into close contact with the protective layer by the polar group of the divalent linking group. Therefore, the fluorine-containing ether compound applied onto the protective layer is unlikely to be bulky, the fluorine-containing ether compound easily wets and spreads on the protective layer, and a lubricating layer having a uniform coating state is easily obtained. Accordingly, it is presumed that the fluorine-containing ether compound can have favorable chemical substance resistance and wear resistance, and can form a lubricating layer having a strong effect of inhibiting corrosion of the magnetic recording medium.

In addition, the inventors confirmed that, when a lubricant containing the fluorine-containing ether compound is used, it is possible to form a lubricating layer having favorable chemical substance resistance and wear resistance and excellent corrosion resistance, and completed the present invention.

Hereinafter, examples of the fluorine-containing ether compound, the lubricant for a magnetic recording medium, and the magnetic recording medium of the present invention will be described in detail. Here, the present invention is not limited to only the following embodiments. In the present invention, numbers, amounts, ratios, materials, configurations, and the like can be added, omitted, substituted, and changed without departing from the gist and scope of the present invention.

[Fluorine-Containing Ether Compound]

A fluorine-containing ether compound represented by the following Formula (1):

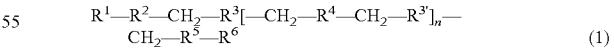

(1)

(in Formula (1), n is 1 or 2; $R^3$ and $R^{3'}$ are a perfluoropolyether chain; some or all of $R^3$ and one or two $R^{3'}$'s may be the same, or all of them may be different from each other; $R^4$ is a divalent linking group having one polar group; when n is 2, two $R^4$'s may be the same as or different from each other; $R^2$ and $R^5$ are a divalent linking group having one or more polar groups, and may be the same as or different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom at an end of $R^2$ or $R^5$, and may be the same as or different from each other; and $R^1$ and $R^6$ are an organic group having 1 to 50 carbon atoms, and at least one of them is a group in which a carbonyl carbon atom or nitrogen atom constituting an amide bond is bonded to a carbon atom of an organic group having 1 to 8 carbon atoms).

As shown in Formula (1), the fluorine-containing ether compound of the present embodiment has a skeleton in which a plurality of perfluoropolyether chains represented by $R^3$ and $R^{3'}$ (hereinafter referred to as a "PFPE chain" in some cases) are linked via a linking structure in which a methylene group, a divalent linking group having one polar group represented by $R^4$, and a methylene group are bonded in that order. On both sides of the skeleton, a methylene group, divalent linking groups having one or more polar groups represented by $R^2$ and $R^5$, and end groups represented by $R^1$ and $R^6$ are bonded in that order. In addition, at least one end group represented by $R^1$ and $R^6$ is a group in which a carbonyl carbon atom or nitrogen atom constituting an amide bond is bonded to a carbon atom of an organic group having 1 to 8 carbon atoms (hereinafter referred to as an "end group having an amide bond" in some cases).

In the fluorine-containing ether compound of the present embodiment, the number n of $[-CH_2-R^4-CH_2-R^{3'}]$'s, which is a repeating unit in Formula (1), is 1 or 2. When n is 1, the compound has a skeleton in which two PEPE chains represented by $R^3$ and $R^{3'}$ are arranged on both sides of a divalent linking group which has one polar group and is represented by $R^4$ as a center, via a methylene group. Therefore, the fluorine-containing ether compound is preferable because it uniformly easily wets and spreads on the protective layer and can easily form a lubricating layer having a uniform film thickness. When n is 2, the compound has a skeleton in which a linking group represented by $R^4$ and a PEPE chain ($R^3$ or $R^{3'}$) are arranged on both sides of $R^{3'}$ as a center. Therefore, the fluorine-containing ether compound is preferable because it can easily wet and spread uniformly on the protective layer and can easily form a lubricating layer having a uniform film thickness. n can be appropriately determined depending on applications of the fluorine-containing ether compound and the like.

(Divalent Linking Group Represented by $R^4$)

In the fluorine-containing ether compound represented by Formula (1), $R^4$ is a divalent linking group having one polar group. $R^4$ is respectively arranged between the PEPE chains represented by $R^3$ and one or two $R^{3'}$'s. Due to the structure, $R^4$ brings the fluorine-containing ether compound and the protective layer into close contact with each other, and a thin lubricating layer is formed at a sufficient coating rate.

When the number n of $[-CH_2-R^4-CH_2-R^{3'}]$'s, which is a repeating unit in Formula (1), is 2, two $R^4$'s may be the same as or different from each other. When two $R^4$'s are the same, the coating of the fluorine containing ether compound with respect to the protective layer becomes more uniform, and a lubricating layer having better adhesion can be formed.

In this specification, "two $R^4$'s are the same" means that, atoms contained in two $R^4$'s are arranged symmetrically with respect to, among two $R^{3'}$'s of the fluorine-containing ether compound, the RE arranged at the center of the fluorine-containing ether compound represented by Formula (1).

The divalent linking group represented by $R^4$ preferably has oxygen atoms arranged at both ends thereof. The oxygen atoms arranged at both ends of the linking group form an ether bond (—O—) with a methylene group (—$CH_2$—) arranged on both sides of $R^4$. These two ether bonds impart appropriate flexibility to the fluorine-containing ether com-
pound represented by Formula (1) and increase the affinity between the polar group of the divalent linking group represented by $R^4$ and the protective layer.

The divalent linking group represented by $R^4$ is preferably a group in which one polar group is bonded to a carbon atom of an alkylene group having 3 to 6 carbon atoms, and both ends are oxygen atoms. The alkylene group having 3 to 6 carbon atoms is preferably an alkylene group having 3 to 4 carbon atoms. The alkylene group having 3 to 6 carbon atoms preferably has a linear structure. In R$, it is particularly preferable that a polar group be bonded to a carbon atom arranged near the center of a linear alkylene group having 3 to 6 carbon atoms. This is because the coating of the fluorine-containing ether compound with respect to the protective layer becomes more uniform, and a lubricating layer having better adhesion is formed.

Examples of polar groups of R$ include a hydroxyl group (—OH), an amino group (—$NH_2$), a carboxyl group (—COOH), an aldehyde group (—COH), a carbonyl group (—CO—), and a sulfonic acid group (—$SO_3H$). Among these, particularly, the polar group is preferably a hydroxyl group. The hydroxyl group has a strong interaction with the protective layer, particularly the protective layer formed of a carbon-based material. Therefore, when the polar group of $R^1$ is a hydroxyl group, the lubricating layer containing the fluorine-containing ether compound has higher adhesion to the protective layer. When n is 2, among the polar groups that each of two $R^4$'s has, at least one polar group is preferably a hydroxyl group, and both polar groups are more preferably hydroxyl groups.

In the fluorine-containing ether compound represented by Formula (1), since $R^4$ is a divalent linking group having one polar group, for example, compared to a fluorine-containing ether compound having a divalent linking group having two or more polar groups instead of $R^4$, the lubricating layer containing this compound has a sufficient effect of inhibiting corrosion of the magnetic recording medium. This is because the hydrophilicity of the fluorine-containing ether compound is not too high, and the lubricating layer containing this compound can prevent intrusion of water, which causes corrosion of the magnetic recording medium.

Specifically, $R^4$ is preferably any of the following Formulae (3-1) to (3-3). In Formulae (3-1) to (3-3), the oxygen atom thereof which is located on the left side is bonded to a methylene group which is located on the side of $R^2$ among two methylene groups which are bonded to $R^4$, and the oxygen atom thereof which is located on the right side is bonded to a methylene group which is located on the side of $R^5$.

When $R^4$ is any of Formulae (3-1) to (3-3), this is preferable because the fluorine-containing ether compound represented by Formula (1) is easily synthesized. Particularly, when $R^4$ is Formula (3-1), this is preferable because the fluorine-containing ether compound represented by Formula (1) is more easily synthesized.

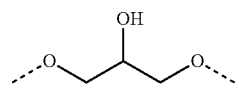

(3-1)

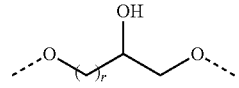

(3-2)

-continued

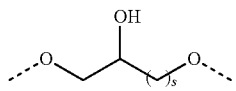
(3-3)

(in Formula (3-2), r is an integer of 2 to 4)
(in Formula (3-3), s is an integer of 2 to 4)

In Formula (3-2), r is an integer of 2 to 4, preferably an integer of 2 to 3, and more preferably 2. This is because the coating of the fluorine-containing ether compound with respect to the protective layer becomes more uniform, and a lubricating layer having better adhesion is formed.

In Formula (3-3), s is an integer of 2 to 4, preferably an integer of 2 to 3, and more preferably 2. This is because the coating of the fluorine-containing ether compound with respect to the protective layer becomes more uniform, and a lubricating layer having better adhesion is formed.

The linking group represented by Formula (3-2) or (3-3) has a stricture in which 1 to 3 methylene groups are added to a glycerin skeleton ($-OCH_2CH(OH)CH_2O-$). Therefore, the lubricating layer containing the fluorine-containing ether compound in which $R^4$ is Formula (3-2) or (3-3) has favorable hydrophobicity. As a result, the lubricating layer can effectively prevent intrusion of water, which causes corrosion of the magnetic recording medium, and can have a strong effect of inhibiting corrosion of the magnetic recording medium.

(PFPE Chains Represented by $R^3$ and $R^{3'}$)

In the fluorine-containing ether compound represented by Formula (1), $R^3$ and $R^{3'}$ are a perfluoropolyether chain. When the lubricant containing the fluorine-containing ether compound of the present embodiment is applied onto a protective layer and a lubricating layer is formed, the PEPE chains represented by $R^3$ and $R^{3'}$ cover the surface of the protective layer, impart lubricity to the lubricating layer, and reduce a frictional force between the magnetic head and the protective layer. The PEPE chains represented by $R^3$ and $R^{3'}$ are appropriately selected depending on the performance required for the lubricant containing the fluorine-containing ether compound and the like.

Some of all of $R^3$ and one or two $R^{3'}$'s may be the same, or all of them may be different from each other. Preferably, $R^3$ and one or two $R^{3'}$'s are all the same. This is because the coating of the fluorine-containing ether compound with respect to the protective layer becomes more uniform, and a lubricating layer having better adhesion is formed. A case in which $R^3$ and one or two $R^{3'}$'s are the same also includes a case in which structures of repeating units of PEPE chains are the same, but average degrees of polymerization are different.

Examples of PEPE chains represented by $R^3$ and $R^{3'}$ include those composed of perfluoroalkylene oxide polymers or copolymers. Examples of perfluoroalkylene oxides include perfluoromethylene oxide, perfluoroethylene oxide, perfluoro-n-propylene oxide, and perfluorobutylene oxide.

$R^3$ and one or two $R^{3'}$'s in Formula (1) are preferably, for example, a PFPE chain represented by the following Formula (4), which is derived from a perfluoroalkylene oxide polymer or copolymer.

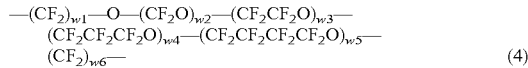
(4)

(in Formula (4), w2, w3, w4, and w5 indicate an average degree of polymerization, and each independently represent 0 to 20, provided that w2, w3, w4, and w5 are not all 0 at the same time; w1 and w6 are an average value indicating the number of $CF_2$'s, and each independently represent 1 to 3; and an arrangement order of repeating units in Formula (4) is not particularly limited).

In Formula (4), w2, w3, w4, and w5 indicate an average degree of polymerization, and each independently represent 0 to 20, are preferably 0 to 15, and more preferably 0 to 10. For example, w2, w3, w4, and w5 may each independently be 1 to 18, 2 to 13, 3 to 8, or 4 to 6.

In Formula (4), w1 and w6 are an average value indicating the number of $CF_2$'s, and each independently represent 1 to 3. w1 and w6 are determined according to the structure of repeating units arranged at the end of the chain structure in the PFPE chain represented by Formula (4).

In Formula (4), $(CF_2O)$, $(CF_2CF_2O)$, $(CF_2CF_2CF_2O)$, and $(CF_2CF_2CF_2CF_2O)$ are repeating units. The arrangement order of repeating units in Formula (4) is not particularly limited. In addition, the number of types of repeating units in Formula (4) is not particularly limited.

Specifically, PFPE chains represented by $R^3$ and $R^{3'}$ are each independently preferably any one selected from among the following PFPE chains represented by Formulae (4-1) to (4-4).

When each of $R^3$ and $R^{3'}$ is any one selected from among PFPE chains represented by Formulae (4-1) to (4-4), a fluorine-containing ether compound which can form a lubricating layer having favorable lubricity is obtained. In addition, when each of $R^3$ and $R^{3'}$ is any one selected from among PEPE chains represented by Formulae (4-1) to (4-4), the ratio of the number of oxygen atoms (the number of ether bonds ($-O-$)) to the number of carbon atoms in the PFPE chain is appropriate. Therefore, the fluorine-containing ether compound having an appropriate hardness is obtained. Therefore, the fluorine-containing ether compound applied onto the protective layer is less likely to aggregate on the protective layer, and a thinner lubricating layer can be formed at a sufficient coating rate. In addition, the fluorine-containing ether compound has appropriate flexibility, and thus, a lubricating layer having better chemical substance resistance and wear resistance can be formed.

(4-1)

(In Formula (4-1), h and i indicate an average degree of polymerization, h represents 1 to 20, and i represents 0 to 20)

(4-2)

(in Formula (4-2), j indicates an average degree of polymerization, and represents 1 to 15)

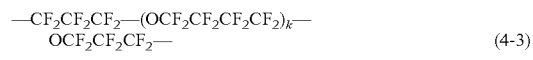
(4-3)

(in Formula (4-3), k indicates an average degree of polymerization, and represents 1 to 10)

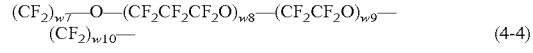
(4-4)

(in Formula (4-4), w8 and w9 indicate an average degree of polymerization, and each independently represent 1 to 20; and w7 and w10 are an average value indicating the number of $CF_2$'s, and each independently represent 1 to 2).

In Formula (4-1), the arrangement order of the repeating units $(OCH_2CF_2)$ and $(OCF_2)$ is not particularly limited. In Formula (4-1), the number h of $(OCF_2CF_3)$'s and the number i of $(OCF_2)$'s may be the same as or different from each other. The PEPE chain represented by Formula (4-1) may be a polymer of $(OCF_2CF_2)$. In addition, the PFPE chain represented by Formula (4-1) may be any of a random copolymer, a block copolymer, and an alternating copolymer composed of ($OCF_2CF_2$) and ($OCF_2$).

In Formulae (4-1) to (4-3), since b indicating an average degree of polymerization is 1 to 20, i is 0 to 20, j is 1 to 15, and k is 1 to 10, a fluorine-containing ether compound which can form a lubricating layer having favorable lubricity is obtained. In addition, in Formulae (4-1) to (4-3), since h and i indicating an average degree of polymerization are 20 or less, j is 15 or less, and k is 10 or less, this is preferable because the viscosity of the fluorine-containing ether compound does not become too high, and it becomes easy to apply a lubricant containing this compound, h, i, j, and k indicating an average degree of polymerization are preferably 1 to 10, more preferably 1.5 to 8, and still more preferably 2 to 7 because a fluorine-containing ether compound that easily wets and spreads on the protective layer and from which a lubricating layer having a uniform film thickness is easily obtained, is obtained, In Formula (4-4), the arrangement order of the repeating units ($CF_2CF_2CF_2O$) and ($CF_2CF_2O$) is not particularly limited. In Formula (4-4), the number w8 of ($CF_2CF_2CF_2O$)'s and the number w9 of ($CF_2CF_2O$)'s, which indicate an average degree of polymerization, may be the same as or different from each other. Formula (4-4) may include any of a random copolymer, a block copolymer, and an alternating copolymer composed of the monomer units ($CF_2CF_2CF_2O$) and ($CF_2CF_2O$).

In Formula (4-4), w8 and w9 indicating an average degree of polymerization are each independently 1 to 20, preferably 1 to 15, and more preferably 1 to 10.

w7 and w10 in Formula (4-4) are an average value indicating the number of $CF_2$'s, and each independently represent 1 to 2. w7 and w10 are determined according to the structure of repeating units arranged at the end of the chain structure in the PFPE chain represented by Formula (4-4). (Divalent Linking Group Having Polar Group Represented by $R^2$ and $R^5$)

In the fluorine-containing ether compound represented by Formula (1), $R^2$ and $R^5$ are a divalent linking group having one or more polar groups, $R^2$ has an oxygen atom at an end that is bonded to $R^1$ and is bonded to $R^1$ via an ether bond. $R^5$ has an oxygen atom at an end that is bonded to $R^6$ and is bonded to $R^6$ via an ether bond. In the fluorine-containing ether compound represented by Formula (1), since $R^2$ and $R^5$ each have one or more polar groups, when a lubricant containing the compound is used to form a lubricating layer on the protective layer, a suitable interaction occurs between the lubricating layer and the protective layer. $R^2$ and $R^5$ can be appropriately selected depending on the performance required for the lubricant containing a fluorine-containing ether compound and the like.

$R^2$ and $R^5$ may be the same as or different from each other. When $R^2$ and $R^5$ are the same, the coating of the fluorine-containing ether compound with respect to the protective layer becomes more uniform, and a lubricating layer having better adhesion can be formed.

In this specification, "$R^2$ and $R^5$ are the same" means that atoms contained in $R^2$ and atoms contained in $R^5$ are arranged symmetrically with respect to the skeleton (—$R^3$[—$CH_2$—$R^4$—$CH_2$—$R^{3'}$]$_n$—) arranged at the center of the fluorine-containing ether compound represented by Formula (1).

Examples of polar groups of $R^2$ and $R^5$ include a hydroxyl group (—OH), an amino group (—$NH_2$), a carboxyl group (—COOH), an aldehyde group (—COH), a carbonyl group (—CO—), and a sulfonic acid group (—$SO_3H$). Among these, the polar group is particularly preferably a hydroxyl group. The hydroxyl group has a strong interaction with the protective layer, particularly the protective layer formed of a carbon-based material. Therefore, when at least some of the polar groups of $R^2$ and/or $R^5$ are hydroxyl groups, the lubricating layer containing the fluorine-containing ether compound has higher adhesion to the protective layer. In the present embodiment, it is more preferable that all the polar groups of $R^2$ and $R^5$ be hydroxyl groups.

The number of polar groups of each of $R^2$ and $R^5$ is preferably 1 to 3 and more preferably 1 to 2. When the number of polar groups of $R^2$ and/or $R^5$ is 2 or more, types of some or all of the polar groups may be the same or may be different from each other.

When the polar group of $R^2$ and/or $R^5$ includes a hydroxyl group, the total number of hydroxyl groups contained in $R^2$ and hydroxyl groups contained in $R^5$ in Formula (1) is preferably 2 to 6, more preferably 2 to 4, and most preferably 2. When the total number of hydroxyl groups is 2 or more, the interaction between the hydroxyl groups of $R^2$ and/or $R^5$ and the protective layer can be effectively obtained. As a result, a fluorine-containing ether compound which can form a lubricating layer having high adhesion to the protective layer is obtained. In addition, when the total number of hydroxyl groups is 6 or less, the number of polar groups that are not involved in binding between the lubricating layer and the active sites on the protective layer decreases. Therefore, it is possible to prevent the polar groups that are not involved in binding between the lubricating layer and the active sites on the protective layer from attracting environmental substances that produce contamination substances and water that causes corrosion of the magnetic recording medium to the lubricating layer. Therefore, it is possible to form a lubricating layer that can more effectively minimize contamination and corrosion of the magnetic recording medium. In addition, when the total number of hydroxyl groups is 4 or less, the fluidity of the lubricating layer containing the fluorine-containing ether compound is sufficiently high. Therefore, even if a part of the lubricating layer containing the fluorine-containing ether compound is deformed due to wear and the fluorine-containing ether compound in the lubricating layer moves to another location, the ability to return to its original position again is high and better wear resistance is obtained.

Preferably, the divalent linking group represented by $R^2$ has an oxygen atom at an end that is bonded to $R^1$ and also has an oxygen atom arranged at the other end (end that is bonded to $CH_2$ adjacent to $R^2$). In addition, preferably, the divalent linking group represented by $R^5$ has an oxygen atom at an end that is bonded to $R^6$ and also has an oxygen atom arranged at the other end (end that is bonded to $CH_2$ adjacent to $R^5$). Oxygen atoms arranged at both ends of the divalent linking groups represented by $R^2$ and $R^5$ form an ether bond (—O—) with atoms bonded on both sides thereof. These ether bonds impart appropriate flexibility to the fluorine-containing ether compound represented by Formula (1) and increase the affinity between the polar group of the divalent linking groups represented by $R^2$ and $R^5$ and the protective layer.

The divalent linking groups represented by $R^2$ and $R^5$ are preferably a group in which one or more polar groups are bonded to carbon atoms of an alkylene group having 3 to 8 carbon atoms, and both ends are oxygen atoms. The alkylene group may contain an ether bond between carbon atoms. The alkylene group having 3 to 8 carbon atoms is preferably an alkylene group having 3 to 5 carbon atoms. The alkylene group having 3 to 8 carbon atoms preferably has a linear structure. This is because the coating of the fluorine-containing ether compound with respect to the protective layer becomes more uniform, and a lubricating layer having better adhesion can be formed.

$R^2$ in Formula (1) is preferably a linking group represented by the following Formula (2-1) or (2-2). In Formulae (2-1) and (2-2), the oxygen atom on the left side is bonded to $R^1$, and the oxygen atom on the right side is bonded to $CH_2$ adjacent to $R^2$.

When $R^2$ is a linking group represented by the following Formula (2-1) or (2-2), $R^2$ and $R^1$ form an ether bond, and an ether bond is arranged between $R^2$ and $CH_2$ adjacent to $R^2$. As a result, a fluorine-containing ether compound having appropriate flexibility is obtained, and a lubricating layer having better chemical substance resistance and wear resistance can be formed. In addition, it is preferable that $R^2$ be Formula (2-1) because the fluorine-containing ether compound represented by Formula (1) is easily synthesized.

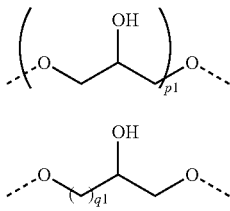

(2-1)

(2-2)

(in Formula (2-1), p1 represents an integer of 1 to 3)
(in Formula (2-2), q1 represents an integer of 2 to 4)

The linking group represented by Formula (2-2) has a structure in which 1 to 3 methylene groups are added to a glycerin skeleton ($-OCH_2CH(OH)CH_2O-$). Therefore, the lubricating layer containing the fluorine-containing ether compound in which $R^2$ is Formula (2-2) has favorable hydrophobicity. As a result, the lubricating layer can effectively prevent intrusion of water, which causes corrosion of the magnetic recording medium, and can have a strong effect of inhibiting corrosion of the magnetic recording medium.

$R^5$ in Formula (1) is preferably a linking group represented by the following Formula (2-3) or (2-4). In Formulae (2-3) and (2-4), the oxygen atom on the left side is bonded to $CH_2$ adjacent to $R^5$, and the oxygen atom on the right side is bonded to $R^6$.

When $R^5$ is a linking group represented by the following Formula (2-3) or (2-4), $R^5$ and $R^6$ form an ether bond, and an ether bond is arranged between $R^5$ and $CH_2$ adjacent to $R^5$. As a result, a fluorine-containing ether compound having appropriate flexibility is obtained, and a lubricating layer having better chemical substance resistance and wear resistance can be formed. In addition, it is preferable that $R^5$ be Formula (2-3) because the fluorine-containing ether compound represented by Formula (1) is easily synthesized.

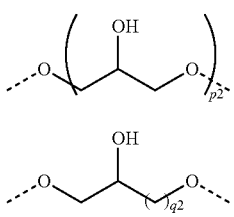

(2-3)

(2-4)

(in Formula (2-3), p2 represents an integer of 1 to 3)
(in Formula (2-4), q2 represents an integer of 2 to 4), The linking group represented by Formula (2-4) has a structure in which 1 to 3 methylene groups are added to a glycerin skeleton ($-OCH_2CH(OH)CH_2O-$). Therefore, the lubricating layer containing the fluorine-containing ether compound in which $R^5$ is Formula (2-4) has favorable hydrophobicity. As a result, the lubricating layer can effectively prevent intrusion of water, which causes corrosion of the magnetic recording medium, and can have a strong effect of inhibiting corrosion of the magnetic recording medium, In Formula (1), it is more preferable that $R^2$ be a linking group represented by Formula (2-1) or (2-2) and $R^5$ be a linking group represented by Formula (2-3) or (2-4). All of the linking groups represented by Formulae (2-1) to (2-4) have a hydroxyl group which is a polar group having a particularly strong interaction with the protective layer among polar groups. In addition, in the linking groups represented by Formulae (2-1) to (2-4), a methylene group ($-CH_2-$) is arranged on both sides of a carbon atom to which the hydroxyl group is bonded. Therefore, when $R^2$ is a linking group represented by Formula (2-1) or (2-2), and $R^5$ is a linking group represented by Formula (2-3) or (2-4), for the following reasons, the fluorine-containing ether compound can form a lubricating layer having better adhesion to the protective layer.

That is, in the linking groups represented by Formulae (2-1) to (2-4), at least the methylene group and the oxygen atom ($-O-$) of $R^2$ or $R^1$ are arranged between the carbon atom to which the hydroxyl group is bonded, and $R^1$ or $R^6$. Therefore, the distance between the hydroxyl group contained in the linking groups represented by Formulae (2-1) to (2-4) and the amide bond of $R^1$ and/or $R^6$ is appropriate. In addition, the free rotation of the end group is slightly inhibited due to the ether bond that is the part linking $R^1$ and $R^2$ and/or $R^5$ and $R^6$. Therefore, the amide of $R^1$ and/or $R^6$, and the hydroxyl group of the linking groups represented by Formulae (2-1) to (2-4) are unlikely to interact with each other. Therefore, the hydroxyl group of the linking groups represented by Formulae (2-1) to (2-4) and the end group represented by $R^1$ and/or $R^6$ each independently exhibit a favorable interaction with the protective layer, and each are independently likely to be bonded to a plurality of functional groups (active sites) present on the protective layer.

In the linking group represented by Formula (2-1), p1 is an integer of 1 to 3. Since p1 in the linking group represented by Formula (2-1) is 1 or more, when $R^2$ is a linking group represented by Formula (2-1), one or more hydroxyl groups, which have a particularly strong interaction with the protective layer, are provided as the polar group. As a result, a fluorine-containing ether compound which can form a lubricating layer having even better adhesion to the protective layer is obtained. In addition, in the linking group represented by Formula (2-1), since p1 in Formula (2-1) is 3 or less, it is possible to prevent the polarity of the fluorine-containing ether compound from becoming too high, and the magnetic recording medium having a lubricating layer containing this compound from being contaminated and corroded due to a large number of hydroxyl groups in the linking group represented by Formula (2-1).

In addition, in the linking group represented by Formula (2-1), when p1 in Formula (2-1) is 2 or 3, the distance between the hydroxyl groups contained in the linking group represented by Formula (2-1) is appropriate. As a result, even if the number of hydroxyl groups contained in $R^2$ is plural in number, all the hydroxyl groups contained in $R^2$ are likely to be respectively involved in binding with the active sites on the protective layer.

In the linking group represented by Formula (2-1), p1 is preferably 1 or 2. In the linking group represented by Formula (2-1), when p1 is 1, this is more preferable because the fluorine-containing ether compound can be easily synthesized.

In the linking group represented by Formula (2-2), q1 is an integer of 2 to 4, preferably an integer of 2 to 3, and more preferably 2. When q1 in Formula (2-2) is 2 to 4, the methylene group contained in Formula (2-2) improves the hydrophobicity of the fluorine-containing ether compound, and a stronger corrosion inhibition effect is obtained.

In the linking group represented by Formula (2-3), p2 is an integer of 1 to 3. Since p2 in the linking group represented by Formula (2-3) is 1 or more, when R$ is a linking group represented by Formula (2-3), one or more hydroxyl groups, which have a particularly strong interaction with the protective layer, are provided as the polar group. As a result, a fluorine-containing ether compound which can form a lubricating layer having even better adhesion to the protective layer is obtained. In addition, in the linking group represented by Formula (2-3), since p2 in Formula (2-3) is 3 or less, it is possible to prevent the polarity of the fluorine-containing ether compound from becoming too high, and the magnetic recording medium having a lubricating layer containing this compound from being contaminated and corroded due to a large number of hydroxyl groups in the linking group represented by Formula (2-3).

In addition, in the linking group represented by Formula (2-3), when p2 in Formula (2-3) is 2 or 3, the distance between the hydroxyl groups contained in the linking group represented by Formula (2-3) is appropriate. As a result, even when the number of hydroxyl groups contained in $R^5$ is plural in number, all the hydroxyl groups contained in $R^5$ are likely to be respectively involved in binding with the active sites on the protective layer.

In the linking group represented by Formula (2-3), p2 is preferably 1 or 2. In the linking group represented by Formula (2-3), when p2 is 1, this is more preferable because the fluorine-containing ether compound can be easily synthesized.

In the linking group represented by Formula (2-4), q2 is an integer of 2 to 4, preferably an integer of 2 to 3, and more preferably 2. When q2 is 2 to 4 in Formula (2-4), the methylene group contained in Formula (2-4) improves the hydrophobicity of the fluorine-containing ether compound, and a stronger corrosion inhibition effect is obtained, In the fluorine-containing ether compound represented by Formula (1), when $R^2$ is a linking group represented by Formula (2-1) or (2-2) and R$ is a linking group represented by Formula (2-3) or (2-4), it is more preferable that $R^2$ and R$ be the same. Specifically, "$R^2$ is Formula (2-1), $R^5$ is Formula (2-3), and p1 in Formula (2-1) and p2 in Formula (2-3) are the same" or "$R^2$ is Formula (2-2), R$ is Formula (2-4), and q1 in Formula (2-2) and q2 in Formula (2-4) are the same" is preferable.

(End Groups Represented by $R^1$ and $R^6$)

In the fluorine-containing ether compound represented by Formula (1), the end groups represented by $R^1$ and $R^6$ are organic groups having 1 to 50 carbon atoms, and at least one thereof is a group in which a carbonyl carbon atom or nitrogen atom constituting an amide bond is bonded to a carbon atom of an organic group having 1 to 8 carbon atoms (end group having an amide bond).

In the fluorine-containing ether compound represented by Formula (1), the amide contained in the end group having an amide bond exhibits an appropriate interaction with the protective layer. Therefore, the end group having an amide bond has a function of improving the adhesion between the lubricating layer and the protective layer and forming a lubricating layer having favorable chemical substance resistance and wear resistance.

In the fluorine-containing ether compound represented by Formula (1), the type of the end group having an amide bond can be appropriately selected depending on the performance required for the lubricant containing a fluorine-containing ether compound and the like, The number of amide bonds of the end group having an amide bond is not particularly limited, and may be 1 and may be 2 or more. The number of amide bonds of the end group having an amide bond is preferably 1 because it is relatively easy to produce the fluorine-containing ether compound.

The end group having an amide bond is a group in which a carbonyl carbon atom or nitrogen atom constituting an amide bond is bonded to a carbon atom of an organic group having 1 to 8 carbon atoms. In the fluorine-containing ether compound represented by Formula (1), since the organic group has 1 to & carbon atoms, the end group having an amide bond does not cause steric hindrance, and a fluorine-containing ether compound having favorable affinity between the amide and the protective layer is obtained.

Examples of organic groups in the end group having an amide bond include a phenyl group and an alkyl group having a linear or branched structure and having 1 to 8 carbon atoms, and a phenyl group or an alkyl group having 1 to 6 carbon atoms is preferable. When the organic group in the end group having an amide bond is a phenyl group or an alkyl group having 1 to 6 carbon atoms, a fluorine-containing ether compound that more effectively minimizes the interaction between the amide of $R^1$ and/or $R^6$ and the polar group of the adjacent linking group ($R^2$ or $R^5$) and that has high affinity between the amide and the protective layer is obtained.

Specific examples of groups bonding to a carbon atom of an organic group having 1 to 8 carbon atoms include the group represented by the following Formula (3-1) or (5-2).

The dotted lines in Formulae (5-1) and (5-2) are bonds bonded to organic groups in $R^1$ or $R^6$. When the end group having an amide bond has a group represented by Formula (5-1), the end group having an amide bond is a group in which a carbonyl carbon atom constituting an amide bond is bonded to a carbon atom of an organic group in $R^1$ or $R^6$. When the end group having an amide bond has a group represented by Formula (5-2), the end group having an amide bond is a group in which a nitrogen atom constituting an amide bond is bonded to a carbon atom of an organic group in $R^1$ or $R^6$.

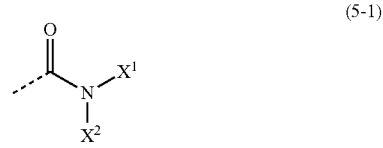

(5-1)

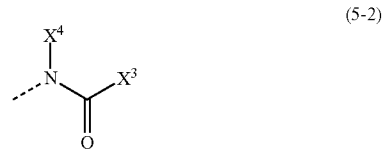

(5-2)

(in Formulae (5-1) and (5-2), $X^1$, $X^2$, $X^3$, and $X^4$ are each independently a hydrogen atom or any group selected from among a methyl group, ethyl group, propyl group, butyl group, pentyl group, hexyl group, octyl group, trifluoromethyl group, perfluoroethyl group, perfluoropropyl group, perfluorobutyl group, perfluoropentyl group, perfluorohexyl group, octafluoropentyl group, tridecafluorooctyl group, phenyl group, methoxy phenyl group, fluoride phenyl group, naphthyl group, phenethyl group, methoxyphenethyl group, fluoride phenethyl group, benzyl group, methoxybenzyl group, naphthyl methyl group, methoxynaphthyl group, pyrrolyl group, pyrazolyl group, methylpyrazolyl methyl group, imidazolyl group, furyl group, furfuryl group, oxazolyl group, isoxazolyl group, thienyl group, thienylethyl group, thiazolyl group, methylthiazolylethyl group, isothiazolyl group, pyridyl group, pyrimidinyl group, pyridazinyl group, pyrazinyl group, indolinyl group, benzofuranyl group, benzothienyl group, benzimidazolyl group, benzoxazolyl group, benzothiazolyl group, benzopyrazolyl group, benzoisooxazolyl group, benzisothiazolyl group, quinofyl group, isoquinolyl group, quinazolinyl group, quinoxalinyl group, phthalazinyl group, cinnolinyl group, vinyl group, allyl group, butenyl group, propynyl group, propargyl group, butynyl group, methylbutynyl group, pentynyl group, methylpentynyl group, hexynyl group, and cyanoethyl group).

In Formula (5-1), $X^1$ and $X^2$ are each independently preferably a hydrogen atom, a methyl group, an ethyl group, a phenyl group, a methoxyphenyl group, a trifluoromethyl group, and an allyl group.

In Formula (5-2), $X^2$ is preferably a group selected from among a methyl group, an ethyl group, a phenyl group, a methoxyphenyl group, a naphthyl group, a trifluoromethyl group, and an allyl group. $X^4$ is preferably a group selected from among a hydrogen atom, a methyl group, an ethyl group, a phenyl group, a methoxyphenyl group, a trifluoromethyl group, and an allyl group.

$X^1$ and $X^2$ in Formula (5-1) may be bonded to each other to form a cyclic structure. In this case, for example, $X^1$—$X^2$ in Formula (5-1) can have a structure composed of a combination of one or more groups selected from the group consisting of a methylene group (—CH$_2$—), an ether bond (—O—), and an amine structure (—NH—). The cyclic structure formed by bonding $X^1$ and $X^2$ in Formula (5-1) is preferably a 5- to 7-membered ring containing the nitrogen atom constituting an amide bond.

In addition, $X^3$ and $X^4$ in Formula (5-2) may be bonded to each other to form a cyclic structure. In this case, for example, $X^3$—$X^4$ in Formula (5-2) can have a structure composed of a combination of one or more groups selected from the group consisting of a methylene group (—CH$_2$—), an ether bond (—O—), and an amine structure (—NH—). The cyclic structure formed by bonding $X^3$ and $X^4$ in Formula (5-2) is preferably a 5- to 7-membered ring containing the carbonyl carbon atom and the nitrogen atom constituting an amide bond.

Examples of end groups having an amide bond include any of organic groups represented by the following Formulae (6-1) to (6-12). The dotted lines in Formulae (6-1) to (6-12) are bonds bonded to $R^2$ or $R^5$ in Formula (1).

The end group having an amide bond in the fluorine-containing ether compound of the present embodiment is not limited to the organic groups represented by Formulae (6-1) to (6-12).

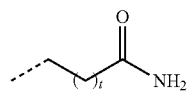
(6-1)

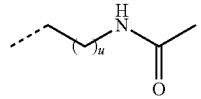
(6-2)

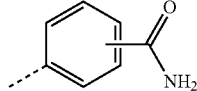
(6-3)

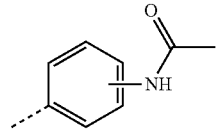
(6-4)

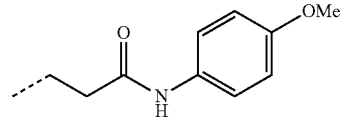
(6-5)

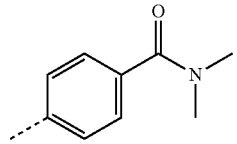
(6-6)

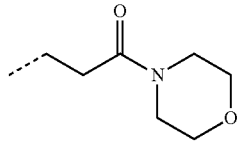
(6-7)

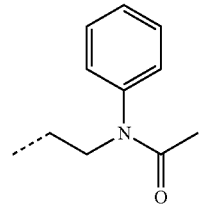
(6-8)

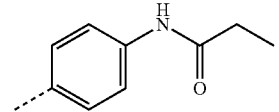
(6-9)

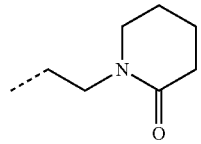
(6-10)

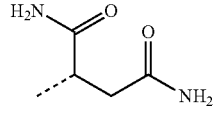
(6-11)

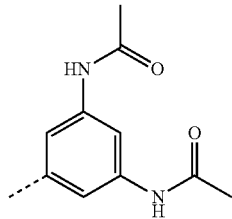

(6-12)

(in Formula (6-1), t represents an integer of 0 to 7)
(in Formula (6-2), u represents an integer of 0 to 7)

As the end group having an amide bond, among the end groups represented by Formulae (6-1) to (6-12), it is preferable to use end groups represented by Formulae (6-1) to (6-4). This is because it is relatively easy to produce the flourine-containing ether compound.

The end group represented by Formula (6-1) or (6-2) has a linear aliphatic amide and has higher fluidity than the end groups represented by Formulae (6-3) to (6-12). Therefore, even if a part of the lubricating layer containing the fluorine-containing ether compound is deformed due to wear the flourine-containing ether compound in the lubricating layer moves to another location, the ability to return to its original position again is high. As a result, a fluorine-containing ether compound having the end group represented by Formula (6-1) or (6-2) can form a lubricating layer having better wear resistance.

In Formula (6-1), t is an integer of 0 to 7 and preferably an integer of 0 to 5. This is because the interaction between the amide of $R^1$ and/or $R^6$ and the polar group of the adjacent linking group ($R^2$ or $R^5$) is more effectively minimized.

In Formula (6-2), u is an integer of 0 to 7, and preferably an integer of 0 to 5. This is because the interaction between the amide of $R^1$ and/or $R^6$ and the polar group of the adjacent linking group ($R^2$ or $R^5$) is more effectively minimized.

In addition, since the end group represented by Formula (6-3) or (6-4) has a relatively rigid aromatic amide, the movement of the molecule is restricted to some extent. Therefore, the fluorine-containing ether compound having the end group represented by Formula (6-3) or (6-4) has a lower ability of the amide of $R^1$ and $R^6$ and the polar group of $R^2$ and $R^3$ to inhibit each other's interaction with the protective layer than the fluorine-containing ether compound having the end group represented by Formula (6-1) or (6-2).

Therefore, the aromatic amide of the end group represented by Formula (6-3) or (6-4) has a planar structure composed of carbon having sp$^2$ hybrid orbital, oxygen, and nitrogen, ranging from an aromatic ring to an amide skeleton. Therefore, it is presumed that the interaction between the aromatic amide of the end group represented by Formula (6-3) or (6-4) and the protective layer is stronger than the interaction between the aliphatic amide of the end group represented by Formula (6-1) or (6-2) and the protective layer.

In addition, the aromatic amide of the end group represented by Formula (6-3) or (6-4) has a phenyl group as an organic group in the end group. Therefore, the lubricating layer containing the fluorine-containing ether compound has favorable hydrophobicity and can effectively prevent intrusion of water, which causes corrosion of the magnetic recording medium.

Accordingly, the fluorine-containing ether compound having an end group represented by Formula (6-3) or (6-4) can form a lubricating layer having better chemical substance resistance and a stronger effect of inhibiting corrosion of the magnetic recording medium.

In the end group having an amide bond represented by Formula (6-3), a carbonyl carbon atom constituting an amide bond may be bonded to any of an ortho position, a meta position, and a para position of the phenyl group, which is an organic group. Since the interaction between the amide of $R^1$ and/or $R^6$ and the polar group of the adjacent linking group ($R^2$ or $R^5$) is more effectively minimized, it is preferable that a carbonyl carbon atom constituting an amide bond be bonded to the para position of the phenyl group.

In the end group having an amide bond represented by Formula (6-4), a nitrogen atom constituting an amide bond may be bonded to any of an ortho position, a meta position, and a para position of the phenyl group, which is an organic group. Since the interaction between the amide of $R^1$ and/or $R^6$ and the polar group of the adjacent linking group ($R^2$ or $R^5$) is more effectively minimized, it is preferable that a nitrogen atom constituting an amide bond be bonded to the para position of the phenyl group.

In the fluorine-containing ether compound represented by Formula (1), when both end groups represented by $R^1$ and $R^6$ are an end group having an amide bond, $R^1$ and $R^6$ may be the same or may be different from each other. When $R^1$ and $R^6$ are the same, the coating of the fluorine-containing ether compound with respect to the protective layer becomes more uniform, and a lubricating layer having better adhesion can be formed.

In this specification, "$R^1$ and $R^6$ are the same" means that atoms contained in $R^1$ and atoms contained in $R^6$ are arranged symmetrically with respect to a skeleton ($-R^3[-CH_2-R^4-CH_2-^{3'}]_n-$) arranged at the center of the fluorine-containing ether compound represented by Formula (1) via a methylene group and $R^2$ or $R^5$.

In the fluorine-containing ether compound represented by Formula (1), when only one of end groups represented by $R^1$ and $R^6$ (for example, $R^1$) is an end group having an amide bond, the other end group (for example, $R^6$) that is not an end group having an amide bond may be any group and is not particularly limited as long as it is an organic group having 1 to 50 carbon atoms. The other end group is preferably an organic group having 1 to 30 carbon atoms and more preferably an organic group having 1 to 15 carbon atoms.

The other end group is preferably an organic group having at least one double bond or triple bond, and examples thereof include a group containing an aromatic ring, a group containing an unsaturated heterocycle, a group containing an alkenyl group, and a group containing an alkynyl group. The organic group having at least one double bond or triple bond may be, for example, a group including a cyano group. That is, the double bond and the triple bond may be a carbon-carbon bond, or may be a bond between a carbon atom and a heteroatom (for example, a carbon-nitrogen bond).

The other end group may be an alkyl group having 1 to 8 carbon atoms which may have a substituent. Examples of substituents include an alkoxy group, hydroxyl group, mercapto group, carboxyl group, carbonyl group, amino group, and fluoro group. The alkyl group more preferably has 1 to 6 carbon atoms and still more preferably has 1 to 4 carbon atoms. Among alkyl groups having 1 to 8 carbon atoms which may have a substituent, an alkyl group having a hydroxyl group and having 1 to 8 carbon atoms is preferable.

When the other end group is an organic group having at least one double bond or triple bond, specific examples thereof include a phenyl group, methoxy phenyl group, fluoride phenyl group, naphthyl group, phenethyl group, methoxyphenethyl group, fluoride phenethyl group, benzyl group, methoxybenzyl group, naphthyl methyl group, methoxynaphthyl group, pyrrolyl group, pyrazolyl group, methylpyrazolyl methyl group, imidazolyl group, furyl group, furfuryl group, oxazolyl group, isoxazolyl group, thienyl group, thienylethyl group, thiazolyl group, methyl-thiazolylethyl group, isothiazolyl group, pyridyl group, pyrimidinyl group, pyridazinyl group, pyrazinyl group, indolinyl group, benzofuranyl group, benzothienyl group, benzimidazolyl group, benzoxazolyl group, benzothiazolyl group, benzopyrazolyl group, benzoisooxazolyl group, benzisothiazolyl group, quinolyl group, isoquinolyl group, quinazolinyl group, quinoxalinyl group, phthalazinyl group, cinnolinyl group, vinyl group, allyl group, butenyl group, propynyl group, propargyl group, butynyl group, methylbutynyl group, pentynyl group, methylpentynyl group, hexynyl group, and cyanoethyl group.

When the other end group is an alkyl group having 1 to 8 carbon atoms which may have a substituent, specific examples thereof include a methyl group, ethyl group, propyl group, butyl group, pentyl group, hexyl group, octyl group, trifluoromethyl group, perfluoroethyl group, perfluoropropyl group, perfluorobutyl group, perfluoropentyl group, perfluorohexyl group, octafluoropentyl group, tridecafluorooctyl group, hydroxymethyl group (—CH$_2$OH), hydroxyethyl group (—CH$_2$CH$_2$OH), hydroxypropyl group (—CH$_2$CH$_2$CH$_2$OH), and hydroxybutyl group (—CH$_2$CH$_2$CH$_2$CH$_2$OH).

Among the above examples, the other end group is preferably any of a phenyl group, methoxyphenyl group, thienyl ethyl group, naphthyl group, butenyl group, allyl group, propargyl group, phenethyl group, methoxyphenethyl group, fluoride phenethyl group, hydroxyethyl group, and hydroxypropyl group, and particularly preferably any of a phenyl group, naphthyl group, thienyl ethyl group, allyl group, butenyl group, and hydroxyethyl group. In this case, a fluorine-containing ether compound which can form a lubricating layer having better wear resistance is obtained.

In the fluorine-containing ether compound represented by Formula (1), it is preferable that all of $R^3$ and one or two $R^{3'}$'s in Formula (1) be the same and $R^1$—$R^2$— and $R^6$—$R^5$— be the same. This is because a fluorine-containing ether compound can be easily and efficiently produced. In addition, a fluorine-containing ether compound in which $R^4$ is a linking group represented by Formula (3-1) is more preferable because it can be more easily and efficiently produced.

Specifically, the fluorine-containing ether compound represented by Formula (1) is preferably any of compounds represented by the following Formulae (A) to (Y).

When the compound represented by Formula (1) is any of compounds represented by the following Formulae (A) to (Y), raw materials thereof are easily available, and moreover, it is possible to form a lubricating layer having excellent adhesion, even better chemical substance resistance and wear resistance, and a strong effect of inhibiting corrosion of the magnetic recording medium even if the thickness is thin.

In all compounds represented by the following Formulae (A) to (Y), the PFPE chains represented by $R^3$ and one or two $R^{3'}$'s in Formula (1) are the same. In the compounds represented by the following Formulae (A) to (Y), Rf$_1$, Rf$_2$, and Rf$_3$ representing PFPE chains have the following structures. That is, in the compounds represented by the following Formulae (A) to (M), and (P) to (X), Rf$_1$ is the PEPE chain represented by Formula (4-1). In the compounds represented by the following Formulae (N) and (Y), Rf$_2$ is the PFPE chain represented by Formula (4-2). In the compound represented by the following Formula (O), Rf$_3$ is the PEPE chain represented by Formula (4-3). Here, in Formulae (A) to (Y), since h and i in Rf$_1$, j in Rf$_2$, and k in Rf$_3$, which represent the PEPE chains, are values indicating an average degree of polymerization, they are not necessarily an integer.

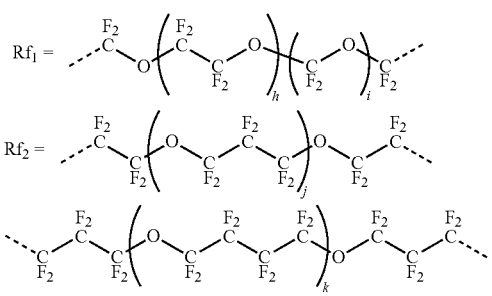

In all of the compounds represented by the following Formulae (A) to (Y), $R^2$ is the linking group represented by Formula (2-1) or (2-2), and $R^5$ is the linking group represented by Formula (2-3) or (2-4).

In all of the compounds represented by the following Formulae (A) to (Y), $R^4$ is the linking groups represented by Formula (3-1) to (3-3).

In all of the compounds represented by the following Formulae (A) to (Y), $R^1$ and/or $R^6$ has a group represented by Formula (5-1) or (5-2).

In the compound represented by the following Formula (A), n in Formula (1) is 1. $R^1$ and $R^6$ are the end group represented by Formula (6-1), and t is 1. $R^2$ is the linking group represented by Formula (2-1), and p1 is 1. $R^5$ is the linking group represented by Formula (2-3), and p2 is 1. $R^4$ is the linking group represented by Formula (3-1). $R^3$ and $R^{3'}$ are the PFPE chain represented by Formula (4-1).

In all of the compounds represented by the following Formulae (B) to (D), n in Formula (1) is 1. $R^2$ is the linking group represented by Formula (2-1), and p1 is 1. $R^5$ is the linking group represented by Formula (2-3), and p2 is 1. $R^4$ is the linking group represented by Formula (3-1). $R^3$ and $R^{3'}$ are the PFPE chain represented by Formula (4-1).

In the compound represented by the following Formula (B), $R^1$ and $R^6$ are the end group represented by Formula (6-2), and u is 1. In the compound represented by the following Formula (C), $R^1$ and $R^6$ are the end group represented by Formula (6-2), and u is 3. In the compound represented by the following Formula (D), $R^1$ and $R^6$ are the end group represented by Formula (6-2), and u is 5.

In the compound represented by the following Formula (B), n in Formula (1) is 1. $R^1$ and $R^6$ are the end group represented by Formula (6-3), and a carbonyl carbon atom constituting an amide bond is bonded to the para position of the phenyl group. $R^2$ is the linking group represented by Formula (2-1), and p1 is 1. $R^5$ is the linking group represented by Formula (2-3), and p2 is 1. $R^4$ is the linking group represented by Formula (3-1). $R^3$ and $R^{3'}$ are the PFPE chain represented by Formula (4-1).

In the compound represented by the following Formula (F), n in Formula (1) is 1. $R^1$ and $R^6$ are the end group represented by Formula (6-4), and a nitrogen atom constituting an amide bond is bonded to the para position of the phenyl group. $R^2$ is the linking group represented by Formula (2-1), and p1 is 1. $R^3$ is the linking group represented by Formula (2-3), and p2 is 1. $R^4$ is the linking group represented by Formula (3-1). $R^3$ and $R^{3'}$ are the PEPE chain represented by Formula (4-1).

In the compound represented by the following Formula (O), n in Formula (1) is 1. $R^1$ and $R^6$ are the end group represented by Formula (6-1), and t is 1. $R^2$ is the linking group represented by Formula (2-1), and p1 is 2. $R^3$ is the linking group represented by Formula (2-3), and p2 is 2. $R^4$ is the linking group represented by Formula (3-1). $R^3$ and $R^{3'}$ are the PFPE chain represented by Formula (4-1).

In the compound represented by the following Formula (H), n in Formula (1) is 1. $R^1$ and $R^6$ are the end group represented by Formula (6-1), and t is 1. $R^2$ is the linking group represented by Formula (2-1), and p1 is 1. $R^3$ is the linking group represented by Formula (2-3), and p2 is 2. $R^4$ is the linking group represented by Formula (3-1), $R^3$ and $R^{3'}$ are the PFPE chain represented by Formula (4-1).

In the compound represented by the following Formula (I), n in Formula (1) is 1. $R^1$ and $R^6$ are the end group represented by Formula (6-1), and t is 1. $R^2$ is the linking group represented by Formula (2-2), and q1 is 2. $R^3$ is the linking group represented by Formula (2-4), and q2 is 2. $R^4$ is the linking group represented by Formula (3-1). $R^3$ and $R^{3'}$ are the PFPE chain represented by Formula (4-1).

In the compound represented by the following Formula (J), n in Formula (1) is 1. $R^1$ and $R^6$ are the end group represented by Formula (6-1), and t is 1. $R^2$ is the linking group represented by Formula (2-1), and p1 is 1. $R^3$ is the linking group represented by Formula (2-3), and p2 is 1. $R^4$ is the linking group represented by Formula (3-3), and s is 2. $R^3$ and $R^{3'}$ are the PFPE chain represented by Formula (4-1).

In the compound represented by the following Formula (K), n in Formula (1) is 1. $R^1$ is the end group represented by Formula (6-1), and t is 1. $R^6$ is a hydroxyethyl group (—CH$_2$CH$_3$OH) which is an end group having no amide bond. $R^2$ is the linking group represented by Formula (2-1), and p1 is 1. $R^3$ is the linking group represented by Formula (2-3), and p2 is 1. $R^4$ is the linking group represented by Formula (3-1). $R^3$ and $R^{3'}$ are the PFPE chain represented by Formula (4-1).

In the compound represented by the following Formula (L), n in Formula (1) is 1. $R^1$ is the end group represented by Formula (6-1), and t is 1. $R^6$ is an allyl group which is an end group having no amide bond. $R^2$ is the linking group represented by Formula (2-1), and p1 is 1. $R^5$ is the linking group represented by Formula (2-3), and p2 is 2. $R^4$ is the linking group represented by Formula (3-1). $R^3$ and $R^{3'}$ are the PFPE chain represented by Formula (4-1).

In the compound represented by the following Formula (M), n in Formula (1) is 1. $R^1$ is the end group represented by Formula (6-1), and t is 1. $R^6$ is a phenyl group which is an end group having no amide bond. $R^2$ is the linking group represented by Formula (2-1), and p1 is 1. $R^5$ is the linking group represented by Formula (2-3), and p2 is t. $R^4$ is the linking group represented by Formula (3-1). $R^3$ and $R^{3'}$ are the PFPE chain represented by Formula (4-1).

In all of the compounds represented by the following Formulae (N) and (O), a in Formula (1) is 1. $R^1$ and $R^6$ are the end group represented by Formula (6-1), and t is 1. $R^2$ is the linking group represented by Formula (2-1), and p1 is 1. $R^5$ is the linking group represented by Formula (2-3), and p2 is 1. $R^4$ is the linking group represented by Formula (3-1).

In the compound represented by the following Formula (N), $R^3$ and $R^{3'}$ are the PFPE chain represented by Formula (4-2). In the compound represented by the following Formula (O), $R^3$ and $R^{3'}$ are the PFPE chain represented by Formula (4-3).

In the compound represented by the following Formula (P), n in Formula (1) is 2. $R^1$ and $R^6$ are the end group represented by Formula (6-1), and t is 1. $R^2$ is the linking group represented by Formula (2-1), and p1 is 1. $R^5$ is the linking group represented by Formula (2-3), and p2 is 1. Two $R^4$'s are the linking group represented by Formula (3-1). $R^3$ and two $R^{3'}$'s are the PFPE chain represented by Formula (4-1).

In all of the compounds represented by the following Formulae (Q) and (R), n in Formula (1) is 2. $R^2$ is the linking group represented by Formula (2-1), and p1 is 1. $R^5$ is the linking group represented by Formula (2-3), and p2 is 1. Two $R^4$'s are the linking group represented by Formula (3-1). $R^3$ and two $R^{3'}$'s are the PFPE chain represented by Formula (4-1).

In the compound represented by the following Formula (Q), $R^1$ and $R^6$ are the end group represented by Formula (6-2), and u is 1. In the compound represented by the following Formula (R), $R^1$ and $R^6$ are the end group represented by Formula (6-2), and u is 3.

In the compound represented by the following Formula (S), n in Formula (1) is 2. $R^1$ and $R^6$ are the end group represented by Formula (6-3), and a carbonyl carbon atom constituting an amide bond is bonded to the para position of the phenyl group. $R^2$ is the linking group represented by Formula (2-1), and p1 is 1. $R^5$ is the linking group represented by Formula (2-3), and p2 is 1. Two $R^4$'s are the linking group represented by Formula (3-1). $R^3$ and two $R^{3'}$'s are the PEPE chain represented by Formula (4-1).

In the compound represented by the following Formula (T), a in Formula (1) is 2. $R^1$ and $R^6$ are the end group represented by Formula (6-1), and t is 1. $R^2$ is the linking group represented by Formula (2-1), and p1 is 1. $R^3$ is the linking group represented by Formula (2-3), and p2 is 1. Two $R^4$'s are the linking group represented by Formula (3-2) and the linking group represented by Formula (3-3). $R^3$ and two $R^{3'}$'s are the PFPE chain represented by Formula (4-1).

In the compound represented by the following Formula (U), n in Formula (1) is 2. $R^1$ and $R^6$ are the end group represented by Formula (6-1), and t is 1. $R^2$ is the linking group represented by Formula (2-1), and p1 is 2. $R^3$ is the linking group represented by Formula (2-3), and p2 is 2. Two $R^4$'s are the linking group represented by Formula (3-1). $R^3$ and two $R^{3'}$'s are the PFPE chain represented by Formula (4-1).

In the compound represented by the following Formula (V), a in Formula (1) is 2. $R^1$ and $R^6$ are the end group represented by Formula (6-1), and t is 1. $R^2$ is the linking group represented by Formula (2-2), and q1 is 2. $R^3$ is the linking group represented by Formula (2-4), and q2 is 2. Two $R^4$'s are the linking group represented by Formula (3-1). $R^3$ and two $R^{3'}$'s are the PEPE chain represented by Formula (4-1).

In the compound represented by the following Formula (W), a in Formula (1) is 2. $R^1$ is the end group represented by Formula (6-1), and t is 1. $R^2$ is a hydroxyethyl group (—CH$_2$CH$_2$OH) which is an end group having no amide bond. $R^2$ is the linking group represented by Formula (2-1), and p1 is 1. $R^3$ is the linking group represented by Formula (2-3), and p2 is 1. Two $R^4$'s are the linking group represented by Formula (3-1). $R^3$ and two $R^{3'}$'s are the PFPE chain represented by Formula (4-1).

In the compound represented by the following Formula (X), n in Formula (1) is 2. $R^1$ is the end group represented by Formula (6-1), and t is 1. $R^6$ is an allyl group which is an end group having no amide bond. $R^2$ is the linking group represented by Formula (2-1), and p1 is 1. $R^5$ is the linking group represented by Formula (2-3), and p2 is 2. Two $R^4$'s are the linking group represented by Formula (3-1). $R^3$ and two $R^{3'}$'s are the PFPE chain represented by Formula (4-1), In the compound represented by the following Formula (Y), a in Formula (1) is 2. $R^1$ and $R^6$ are the end group represented by Formula (6-1), and t is 1, $R^2$ is the linking group represented by Formula (2-1), and p1 is 1. $R^5$ is the linking group represented by Formula (2-3), and p2 is 1. Two $R^4$'s are the linking group represented by Formula (3-1). $R^3$ and two $R^{3'}$'s are the PFPE chain represented by Formula (4-2).

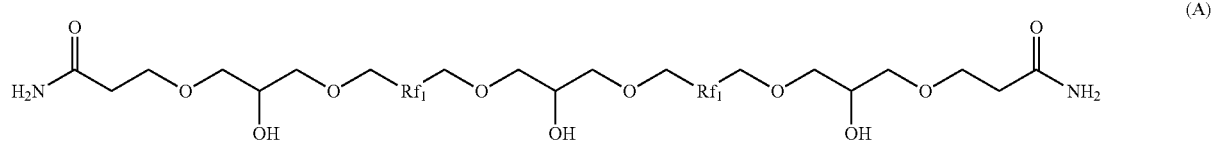
(A)

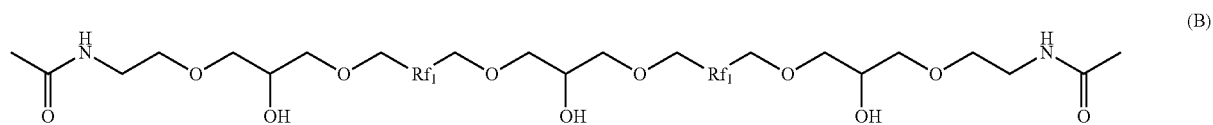
(B)

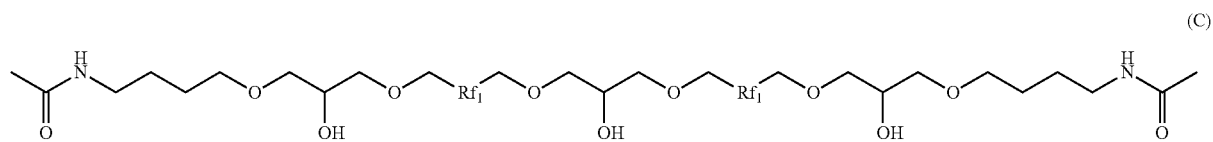
(C)

(in Formula (A), in two $Rf_1$'s, h and i indicate an average degree of polymerization, h represents 1 to 20, and i represents 0 to 20; the average degrees of polymerization of two $Rf_1$'s may be the same as or different from each other).

(in Formula (B), in two $Rf_1$'s, h and i indicate an average degree of polymerization, h represents 1 to 20, and i represents 0 to 20; the average degrees of polymerization of two $Rf_1$'s may be the same as or different from each other)

(in Formula (C), in two $Rf_1$'s, h and i indicate an average degree of polymerization, h represents 1 to 20, and i represents 0 to 20; the average degrees of polymerization of two $Rf_1$'s may be the same as or different from each other)

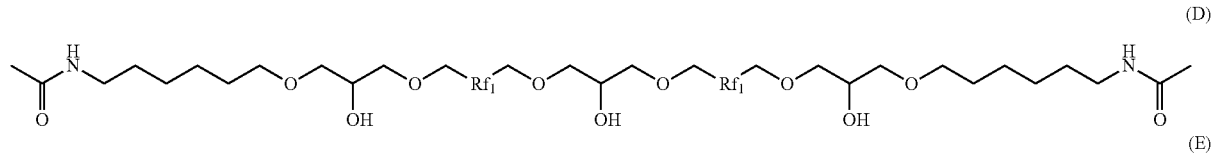
(D)

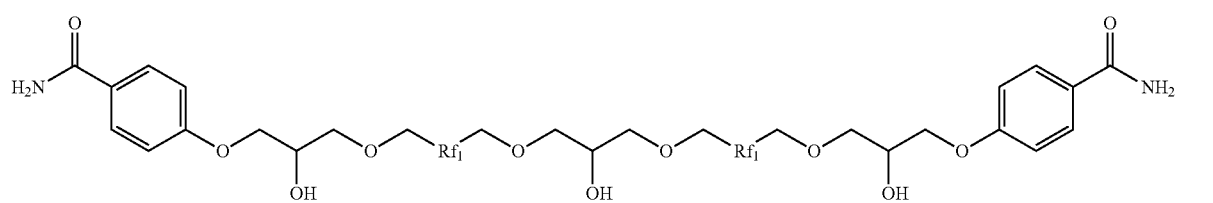
(E)

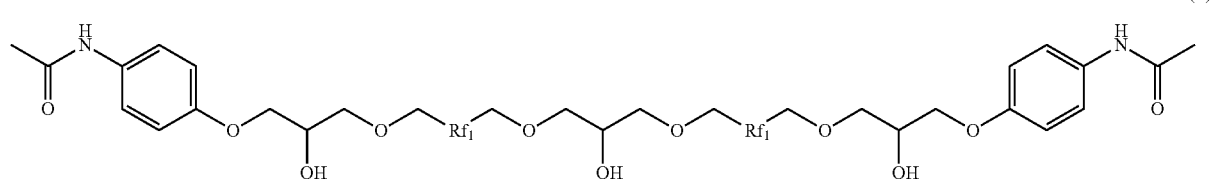
(F)

(in Formula (D), in two Rf₁'s, h and i indicate an average degree of polymerization, h represents 1 to 20, and i represents 0 to 20; the average degrees of polymerization of two Rf₁'s may be the same as or different from each other)

(in Formula (E), in two Rf₁'s, h and i indicate an average degree of polymerization, h represents 1 to 20, and i represents 0 to 20; the average degrees of polymerization of two Rf₁'s may be the same as or different from each other)

(in Formula (F), in two Rf₁'s, h and i indicate an average degree of polymerization, h represents 1 to 20, and i represents 0 to 20; the average degrees of polymerization of two Rf₁'s may be the same as or different from each other)

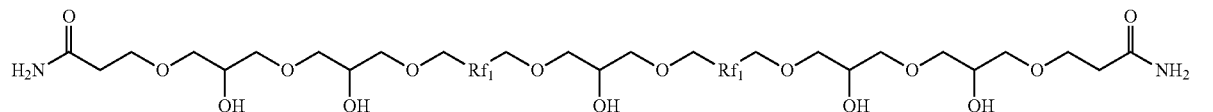

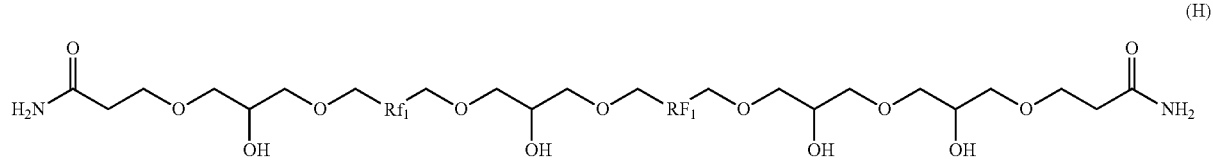

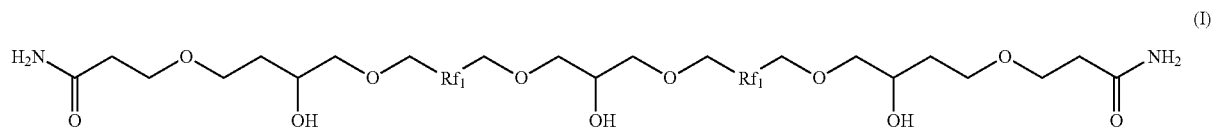

(in Formula (G), in two Rf₁'s, h and i indicate an average degree of polymerization, h represents 1 to 20, and i represents 0 to 20; the average degrees of polymerization of two Rf₁'s may be the same as or different from each other)

(in Formula (H), in two Rf₁'s, h and i indicate an average degree of polymerization, h represents 1 to 20, and i represents 0 to 20; the average degrees of polymerization of two Rf₁'s may be the same as or different from each other)

(in Formula (I), in two Rf₁'s, h and i indicate an average degree of polymerization, h represents 1 to 20, and i represents 0 to 20; the average degrees of polymerization of two Rf₁'s may be the same as or different from each other):

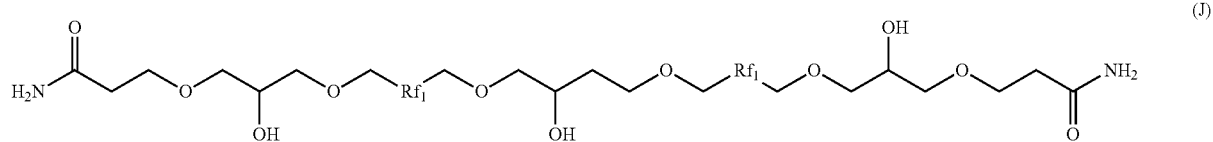

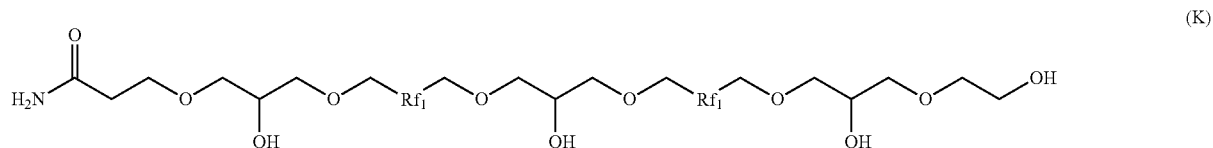

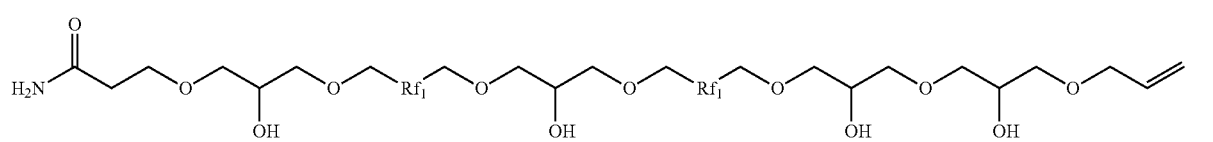

(in Formula (J), in two Rf$_1$'s, h and i indicate an average degree of polymerization, h represents 1 to 20, and i represents 0 to 20; the average degrees of polymerization of two Rf$_1$'s may be the same as or different from each other)

(in Formula (K), in two Rf$_1$'s, h and i indicate an average degree of polymerization, h represents 1 to 20, and i represents 0 to 20; the average degrees of polymerization of two Rf$_1$'s may be the same as or different from each other)

(in Formula (L), in two Rf$_1$'s, h and i indicate an average degree of polymerization, h represents 1 to 20 and i represents 0 to 20; the average degrees of polymerization of two Rf$_1$'s may be the same as or different from each ether)

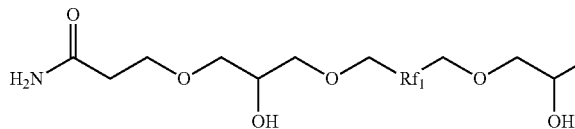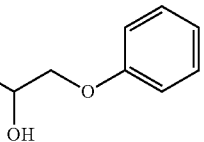

(M)

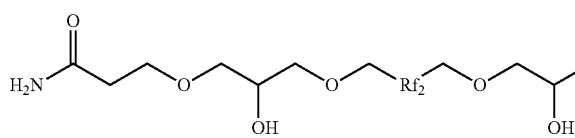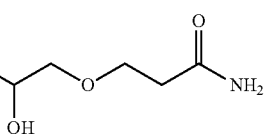

(N)

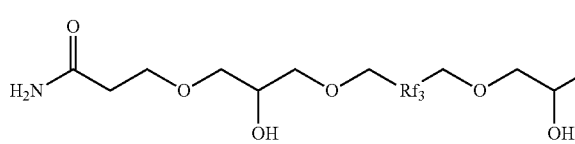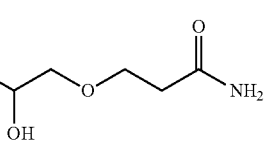

(O)

(in Formula (M), in two Rf$_1$'s, h and i indicate an average degree of polymerization, h represents 1 to 20, and i represents 0 to 20; the average degrees of polymerization of two Rf$_1$'s may be the same as or different from each other)

(in Formula (N), in two Rf$_2$'s, j indicates an average degree of polymerization, and represents 1 to 15; the average degrees of polymerization of two Rf$_2$'s may be the same as or different from each other)

(in Formula (O), in two Rf$_3$'s, k indicates an average degree of polymerization, and represents 1 to 10; the average degrees of polymerization of two Rf$_3$'s may be the same as or different from each other.

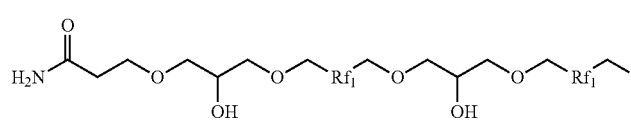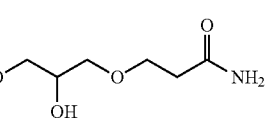

(P)

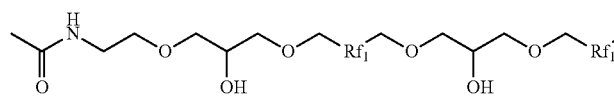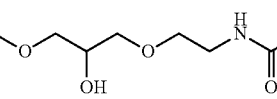

(Q)

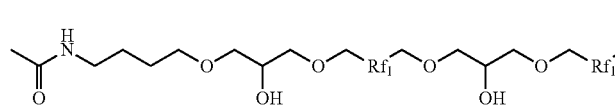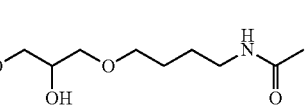

(R)

(in Formula (P), in three $Rf_1$'s, h and i indicate an average degree of polymerization, h represents 1 to 20, and i represents 0 to 20; the average degrees of polymerizations of three $Rf_1$'s may be different from each other, or the a rage degrees of polymerization of two or three $Rf_1$'s may be the same)

(in Formula (Q), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

(in Formula (R), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

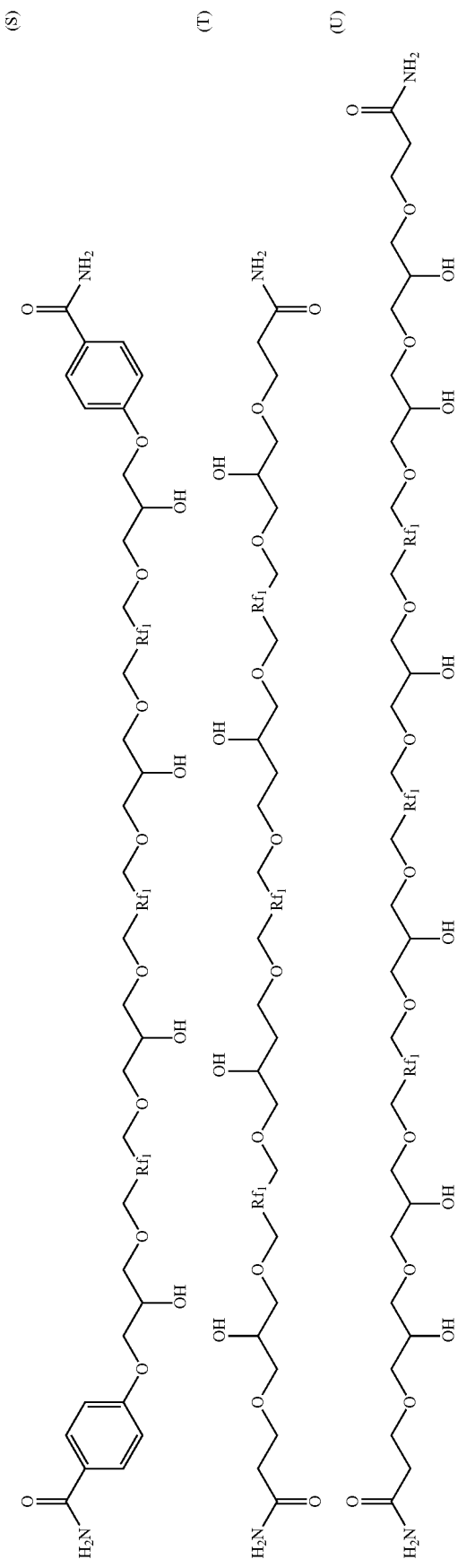

(in Formula (S), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

(in Formula (T), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

(in Formula (U), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

degrees of polymerization of three $Rf_2$'s may be different from each other, or the average degrees of polymerization of two or three $Rf_2$'s may be the same)

The number-average molecular weight (Mn) of the fluorine-containing ether compound of the present embodiment is preferably in a range of 500 to 10,000 and particularly preferably in a range of 1,000 to 5,000. When the number-average molecular weight is 500 or more, the lubricating layer composed of the lubricant containing the fluorine-containing ether compound of the present embodiment has excellent heat resistance. The number-average molecular weight of the fluorine-containing ether compound is more preferably 1,000 or more. In addition, when the number-average molecular weight is 10,000 or less, the viscosity of the fluorine-containing ether compound becomes appropriate, and when a lubricant containing it is applied, a lubricating layer with a thin film thickness can be easily formed. The number-average molecular weight of the fluorine-con-

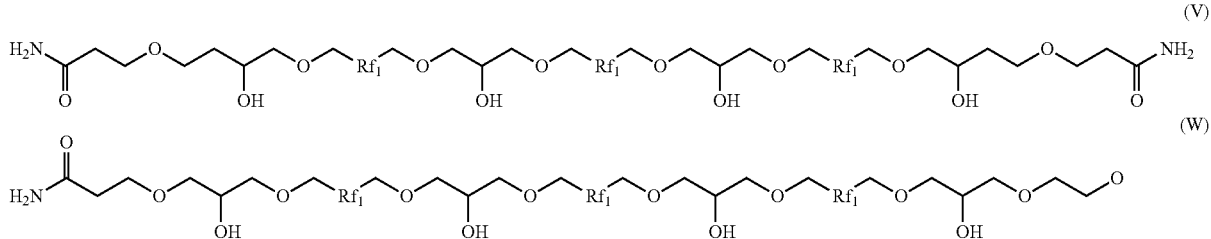

(in Formula (V), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

(in Formula (W), in three $Rf_1$'s, h and i indicate an average degree of polymerization, h represents 1 to 20, and i represents 0 to 20; the average degrees of polymerizations of three $Rf_1$'s may be different from each other, or the average degrees of polymerization of two or three $Rf_1$'s may be the same)

taining ether compound is preferably 5,000 or less because the viscosity thereof becomes one that makes the lubricant easy to handle.

The number-average molecular weight (Mn) of the fluorine-containing ether compound is a value measured by $^1$H-NMR and $^{19}$F-NMR using AVANCEIII400 (commercially available from Bruker BioSpin). Specifically, the number of repeating units of the PEPE chain is calculated from the integrated value measured by $^{19}$F-NMR to obtain a number-average molecular weight. In the measurement of nuclear magnetic resonance (NMR), a sample is diluted with a hexafluorobenzene/d-acetone (4/1 v/v) solvent and mea-

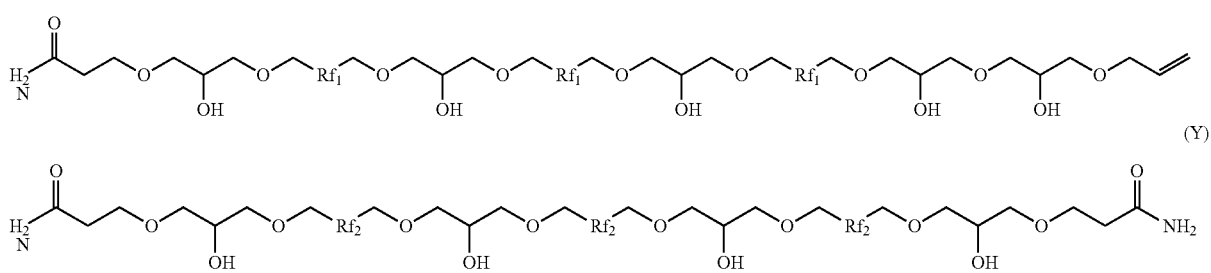

(in Formula (X), in three $Rf_1$'s, h and i indicate an average degree of polymerization, b represents 1 to 20, and i represents 0 to 20, the average degrees of polymerizations of three $Rf_1$'s may be different from each other, or the average degrees of polymerization of two or three $Rf_1$'s may be the same)

(in Formula (Y), in three $Rf_2$'s, j indicates an average degree of polymerization, and represents 1 to 15; the average surement is performed. As the $^{19}$F-NMR chemical shift reference, −164.7 ppm for the hexafluorobenzene peak is used, and as the $^1$H-NMR chemical shift reference, 2.2 ppm for the acetone peak is used.

The fluorine-containing ether compound of the present embodiment preferably has a molecular weight dispersity (ratio of the weight average molecular weight (Mw)/the number-average molecular weight (Mn)) of 1.3 or less, by molecular weight fractionation which is performed by an appropriate method.

In the present embodiment, the method for molecular weight fractionation is not particularly limited, and, for example, molecular weight fractionation using a silica gel column chromatography method, a gel permeation chromatography (GPC) method, or the like, or molecular weight fractionation using a supercritical fluid extraction method, or the like can be used.

"Production Method"

A method of producing a fluorine-containing ether compound of the present embodiment is not particularly limited, and a conventionally known production method can be used for production. The fluorine-containing ether compound of the present embodiment can be produced using, for example, the following production method.

(First Production Method)

When a compound in which, in Formula (1), n is 1, two PFPE chains represented by $R^3$ and $R^{3'}$ are the same, and $R^1$—$R^2$— and $R^6$—$R^5$— are the same is produced, the following production method can be used.

First, a fluorine compound in which a hydroxymethyl group (—$CH_2OH$) is arranged at both ends of a perfluoropolyether chain corresponding to $R^3$ and $R^{3'}$ in Formula (1) is prepared.

Next, the hydroxyl group of the hydroxymethyl group arranged at one end of the fluorine compound and the epoxy group of the epoxy compound having a group that provides $R^1$—$R^2$— (=group that provides $R^6$—$R^5$—) in Formula (1) are reacted. Therefore, a first intermediate compound having a group corresponding to $R^1$—$R^2$—(=$R^6$—$R^5$—) at one end of the perfluoropolyether chain corresponding to $R^3$(=$R^{3'}$) is obtained.

Regarding the epoxy compound having a group that provides $R^1$—$R^4$— (=group that provides $R^6$—$R^5$—) in Formula (1), for example, compounds represented by the following Formulae (7-1a) to (7-1c), (7-2a) to (7-2c), (7-3), and (7-4) can be used.

When the fluorine compound is reacted with the epoxy compound to synthesize the first intermediate compound, the hydroxyl group of the epoxy compound may be protected using an appropriate protecting group, and the fluorine compound may be then reacted.

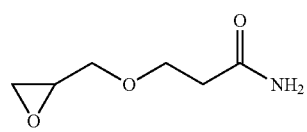
(7-1a)

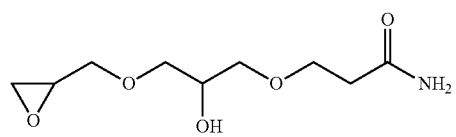
(7-1b)

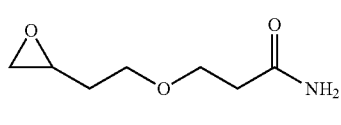
(7-1c)

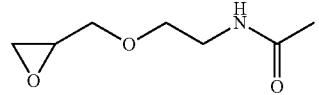
(7-2a)

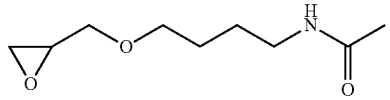
(7-2b)

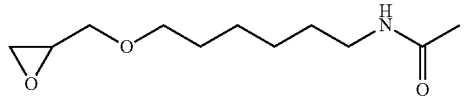
(7-2c)

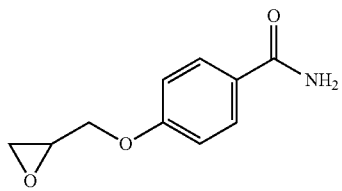
(7-3)

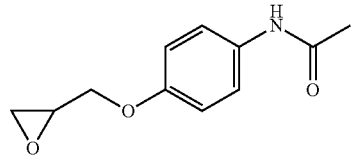
(7-4)

The epoxy compound having a group that provides $R^1$—$R^2$— (=group that provides $R^6$—$R^5$—) in Formula (1) can be produced using the following method, for example, when $R^2$ is the linking group represented by Formula (2-1), and p1 is 1 (=R$ is the linking group represented by Formula (2-3), and p2 is 1). That is, as shown in the following Formula (8), it can be produced using a method in which an alcohol having a structure (R in Formula (8)) corresponding to the end group represented by $R^1$ or $R^6$ in Formula (1) is reacted with a halogen compound having an epoxy group corresponding to $R^2$ or $R^5$.

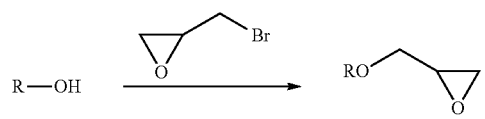
(8)

(in Formula (8), R represents a structure corresponding to the end group represented by $R^1$ or $R^6$ in Formula (1)).

In addition, the epoxy compound can be produced using the following method, for example, when $R^2$ is the linking group represented by Formula (2-1), and p1 is 2 (=$R^5$ is the linking group represented by Formula (2-3), and p2 is 2). That is, as shown in the following Formula (9), an alcohol having a structure (R in Formula (9)) corresponding to the end group represented by $R^1$ or $R^6$ in Formula (1) and allyl glycidyl ether are subjected to an addition reaction. Then, the epoxy compound can be produced using a method in which the compound obtained by the addition reaction is reacted with m-chloroperbenzoic acid (mCPBA) and oxidized.

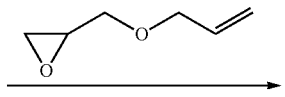
(9)

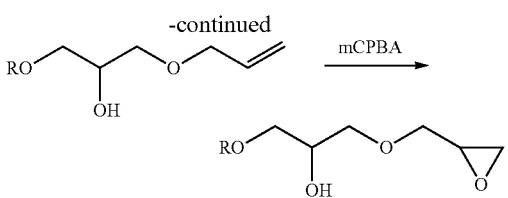

(in Formula (9), R represents a structure corresponding to the end group represented by $R^1$ or $R^6$ in Formula (1))

In addition, the epoxy compound can be produced using the following method, for example, when $R^2$ is the linking group represented by Formula (2-2), and q1 is 2 (=$R^5$ is the linking group represented by Formula (2-4), and q2 is 2). That is, as shown in the following Formula (10), an alcohol having a structure (R in Formula (10) corresponding to the end group represented by $R^1$ or $R^6$ in Formula (1) is reacted with a halogen compound having an alkenyl group corresponding to $R^2$ or $R^5$. Then, the epoxy compound can be produced using a method in which the obtained compound is reacted with m-chloroperbenzoic acid (mCPBA) to be oxidized.

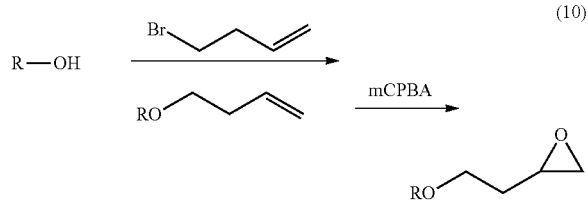

(10)

(in Formula (10), R represents a structure corresponding to the end group represented by $R^1$ or $R^6$ in Formula (1))

For the epoxy compound, a commercial product may be purchased and used.

Next, a first intermediate compound having a group corresponding to $R^1$—$R^2$— (=group corresponding to $R^6$—$R^5$—) at one end of the perfluoropolyether chain corresponding to $R^3$(=$R^{3'}$) is reacted with a halogen compound having an epoxy group corresponding to $R^4$ or a dihalogen compound having a protected hydroxyl group.

In the first production method, the following steps may be performed instead of the above step.

That is, the first intermediate compound having a group corresponding to $R^1$—$R^2$— (=group corresponding to $R^6$—$R^5$—) located at one end of the perfluoropolyether chain corresponding to $R^3$(=$R^{3'}$) is reacted with a halogen compound having an alkenyl group corresponding to $R^4$ to produce a second intermediate compound. Then, a method in which the obtained second intermediate compound is oxidized to form an epoxy compound, and the first intermediate compound is reacted with the compound may be used for production.

When the above steps are performed, a compound in which, in Formula (1), n is 1, two PFPE chains represented by $R^3$ and $R^{3'}$ are the same, and $R^1$—$R^2$— and $R^6$—$R^5$— are the same is obtained.

(Second Production Method)

When a compound in which, in Formula (1), n is 1, and any one or more of $R^1$ and $R^6$, $R^2$ and $R^5$, and two PEPE chains represented by $R^3$ and $R^{3'}$ are different from each other is produced, the following production method can be used.

In this case, in the same manner as in the first production method, a first intermediate compound having a group corresponding to $R^1$—$R^2$— at one end of the perfluoropolyether chain corresponding to $R^3$ is produced.

Next, the first intermediate compound having a group corresponding to $R^1$—$R^2$— at one end of the perfluoropolyether chain corresponding to $R^3$ is reacted with a halogen compound having an epoxy group corresponding to $R^4$ or a dihalogen compound having a protected hydroxyl group. In this way, a third intermediate compound having a group corresponding to $R^1$—$R^2$— at one end of the perfluoropolyether chain corresponding to $R^3$ and an epoxy group or a halogen group corresponding to $R^1$ at the other end is produced.

Next, in the same manner as the first intermediate compound, a fourth intermediate compound having a group corresponding to $R^6$—$R^5$— at one end of the perfluoropolyether chain corresponding to $R^{3'}$ is produced.

Then, the third intermediate compound is reacted with the fourth intermediate compound.

When the above steps are performed, it is possible to produce a compound in which, in Formula (1), n is 1, and any one or more of $R^1$ and $R^6$, $R^2$, and $R^5$, and two PFPE chains represented by $R^3$ and $R^{3'}$ are different from each other.

(Third Production Method)

When a compound in which, in Formula (1), n is 2, three PFPE chains represented by $R^3$ and two $R^{3'}$'s are the same, two linking groups represented by $R^4$ are the same, and $R^1$—$R^2$— and $R^6$—$R^5$— are the same is produced, the following production method can be used.

First, a fluorine compound in which a hydroxymethyl group (—$CH_2OH$) is arranged at both ends of the perfluoropolyether chain corresponding to the molecule center $R^{3'}$ in Formula (1) is prepared. Next, a hydroxyl group of a hydroxymethyl group arranged at both ends of the fluorine compound is reacted with a halogen compound having an epoxy group corresponding to $R^4$ (first reaction). In this way, an intermediate compound 1 having an epoxy group at both ends of the perfluoropolyether chain corresponding to the molecule center $R^{3'}$ in Formula (1) is obtained.

Next, a fluorine compound in which a hydroxymethyl group (—$CH_2OH$) is arranged at both ends of the perfluoropolyether chain corresponding to $R^3$(=$R^{3'}$ which is located on the side of $R^6$) in Formula (1) is prepared. Next, a hydroxyl group of a hydroxymethyl group arranged at one end of the fluorine compound is reacted with an epoxy compound having a group that provides $R^1$—$R^2$— (=group that provides $R^6$—$R^5$—) in Formula (I) (second reaction). In this way, an intermediate compound 2 having a group corresponding to $R^1$—$R^2$— (=group corresponding to $R^6$—$R^5$—) at one end of the perfluoropolyether chain corresponding to $R^3$(=$R^{3'}$ which is located on the side of $R^6$) is obtained.

As the epoxy compound having a group that forms $R^1$—$R^2$— (=group that forms $R^6$—$R^5$—) in Formula (1), in the same manner as in the first production method, for example, compounds represented by Formulae (7-1a) to (7-1c), (7-2a) to (7-2c), (7-3), and (7-4) can be used.

When the fluorine compound is reacted with the epoxy compound to synthesize the intermediate compound 2, the hydroxyl group of the epoxy compound may be protected using an appropriate protecting group, and the fluorine compound may be then reacted.

Then, a hydroxyl group of a hydroxymethyl group arranged at one end of the intermediate compound 2 is reacted with an epoxy group arranged at both ends of the intermediate compound 1 (third reaction).

When the above steps are performed, it is possible to produce a compound in which, in Formula (1), n is 2, three PFPE chains represented by $R^3$ and two $R^{3'}$'s are the same, two linking groups represented by $R^4$ are the same, and $R^1$—$R^2$— and $R^6$—$R^5$— are the same.

In the present embodiment, the second reaction is performed after the first reaction, but the first reaction may be performed after the second reaction, (Fourth Production Method)

When a compound in which, in Formula (1), n is 2, two linking groups represented by $R^4$ are the same, and any one or more of $R^1$ and $R^6$, $R^2$, and $R^5$, and PFPE chains represented by $R^3$ and $R^{3'}$ located on the side of $R^6$ are different from each other is produced, the following production method can be used.

First, in the same manner as in the third production method, the first reaction is performed to produce an intermediate compound 1.

Next, in the second reaction, an intermediate compound 2a having a group corresponding to $R^1$—$R^2$— at one end of the perfluoropolyether chain corresponding to $R^3$ is synthesized. In addition, in the second reaction, an intermediate compound 2b having a group corresponding to $R^6$—$R^5$— at one end of the perfluoropolyether chain corresponding to $R^{3'}$ located on the side of $R^6$ is synthesized.

Therefore, in the third reaction, the epoxy group arranged at each end of the intermediate compound 1 is sequentially reacted with the intermediate compound 2a and the intermediate compound 26.

When the above steps are performed, it is possible to produce a compound in which, in Formula (1), n is 2, two linking groups represented by $R^4$ are the same, and any one or more of $R^1$ and $R^6$, $R^2$, and $R^5$, and PEPE chains represented by $R^3$ and $R^{3'}$ located on the side of $R^6$ are different from each other.

(Fifth Production Method)

When a compound in which, in Formula (1), n is 2, three PEPE chains represented by $R^3$ and two $R^{3'}$'s are the same, two linking groups represented by $R^4$ are different from each other, and $R^1$—$R^2$— and $R^6$—$R^5$— are the same is produced, the following production method can be used.

First, in the first reaction, a fluorine compound in which a hydroxymethyl group (—$CH_2OH$) is arranged at both ends of the perfluoropolyether chain corresponding to the molecule center $R^{3'}$ in Formula (1) is prepared. Next, a hydroxyl group of a hydroxymethyl group arranged at one end of the fluorine compound is reacted with a halogen compound having an epoxy group corresponding to one of two linking groups represented by $R^4$. Subsequently, a hydroxyl group of a hydroxymethyl group arranged at the other end of the fluorine compound is reacted with a halogen compound having an epoxy group corresponding to the other of two linking groups represented by $R^4$ (first reaction). In this way, an intermediate compound 1a having an epoxy group corresponding to two linking groups represented by $R^4$ at both ends of the perfluoropolyether chain corresponding to the molecule center $R^{3'}$ in Formula (1) is obtained.

Next, the second reaction is performed in the same manner as in the third production method to produce an intermediate compound 2.

Then, a hydroxyl group of a hydroxymethyl group arranged at one end of the intermediate compound 2 is reacted with an epoxy group arranged at both ends of the intermediate compound 1a (third reaction).

When the above steps are performed, it is possible to produce a compound in which, in Formula (1), n is 2, three PEPE chains represented by $R^3$ and two $R^{3'}$'s are the same, two linking groups represented by $R^4$ are different from each other, and $R^1$—$R^2$— and $R^6$—$R^5$— are the same.

The fluorine-containing ether compound of the present embodiment is a compound represented by Formula (1) and has a skeleton in which a plurality of perfluoropolyether chains ($R^3$ and $R^{3'}$) are linked via a linking structure in which a methylene group, a divalent linking group having one polar group ($R^4$), and a methylene group are bonded in that order, and on both sides of the skeleton, a methylene group, a divalent linking group having one or more polar groups ($R^2$ and $R^5$), and an end group ($R^1$ and $R^6$) are bonded in that order. Therefore, at least one end group of $R^1$ and $R^6$ is a group in which a carbonyl carbon atom or nitrogen atom constituting an amide bond is bonded to a carbon atom of an organic group having 1 to 8 carbon atoms. Therefore, the lubricating layer formed on the protective layer using the lubricant containing the fluorine-containing ether compound of the present embodiment has favorable chemical substance resistance and wear resistance and a strong effect of inhibiting corrosion of the magnetic recording medium.

[Lubricant for Magnetic Recording Medium]

A lubricant for a magnetic recording medium of the present embodiment contains the fluorine-containing ether compound represented by Formula (1).

The lubricant of the present embodiment can be used by being mixed with a known material used as a material for the lubricant as necessary as long as the characteristics are not impaired due to the inclusion of the fluorine-containing ether compound represented by Formula (1).

Specific examples of known materials include, for example, FOMBLIN (registered trademark) ZDIAC, FOMBLIN ZDEAL, and FOMBLIN AM-2001 (all commercially available from Solvay Solexis), and Moresco A20H (commercially available from Moresco). A known material used in combination with the lubricant of the present embodiment preferably has a number-average molecular weight of 1,000 to 10,000.

When the lubricant of the present embodiment contains a material other than the fluorine-containing ether compound represented by Formula (1), the content of the fluorine-containing ether compound represented by Formula (1) in the lubricant of the present embodiment is preferably 50 mass % or more, and more preferably 70 mass % or more.

Since the lubricant of the present embodiment contains the fluorine-containing ether compound represented by Formula (1), it is possible to form a lubricating layer having excellent chemical substance resistance and wear resistance and a strong effect of inhibiting corrosion of the magnetic recording medium.

[Magnetic Recording Medium]

In a magnetic recording medium of the present embodiment, at least a magnetic layer, a protective layer, and a lubricating layer are sequentially provided on a substrate.

In the magnetic recording medium of the present embodiment, as necessary, one, or two or more underlayers can be provided between the substrate and the magnetic layer. In addition, at least one of an adhesive layer and a soft magnetic layer can be provided between the underlayer and the substrate.

The FIGURE is a schematic cross-sectional view showing a magnetic recording medium according to one embodiment of the present invention.

A magnetic recording medium 10 of the present embodiment has a structure in which an adhesive layer 12, a soft magnetic layer 13, a first underlayer 14, a second underlayer 15, a magnetic layer 16, a protective layer 17, and a lubricating layer 18 are sequentially provided on a substrate 11.

"Substrate"

As the substrate 11, for example, a non-magnetic substrate in which a film made of NiP or a NiP alloy is formed on a base made of a metal or an alloy material such as Al or an Al alloy can be used.

In addition, as the substrate 11, a non-magnetic substrate made of a non-metal material such as glass, a ceramic, silicon, silicon carbide, carbon, and a resin may be used, or a non-magnetic substrate in which a film made of NiP or a NiP alloy is formed on a base of these non-metal materials may be used.

"Adhesive Layer"

The adhesive layer 12 prevents the progress of corrosion of the substrate 11 that occurs when the substrate 11 and the soft magnetic layer 13 which is provided on the adhesive layer 12 are arranged in contact with each other.

The material of the adhesive layer 12 can be appropriately selected from among, for example, Cr, a Cr alloy, Ti, a Ti alloy, CrTi, NiAl, and an AlRu alloy. The adhesive layer 12 can be formed by, for example, a sputtering method.

"Soft Magnetic Layer"

The soft magnetic layer 13 preferably has a structure in which a first soft magnetic film, an intermediate layer made of a Ru film, and a second soft magnetic film are sequentially laminated. That is, the soft magnetic layer 13 preferably has a structure in which an intermediate layer made of a Ru film is interposed between two soft magnetic film layers, and thus, the soft magnetic films above and below the intermediate layer are bonded by anti-ferromagnetic coupling (AFC).

Examples of materials of the first soft magnetic film and the second soft magnetic film include a CoZrTa alloy and a CoFe alloy.

It is preferable to add any of Zr, Ta, and Nb to the CoFe alloy used for the first soft magnetic film and the second soft magnetic film. Thereby, the amorphization of the first soft magnetic film and the second soft magnetic film is promoted. As a result, the orientation of the first underlayer (seed layer) can be improved, and the floating height of the magnetic head can be reduced.

The soft magnetic layer 13 can be formed by, for example, a sputtering method.

"First Underlayer"

The first underlayer 14 is a layer that controls the orientations and the crystal sizes of the second underlayer 15 and the magnetic layer 16 provided thereon.

Examples of the first underlayer 14 include a Cr layer, a Ta layer, a Ru layer, a CrMo alloy layer, a CoW alloy layer, a CrW alloy layer, a CrV alloy layer, and a CrTi alloy layer.

The first underlayer 14 can be formed by, for example, a sputtering method.

"Second Underlayer"

The second underlayer 15 is a layer that controls the orientation of the magnetic layer 16 such that it becomes favorable. The second underlayer 15 is preferably a layer made of Ru or a Ru alloy.

The second underlayer 15 may be a single layer or may be composed of a plurality of layers. When the second underlayer 15 is composed of a plurality of layers, all of the layers may be composed of the same material, or at least one layer may be composed of a different material.

The second underlayer 15 can be formed by, for example, a sputtering method.

"Magnetic Layer"

The magnetic layer 16 is made of a magnetic film in which the axis of easy magnetization is in a direction perpendicular or horizontal to the surface of the substrate.

The magnetic layer 16 is a layer containing Co and Pt. The magnetic layer 16 may be a layer containing an oxide, Cr, B, Cu, Ta, Zr, or the like in order to improve SNR characteristics.

Examples of oxides contained in the magnetic layer 16 include $SiO_2$, SiO, $Cr_2O_3$, CoO, $Ta_2O_3$, and $TiO_2$.

The magnetic layer 16 may be composed of a single layer or may be composed of a plurality of magnetic layers made of materials with different compositions.

For example, when the magnetic layer 16 is composed of three layers including a first magnetic layer, a second magnetic layer, and a third magnetic layer sequentially laminated from below, the first magnetic layer preferably has a granular structure made of a material containing Co, Cr, and Pt, and further containing an oxide. As the oxide contained in the first magnetic layer, for example, it is preferable to use an oxide of Cr, Si, Ta, Al, Ti, Mg, Co, or the like. Among these, particularly, $TiO_2$, $Cr_2O_3$, $SiO_2$, or the like can be preferably used. In addition, the first magnetic layer is preferably made of a composite oxide in which two or more oxides are added. Among these, particularly, $Cr_2O_3$—$SiO_2$, $Cr_2O_3$—$TiO_2$, $SiO_2$—$TiO_2$, or the like can be preferably used.

The first magnetic layer can contain one or more elements selected from among B, Ta, Mo, Ca, Nd, W, Nb, Sm, Tb, Ru, and Re in addition to Co, Cr, Pt, and an oxide. For the second magnetic layer, the same material as for the first magnetic layer can be used. The second magnetic layer preferably has a granular structure.

The third magnetic layer preferably has a non-granular structure made of a material containing Co, Cr, and Pt, and not containing an oxide. The third magnetic layer can contain one or more elements selected from among B, Ta, Mo, Cu, Nd, W, Nb, Sm, Tb, Ru, Re, and Mn in addition to Co, Cr, and Pt.

When the magnetic layer 16 is formed of a plurality of magnetic layers, it is preferable to provide a non-magnetic layer between adjacent magnetic layers. When the magnetic layer 16 is composed of three layers including a first magnetic layer, a second magnetic layer, and a third magnetic layer, it is preferable to provide a non-magnetic layer between the first magnetic layer and the second magnetic layer and between the second magnetic layer and the third magnetic layer.

For the non-magnetic layer provided between adjacent magnetic layers of the magnetic layer 16, for example, Ru, a Ru alloy, a CoCr alloy, a CoCrX1 alloy (X1 represents one, or two or more elements selected from among Pt, Ta, Zr, Re, Ru, Co, No, Ni, Mn, Ge, Si, O, N, W, Mo, Ti, V, and B), or the like can be preferably used.

For the non-magnetic layer provided between adjacent magnetic layers of the magnetic layer 16, it is preferable to use an alloy material containing an oxide, a metal nitride, or a metal carbide. Specifically, as the oxide, for example, $SiO_2$, $Al_2O_3$, $Ta_2O_3$, $Cr_2O_3$, MgO, $Y_2O_3$, $TiO_2$, or the like can be used. As the metal nitride, for example, AlN, $Si_3Na_4$, TaN, CrN, or the like can be used. As the metal carbide, for example, TaC, BC, SiC, or the like can be used.

The non-magnetic layer can be formed by, for example, a sputtering method.

The magnetic layer 16 is preferably a magnetic layer for perpendicular magnetic recording in which the axis of easy magnetization is in a direction perpendicular to the surface of the substrate in order to realize a higher recording density. The magnetic layer 16 may be a magnetic layer for in-plane magnetic recording.

The magnetic layer 16 may be formed by any conventionally known method such as a vapor deposition method, an ion beam sputtering method, and a magnetron sputtering method. The magnetic layer 16 is generally formed by a sputtering method.

"Protective Layer"

The protective layer 17 protects the magnetic layer 16. The protective layer 17 may be composed of one layer or may be composed of a plurality of layers. As the protective layer 17, a carbon-based protective layer can be preferably used, and an amorphous carbon protective layer is particularly preferable. When the protective layer 17 is a carbon-based protective layer, this is preferable because the interaction with the polar group (particularly the hydroxyl group) contained in the fluorine-containing ether compound in the lubricating layer 18 is further improved.

The adhesive force between the carbon-based protective layer and the lubricating layer 18 can be controlled by forming the carbon-based protective layer with hydrogenated carbon and/or nitrogenated carbon and adjusting the hydrogen content and/or nitrogen content in the carbon-based protective layer. The hydrogen content in the carbon-based protective layer measured by a hydrogen forward scattering method (HFS) is preferably 3 atom % to 20 atom %. In addition, the nitrogen content in the carbon-based protective layer measured through X-ray photoelectron spectroscopy (XPS) is preferably 4 atom % to 15 atom %.

Hydrogen and/or nitrogen contained in the carbon-based protective layer need not be uniformly contained through the entire carbon-based protective layer. For example, the carbon-based protective layer is preferably formed as a composition gradient layer in which nitrogen is contained in the protective layer 17 on the side of the lubricating layer 18 and hydrogen is contained in the protective layer 17 on the side of the magnetic layer 16. In this case, the adhesive force between the magnetic layer 16 and the lubricating layer 18, and the carbon-based protective layer is further improved.

The film thickness of the protective layer 17 is preferably 1 nm to 7 nm. When the film thickness of the protective layer 17 is 1 nm or more, the performance of the protective layer 17 can be sufficiently obtained. The film thickness of the protective layer 17 is preferably 7 nm or less in order to reduce the thickness of the protective layer 17.

As a film formation method for the protective layer 17, a sputtering method using a target material containing carbon, a chemical vapor deposition method (CVD) using a hydrocarbon raw material such as ethylene or toluene, an ion beam deposition (IBD) method, or the like can be used.

When a carbon-based protective layer is formed as the protective layer 17, for example, a film can be formed by a DC magnetron sputtering method. Particularly, when a carbon-based protective layer is formed as the protective layer 17, it is preferable to form an amorphous carbon protective layer by a plasma CVD method. The amorphous carbon protective layer formed by the plasma CVD method has uniform surfaces and low roughness.

"Lubricating Layer"

The lubricating layer 18 prevents contamination of the magnetic recording medium 10. In addition, the lubricating layer 18 reduces a frictional force of a magnetic head of a magnetic recording and reproducing device, which slides on the magnetic recording medium 10, and improves the durability of the magnetic recording medium 10.

As shown in the FIGURE, the lubricating layer 18 is formed on and in contact with the protective layer 17. The lubricating layer 18 is formed by applying the lubricant for a magnetic recording medium according to the embodiment described above to the protective layer 17. Therefore, the lubricating layer 18 contains the above fluorine-containing ether compound.

When the protective layer 17 arranged below the lubricating layer 18 is a carbon-based protective layer, particularly, the lubricating layer 18 is bonded to the protective layer 17 with a high bonding force. As a result, even if the thickness of the lubricating layer 18 is thin, it is easy to obtain the magnetic recording medium 10 in which the surface of the protective layer 17 is covered at a high coating rate, and it is possible to effectively prevent contamination of the surface of the magnetic recording medium 10.

The average film thickness of the lubricating layer 18 is preferably 0.5 nm (5 Å) to 2.0 mm (20 Å) and more preferably 0.5 nm (5 Å) to 1.2 nm (12 Å). When the average film thickness of the lubricating layer 18 is 0.5 mm or more, the lubricating layer 18 is formed with a uniform film thickness without forming an island shape or a mesh shape. Therefore, the surface of the protective layer 17 can be coated with the lubricating layer 18 at a high coating rate. In addition, when the average film thickness of the lubricating layer 18 is 2.0 nm or less, the lubricating layer 18 can be made sufficiently thin, and the floating height of the magnetic head can be sufficiently reduced.

"Method of Forming Lubricating Layer"

In order to form the lubricating layer 18, for example, a method in which a magnetic recording medium is prepared during production in which respective layers up to the protective layer 17 are formed on the substrate 11, and a lubricating layer forming solution is applied onto the protective layer 17 may be used.

The lubricating layer forming solution can be obtained by dispersing and dissolving the lubricant for a magnetic recording medium of the embodiment described above in a solvent as necessary, and adjusting the viscosity and concentration thereof to be suitable for application methods.

Examples of solvents used for the lubricating layer forming solution include fluorine-based solvents such as Vertrel (registered trademark) XF (product name, commercially available from Du Pont-Mitsui Fluorochemicals Co., Ltd.).

The method of applying the lubricating layer forming solution is not particularly limited, and examples thereof include a spin coating method, a spraying method, a paper coating method, and a dipping method.

When the dipping method is used, for example, the following method can be used. First, the substrate 11 in which respective layers up to the protective layer 17 are formed is immersed in the lubricating layer forming solution contained in an immersion tank of a dip coating device. Next, the substrate 11 is lifted from the immersion tank at a predetermined speed. In this way, the lubricating layer forming solution is applied to the surface of the protective layer 17 of the substrate 11.

When the dipping method is used, the lubricating layer forming solution can be uniformly applied to the surface of the protective layer 17, and the lubricating layer 18 with a uniform film thickness can be formed on the protective layer 17.

In the present embodiment, the substrate 11 in which the lubricating layer 18 is formed is preferably subjected to a thermal treatment. When the thermal treatment is performed, the adhesion between the lubricating layer 18 and the protective layer 17 is improved, and the adhesive force between the lubricating layer 18 and the protective layer 17 is improved.

The thermal treatment temperature is preferably 100° C. to 180° C., and more preferably 100° C. to 160° C. When the thermal treatment temperature is 100° C. or higher, an effect of improving the adhesion between the lubricating layer 18 and the protective layer 17 is sufficiently obtained. In addition, when the thermal treatment temperature is 180° C. or lower, it is possible to prevent thermal decomposition of the lubricating layer 18 due to the thermal treatment. The thermal treatment time can be appropriately adjusted according to the thermal treatment temperature, and is preferably 10 minutes to 120 minutes, In the present embodiment, in order to further improve the adhesive force of the lubricating layer 18 with respect to the protective layer 17, an ultraviolet ray (UV) emitting treatment may be performed on the lubricating layer 18 before the thermal treatment or after the thermal treatment.

In the magnetic recording medium 10 of the present embodiment, at least the magnetic layer 16, the protective layer 17, and the lubricating layer 18 are sequentially provided on the substrate 11. In the magnetic recording medium 10 of the present embodiment, the lubricating layer 18 containing the above fluorine-containing ether compound is formed on and in contact with the protective layer 17. The lubricating layer 18 has excellent adhesion, favorable chemical substance resistance and wear resistance, and a strong effect of inhibiting corrosion of the magnetic recording medium even if the film thickness is thin. Therefore, the magnetic recording medium 10 of the present embodiment has excellent reliability, and particularly has an excellent silicon contamination minimization ability and durability. Therefore, the magnetic recording medium 10 of the present embodiment can have a small floating height of the magnetic head (for example, 10 nm or less), and operates stably for a long period of time even in a harsh environment due to diversity of applications. Therefore, the magnetic recording medium 10 of the present embodiment is particularly preferable as a magnetic disk mounted in a load/unload (LUL) type magnetic disk device.

EXAMPLES

Hereinafter, the present invention will be described in more detail with reference to examples and comparative examples. Here, the present invention is not limited only to the following examples.

Example 1

A compound represented by Formula (A) was obtained by the following method.

20 g of a compound (a number-average molecular weight of 700 and a molecular weight distribution of 1.1) represented by $HOCH_2CF_2O(CF_2CF_2O)_h(CF_2O)_iCF_2CH_2OH$ (in the formula, h indicating an average degree of polymerization is 3.2 and i indicating an average degree of polymerization is 3.2), 4.15 g of the compound represented by Formula (7-1a), and 20 ml of t-butanol were put into a 100 mL eggplant flask under a nitrogen gas atmosphere, and stirred until they became uniform at room temperature to form a mixture. 1.60 g of potassium tert-butoxide was added to the mixture, and the mixture was stirred at 70° C. for 16 hours and reacted.

Here, the compound represented by Formula (7-1a) was synthesized by reacting 3-hydroxypropanamide and epibromohydrin.

The reaction product obtained after the reaction was returned to room temperature, transferred into a separatory funnel containing 100 mL of water, and extracted three times with 100 mL of ethyl acetate. The organic layer thereof was washed with water and dehydrated with anhydrous sodium sulfate. After the drying agent was removed by filtration, the filtrate was concentrated, and the residue was purified through silica gel column chromatography to obtain 8.69 g of a compound represented by the following Formula (15) as an intermediate.

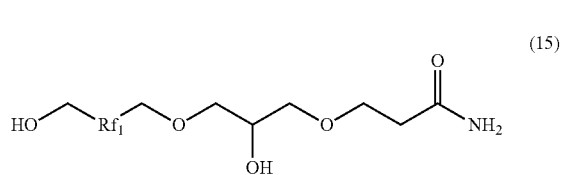

(in Formula (15), $Rf_1$ is a PFPE chain represented by Formula (4-1), in $Rf_1$, h indicating an average degree of polymerization represents 3.2 and i indicating an average degree of polymerization represents 3.2)

Next, 8.69 g of the compound represented by Formula (15), which is the intermediate obtained above, 0.845 g of epibromohydrin, and 10 mL of t-butanol were put into a 100 mL eggplant flask under a nitrogen gas atmosphere, and stirred until the mixture became uniform at room temperature. 0.92 g of potassium tert-butoxide was added to this uniform solution, and the mixture was stirred at 70° C. for 23 hours and reacted.

The reaction solution obtained after the reaction was returned to room temperature, transferred into a separatory funnel containing 100 mL of water, and extracted three times with 100 ml of ethyl acetate. The organic layer thereof wax washed with water and dehydrated with anhydrous sodium sulfate. After the drying agent was removed by filtration, the filtrate was concentrated, and the residue was purified through silica gel column chromatography to obtain 5.74 g of a compound (A) (in Formula (A), $Rf_1$ is a PFPE chain represented by Formula (4-1), and in two $Rf_1$'s, h indicating an average degree of polymerization represents 3.2 and i indicating an average degree of polymerization represents 3.2).

$^1$H-NMR and $^{19}$F-NMR measurement of the obtained compound (A) were performed, and the structure was identified from the following results.

$^1$H-NMR (acetone-$D_6$): δ [ppm]=1.90-2.05 (4H), 3.40-4.00 (22H), 4.10-4.20 (8H), 6.30-6.70 (4H)

$^{19}$F-NMR (acetone-$D_6$): δ [ppm]=−55.5 to −51.5 (13F), −78.5 (4F), −80.5 (4F), −91.0 to −88.5 (26F)

Example 2

A compound represented by Formula (B) was obtained by the following method.

5.89 g of the compound (B) (in Formula (B), $Rf_1$ is a PFPE chain represented by Formula (4-1), and in two $Rf_1$'s, h indicating an average degree of polymerization represents 3.2 and i indicating an average degree of polymerization represents 3.2) was obtained in the same operation as in Example 1 except that the compound represented by Formula (7-2a) was used instead of the compound represented by Formula (7-1a) in Example 1.

Here, the compound represented by Formula (7-2a) was synthesized by reacting N-(2-hydroxyethyl) acetamide and epibromohydrin.

$^1$H-NMR and $^{19}$F-NMR measurement of the obtained compound (B) were performed, and the structure was identified from the following results.

$^1$H-NMR (acetone-D$_6$): δ [ppm]=1.90-2.05 (6H), 3.40-4.00 (26H), 4.10-4.20 (8H), 6.30-6.5 (2H)

$^{19}$F-NMR (acetone-D$_6$): δ [ppm]=−55.5 to −51.5 (13F), −78.5 (4F), −80.5 (4F), −91.0 to −88.5 (26F)

Example 3

A compound represented by Formula (C) was obtained by the following method.

6.08 g of the compound (C) (in Formula (C), Rf$_1$ is a PFPE chain represented by Formula (4-1), and in two Rf$_1$'s, h indicating an average degree of polymerization represents 3.2 and i indicating an average degree of polymerization represents 3.2) was obtained in the same operation as in Example 1 except that the compound represented by Formula (7-2b) was used instead of the compound represented by Formula (7-1a) in Example 1.

Here, the compound represented by Formula (7-2b) was synthesized by reacting an intermediate obtained by reacting 4-aminobutanol and acetyl chloride, and epibromohydrin.

$^1$H-NMR and $^{19}$F-NMR measurement of the obtained compound (C) were performed, and the structure was identified from the following results.

$^1$H-NMR (acetone-D$_6$): δ [ppm]=1.20-1.80 (8H), 3.40-4.00 (26H), 4.10-4.20 (8H), 6.30-6.50 (2H)

$^{19}$F-NMR (acetone-D$_6$): δ [ppm]=−55.5 to −51.5 (13F), −78.5 (4F), −80.5 (4F), −91.0 to −88.5 (26F)

Example 4

A compound represented by Formula (D) was obtained by the following method.

6.28 g of the compound (D) (in Formula (D), Rf$_1$ is a PEPE chain represented by Formula (4-1), and in two Rf$_1$'s, h indicating an average degree of polymerization represents 3.2 and i indicating an average degree of polymerization represents 3.2) was obtained in the same operation as in Example 1 except that the compound represented by Formula (7-2c) was used instead of the compound represented by Formula (7-1a) in Example 1.

Here, the compound represented by Formula (7-2c) was synthesized by reacting an intermediate obtained by reacting 6-aminohexanol and acetyl chloride, and epibromohydrin.

$^1$H-NMR and $^{19}$F-NMR measurement of the obtained compound (D) were performed, and the structure was identified from the following results.

$^1$H-NMR (acetone-D$_6$): δ [ppm]=1.20-1.80 (16H), 3.40-4.00 (26H), 4.10-4.20 (8H), 6.30-6.50 (2H)

$^{19}$F-NMR (acetone-D$_6$): δ [ppm]=−55.5 to −51.5 (13F), −78.5 (4F), −80.5 (4F), −91.0 to −88.5 (26F)

Example 5

A compound represented by Formula (5) was obtained by the following method.

6.14 g of the compound (E) (in Formula (E), Rf$_1$ is a PFPE chain represented by Formula (4-1), and in two Rf$_1$'s, h indicating an average degree of polymerization represents 3.2 and i indicating an average degree of polymerization represents 3.2) was obtained in the same operation as in Example 1 except that the compound represented by Formula (7-3) was used instead of the compound represented by Formula (7-1a) in Example 1.

Here, the compound represented by Formula (7-3) was synthesized by reacting 4-hydroxybenzamide and epibromohydrin.

$^1$H-NMR and $^{19}$F-NMR measurement of the obtained compound (E) were performed, and the structure was identified from the following results.

$^1$H-NMR (acetone-D$_6$): δ [ppm]=3.40-4.00 (18H), 4.10-4.20 (8H), 6.30-6.70 (4H), 7.30-7.80 (8H)

$^{19}$F-NMR (acetone-D$_6$): δ [ppm]=−55.5 to −51.5 (13F), −78.5 (4F), −80.5 (4F), −91.0 to −88.5 (26F)

Example 6

A compound represented by Formula (F) was obtained by the following method.

6.09 g of the compound (F) (in Formula (F), Rf$_1$ is a PFPE chain represented by Formula (4-1), and in two Rf$_1$'s, h indicating an average degree of polymerization represents 3.2 and i indicating an average degree of polymerization represents 3.2) was obtained in the same operation as in Example 1 except that the compound represented by Formula (7-4) was used instead of the compound represented by Formula (7-1a) in Example 1.

Here, the compound represented by Formula (7-4) was synthesized by reacting N-(4-hydroxyphenyl) acetamide and epibromohydrin.

$^1$H-NMR and $^{19}$F-NMR measurement of the obtained compound (F) were performed, and the structure was identified from the following results.

$^1$H-NMR (acetone-D$_6$): δ [ppm]=1.90-2.05 (6H), 3.40-4.00 (18H), 4.10-4.20 (8H), 6.30-6.50 (2H), 7.30-7.80 (8H)

$^{19}$F-NMR (acetone-D$_6$): δ [ppm]=−55.5 to −51.5 (13F), −78.5 (4F), −80.5 (4F), −91.0 to −88.5 (26F)

Example 7

A compound represented by Formula (G) was obtained by the following method.

5.95 g of the compound (G) (in Formula (G), Rf$_1$ is a PFPE chain represented by Formula (4-1), and in two Rf$_1$'s, b indicating an average degree of polymerization represents 3.2 and i indicating an average degree of polymerization represents 3.2) was obtained in the same operation as in Example 1 except that the compound represented by Formula (7-1b) was used instead of the compound represented by Formula (7-1a) in Example 1.

Here, the compound represented by Formula (7-1b) was synthesized by reacting an intermediate obtained by reacting 3-hydroxypropanamide and allyl glycidyl ether, and m-chloroperbenzoic acid.

$^1$H-NMR and $^{19}$F-NMR measurement of the obtained compound (G) were performed, and the structure was identified from the following results.

$^1$H-NMR (acetone-D$_6$): δ [ppm]=1.90-2.05 (4H), 3.40-4.00 (34H), 4.10-4.20 (8H), 6.30-6.70 (4H)

$^{19}$F-NMR (acetone-D$_6$): δ [ppm]=−55.5 to −51.5 (13F), −78.5 (4F), −80.5 (4F), −91.0 to −88.5 (26F)

Example 8

A compound represented by Formula (H) was obtained by the following method.

The compound represented by Formula (15), which was the intermediate of Example 1, and epibromohydrin were reacted to obtain a compound represented by Formula (16) as an intermediate.

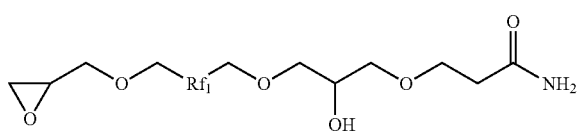

(in Formula (16), $Rf_1$ is a PFPE chain represented by Formula (4-1), in $Rf_1$, h indicating an average degree of polymerization represents 3.2 and i indicating an average degree of polymerization represents 3.2)

Next, 4.23 g of the compound represented by Formula (16), which is the intermediate obtained above, 4.15 g of the compound represented by the following Formula (17), which is the intermediate in Example 7, and 10 mL of t-butanol were put into a 100 mL eggplant flask under a nitrogen gas atmosphere, and stirred until the mixture became uniform at room temperature. 0.92 g of potassium tert-butoxide was added to this uniform solution, and the mixture was stirred at 70° C. for 23 hours and reacted.

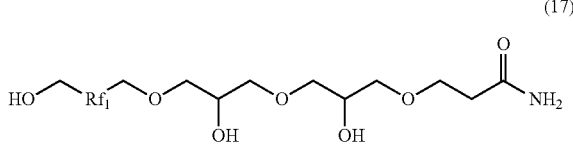

(in Formula (17), $Rf_1$ is a PFPE chain represented by Formula (4-1), in $Rf_1$, h indicating an average degree of polymerization represents 3.2 and i indicating an average degree of polymerization represents 3.2)

The reaction solution obtained after the reaction was returned to room temperature, transferred into a separatory funnel containing 100 mL of water, and extracted three times with 100 mL of ethyl acetate. The organic layer thereof was washed with water and dehydrated with anhydrous sodium sulfate. After the drying agent was removed by filtration, the filtrate was concentrated, and the residue was purified through silica gel column chromatography to obtain 4.52 g of a compound (H) (in Formula (H), $Rf_1$ is a PEPE chain represented by Formula (4-1), and in two $Rf_1$'s, h indicating an average degree of polymerization represents 3.2 and i indicating an average degree of polymerization represents 3.2).

$^1$H-NMR and $^{19}$F-NMR measurement of the obtained compound (H) were performed, and the structure was identified from the following results.

$^1$H-NMR (acetone-$D_6$): δ [ppm]=1.90-2.05 (4H), 3.40-4.00 (28H), 4.10-4.20 (8H), 6.30-6.70 (4H)

$^{19}$F-NMR (acetone-$D_6$): δ [ppm]=−55.5 to −51.5 (13F), −78.5 (4F), −80.5 (4F), −91.0 to −88.5 (26F)

Example 9

A compound represented by Formula (I) was obtained by the following method.

6.02 g of the compound (1) (in Formula (I), $Rf_1$ is a PFPE chain represented by Formula (4-1), and in two $Rf_1$'s, h indicating an average degree of polymerization represents 3.2 and i indicating an average degree of polymerization represents 3.2) was obtained in the same operation as in Example 1 except that the compound represented by Formula (7-1e) was used instead of the compound represented by Formula (7-1a) in Example 1.

Here, the compound represented by Formula (7-1c) was synthesized by reacting an intermediate obtained by reacting 3-hydroxypropanamide and 4-bromo-1-butene, and m-chloroperbenzoic acid.

$^1$H-NMR and $^{19}$F-NMR measurement of the obtained compound (I) were performed, and the structure was identified from the following results.

$^1$H-NMR (acetone-$D_6$): δ [ppm]=1.20-1.80 (4H), 1.90-2.05 (4H), 3.40-4.00 (22H), 4.10-4.20 (8H), 6.30-6.70 (4H)

$^{19}$F-NMR (acetone-$D_6$): δ [ppm]=−55.5 to −51.5 (13F), −78.5 (4F), −80.5 (4F), −91.0 to −88.5 (26F)

Example 10

A compound represented by Formula (J) was obtained by the following method.

The compound represented by Formula (15), which was the intermediate of Example 1, and 4-bromo-1-butene were reacted and then reacted with m-chloroperbenzoic acid to obtain a compound represented by the following Formula (18) as an intermediate.

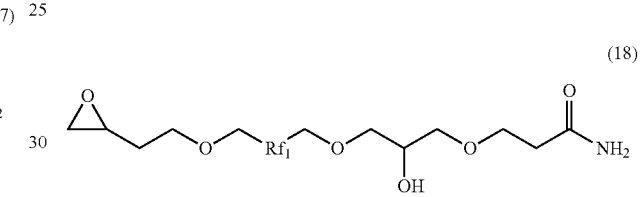

(in Formula (18), $Rf_1$ is a PFPE chain represented by Formula (4-1). In $Rf_1$, h indicating an average degree of polymerization represents 3.2 and i indicating an average degree of polymerization represents 3.2)

5.89 g of the compound (J) (in Formula (J), $Rf_1$ is a PFPE chain represented by Formula (4-1), and in two $Rf_1$'s, h indicating an average degree of polymerization represents 3.2 and i indicating an average degree of polymerization represents 3.2) was obtained in the same operation as in Example 8 except that the compound represented by Formula (18) was used instead of the compound represented by Formula (16) in Example 8, and the compound represented by Formula (15) was used instead of the compound represented by Formula (17).

$^1$H-NMR and $^{19}$F-NMR measurement of the obtained compound (J) were performed, and the structure was identified from the following results.

$^1$H-NMR (acetone-$D_6$): δ [ppm]=1.20-1.80 (2H), 1.90-2.05 (4H), 3.40-4.00 (22H), 4.10-4.20 (8H), 6.30-6.70 (4H)

$^{19}$F-NMR (acetone-$D_6$): δ [ppm]=−55.5 to −51.5 (13F), −78.5 (4F), −80.5 (4F), −91.0 to −88.5 (26F)

Example 11

A compound represented by Formula (K) was obtained by the following method.

14 g of a compound (a number-average molecular weight of 700 and a molecular weight distribution of 1.1) represented by $HOCH_2CF_2O(CF_2CF_2O)_h(CF_2O)_iCF_2CH_2OH$ (in the formula, h indicating an average degree of polymerization is 3.2 and i indicating an average degree of polymerization is 3.2), 2.4 g of a compound represented by the following Formula (19), and 14 mL of t-butanol were put into a 200 mL eggplant flask under a nitrogen gas atmosphere, and stirred until the mixture became uniform at room temperature. 0.45 g of potassium tert-butoxide was added to this uniform solution, and the mixture was stirred at 70° C. for 16 hours and reacted.

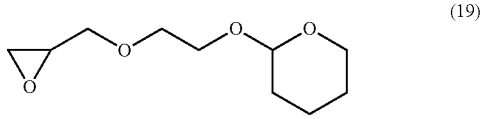 [SMILES: C1CCC(OCCOCC2CO2)OC1]

(19)

A compound represented by Formula (19) was synthesized by oxidizing a compound in which ethylene glycol monoallyl ether was protected using dihydropyran.

The reaction product obtained after the reaction was cooled to 25° C., transferred into a separatory funnel containing 100 ml of water, and extracted three times with 100 mL of ethyl acetate. The organic layer thereof was washed with water and dehydrated with anhydrous sodium sulfate. After the drying agent was removed by filtration, the filtrate was concentrated, and the residue was purified through silica gel column chromatography to obtain 6.62 g of a compound represented by the following Formula (20) as an intermediate.

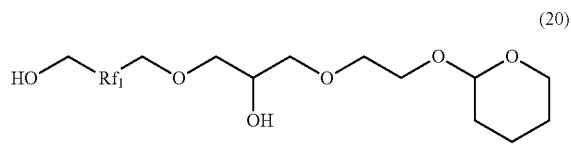

(20)

(in Formula (20), $Rf_1$ is a PFPE chain represented by Formula (4-1), in $Rf_1$, h indicating an average degree of polymerization represents 3.2 and i indicating an average degree of polymerization represents 3.2)

Next, 3.63 g of the compound represented by Formula (20), which is the intermediate obtained above, 4.05 g of the compound represented by Formula (16), which is the intermediate in Example 8, and 10 mL of t-butanol were put into a 100 mL eggplant flask under a nitrogen gas atmosphere, and stirred until the mixture became uniform at room temperature. 0.90 g of potassium tert-butoxide was added to this uniform solution, and the mixture was stirred at 70° C. for 23 hours and reacted.

The reaction solution obtained after the reaction was returned to room temperature. 18 g of a 10% hydrogen chloride/methanol solution (hydrogen chloride-methanol reagent (5-10%) commercially available from Tokyo Chemical Industry Co., Ltd.) was added, and the mixture was stirred at room temperature for 2 hours. The reaction solution was transferred into a separatory funnel containing 100 mL of water, and extracted three times with 100 mL of ethyl acetate. The organic layer thereof was washed with water and dehydrated with anhydrous sodium sulfate. After the drying agent was removed by filtration, the filtrate was concentrated, and the residue was purified through silica gel column chromatography to obtain 4.03 g of a compound (K) (in Formula (K), $Rf_1$ is a PFPE chain represented by Formula (4-1), and in two $Rf_1$'s, h indicating an average degree of polymerization represents 3.2 and i indicating an average degree of polymerization represents 3.2).

$^1$H-NMR and $^{19}$F-NMR measurement of the obtained compound (K) were performed, and the structure was identified from the following results.

$^1$H-NMR (acetone-$D_6$): δ [ppm]=1.90-2.05 (2H), 3.40-4.00 (25H), 4.10-4.20 (8H), 6.30-6.70 (2H)

$^{19}$F-NMR (acetone-$D_6$): δ [ppm]=−55.5 to −51.5 (13F), −78.5 (4F), −80.5 (4F), −91.0 to −88.5 (26F)

Example 12

A compound represented by Formula (L) was obtained by the following method.

5.40 g of the compound (L) (in Formula (L), $Rf_1$ is a PEPE chain represented by Formula (4-1), and in two $Rf_1$'s, h indicating an average degree of polymerization represents 3.2 and i indicating an average degree of polymerization represents 3.2) was obtained in the same operation as in Example 8 except that the compound represented by Formula (21) was used instead of the compound represented by Formula (17).

Here, the compound represented by Formula (21) was synthesized according to Patent Document 5.

(21)

HO—⟨Rf₁⟩—O—CH₂CH(OH)CH₂—O—CH₂CH(OH)CH₂—O—CH₂CH=CH₂

(in Formula (21), $Rf_1$ is a PFPE chain represented by Formula (4-1), in $Rf_1$, h indicating an average degree of polymerization represents 3.2 and i indicating an average degree of polymerization represents 3.2)

$^1$H-NMR and $^{19}$F-NMR measurement of the obtained compound (L) were performed, and the structure was identified from the following results.

$^1$H-NMR (acetone-$D_6$): δ [ppm]=1.90-2.05 (2H), 2.40-2.60 (2H), 3.40-4.00 (22H), 4.10-4.20 (8H), 5.40-6.10 (3H), 6.30-6.70 (2H)

$^{19}$F-NMR (acetone-$D_6$): δ [ppm]=>55.5 to −51.5 (13F), −78.5 (4F), −80.5 (4F), −91.0 to −88.5 (26F)

Example 13

A compound represented by Formula (M) was obtained by the following method.

5.40 g of the compound (M) (in Formula (M), $Rf_1$ is a PFPE chain represented by Formula (4-1), and in two $Rf_1$'s, h indicating an average degree of polymerization represents 3.2 and i indicating an average degree of polymerization represents 3.2) was obtained in the same operation as in Example 8 except that the compound represented by Formula (22) was used instead of the compound represented by Formula (17) in Example 8.

Here, the compound represented by Formula (22) was synthesized according to Patent Document 5.

(22)

HO—⟨Rf₁⟩—O—CH₂CH(OH)CH₂—O—C₆H₅

(in Formula (22), $Rf_1$ is a PFPE chain represented by Formula (4-1), in $Rf_1$, h indicating an average degree of polymerization represents 3.2 and i indicating an average degree of polymerization represents 3.2)

¹H-NMR and ¹⁹F-NMR measurement of the obtained compound (M) were performed, and the structure was identified from the following results.

¹H-NMR (acetone-$D_6$): δ [ppm]=1.90-2.05 (2H), 3.40-4.00 (22H), 4.10-50 (9H)

¹⁹F-NMR (acetone-$D_6$): δ [ppm]=−55.5 to −51.5 (13F), −78.5 (4F), −80.5 (4F), −91.0 to −88.5 (26F)

Example 14

A compound represented by Formula (N) was obtained by the following method.

6.17 g of the compound (N) (in Formula (N), $Rf_2$ is a PFPE chain represented by Formula (4-2), and in two $Rf_2$'s, j indicating an average degree of polymerization represents 2.6) was obtained in the same operation as in Example 1 except that the compound (a number-average molecular weight of 700 and a molecular weight distribution of 1.1) represented by $HOCH_2CF_2CF_2(OCF_2CF_2CF_2)_jOCF_2CF_2CH_2OH$ (in the formula, j indicating an average degree of polymerization is 2.6) was used instead of the compound represented by $HOCH_2CF_2O(CF_2CF_2O)_h(CF_2O)_iCF_2CH_2OH$ in Example 1.

¹H-NMR and ¹⁹F-NMR measurement of the obtained compound (N) were performed, and the structure was identified from the following results.

¹H-NMR (acetone-$D_6$): δ [ppm]=1.90-2.05 (4H), 3.40-4.00 (22H), 4.10-4.20 (8H), 6.30-6.70 (4H)

¹⁹F-NMR (acetone-$D_6$): δ [ppm]=−84.0 to −83.0 (36F), −86.4 (8F), −124.3 (8F), −130.0 to −129.0 (18F)

Example 15

A compound represented by Formula (O) was obtained by the following method.

6.02 g of the compound (O) (in Formula (O), $Rf_3$ is a PFPE chain represented by Formula (4-3), and in two $Rf_3$'s, k indicating an average degree of polymerization represents 1.6) was obtained in the same operation as in Example 1 except that the compound (a number-average molecular weight of 700 and a molecular weight distribution of 1.1) represented by $HOCH_2CF_2CF_2CF_2(OCF_2CF_2CF_2CF_2)_kOCF_2CF_2CF_2CH_2OH$ (in the formula, k indicating an average degree of polymerization is 1.6) was used instead of the compound represented by $HOCH_2CF_2O(CF_2CF_2O)_h(CF_2O)_iCF_2CH_2OH$ in Example 1.

¹H-NMR and ¹⁹F-NMR measurement of the obtained compound (O) were performed, and the structure was identified from the following results.

¹H-NMR (acetone-$D_6$): δ [ppm]=1.90-2.05 (4H), 3.40-4.00 (22H), 4.10-4.20 (8H), 6.30-6.70 (4H)

¹⁹F-NMR (acetone-$D_6$): δ [ppm]=−84.0 to −83.0 (34F), −122.5 (8F), −126.0 (13F), −129.0 to −128.0 (8F)

Example 16

A compound represented by Formula (P) was obtained by the following method.

A compound (a number-average molecular weight of 700 and a molecular weight distribution of 1.1) represented by $HOCH_2CF_2O(CF_2CF_2O)_h(CF_2O)_iCF_2CH_2OH$ (in the formula, h indicating an average degree of polymerization is 3.2 and i indicating an average degree of polymerization is 3.2) and epibromohydrin were reacted to obtain an intermediate represented by Formula (23).

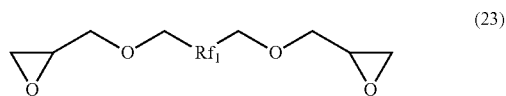

(in Formula (23), $Rf_1$ is a PFPE chain represented by Formula (4-1), in $Rf_1$ h indicating an average degree of polymerization represents 3.2 and i indicating an average degree of polymerization represents 3.2)

Subsequently, 4.75 g of the compound (P) (in Formula (P), $Rf_1$ is a PFPE chain represented by Formula (4-1), and in three $Rf_1$'s, b indicating an average degree of polymerization represents 3.2 and i indicating an average degree of polymerization represents 3.2) was obtained in the same operation as in Example 1 except that, in the reaction between the compound represented by Formula (15) and epibromohydrin in Example 1, a compound represented by Formula (23) was used instead of epibromohydrin.

¹H-NMR and ¹⁹F-NMR measurement of the obtained compound (P) were performed, and the structure was identified from the following results.

¹H-NMR (acetone-$D_6$): δ [ppm]=1.90-2.05 (4H), 3.40-4.00 (28H), 4.10-4.20 (12H), 6.30-6.70 (4H)

¹⁹F-NMR (acetone-$D_6$): δ [ppm]=−55.5 to −51.5 (13F), −78.5 (4F), −80.5 (4F), −91.0 to −88.5 (26F)

Example 17

A compound represented by Formula (Q) was obtained by the following method.

4.81 g of the compound (Q) (in Formula (Q), $Rf_1$ is a PFPE chain represented by Formula (4-1), and in three $Rf_1$'s, h indicating an average degree of polymerization represents 3.2 and i indicating an average degree of polymerization represents 3.2) was obtained in the same operation as in Example 16 except that the compound represented by Formula (7-2a) was used instead of the compound represented by Formula (7-1a) in the step of synthesizing the compound represented by Formula (15).

¹H-NMR and ¹⁹F-NMR measurement of the obtained compound (Q) were performed, and the structure was identified from the following results.

¹H-NMR (acetone-$D_6$): δ [ppm]=1.90-2.05 (6H), 3.40-4.00 (32H), 4.10-4.20 (8H), 6.30-6.50 (2H)

¹⁹F-NMR (acetone-$D_6$): δ [ppm]=−55.5 to −51.5 (13F), −78.5 (4F), −80.5 (4F), −91.0 to −88.5 (26F)

Example 18

A compound represented by Formula (R) was obtained by the following method.

4.89 g of the compound (R) (in Formula (R), $Rf_1$ is a PFPE chain represented by Formula (4-1), and in three $Rf_1$'s, h indicating an average degree of polymerization represents 3.2 and i indicating an average degree of polymerization represents 3.2) was obtained in the same operation as in Example 16 except that the compound represented by Formula (7-2b) was used instead of the compound represented by Formula (7-1a) in the step of synthesizing the compound represented by Formula (15).

¹H-NMR and ¹⁹F-NMR measurement of the obtained compound (R) were performed, and the structure was identified from the following results.

¹H-NMR (acetone-$D_6$): δ [ppm]=1.20-1.80 (8H), 3.40-4.00 (32H), 4.10-4.20 (8H), 6.30-6.50 (2H)

$^{19}$F-NMR (acetone-D$_6$): δ [ppm]=−55.5 to −51.5 (13F), −78.5 (4F), −80.5 (4F), −91.0 to −88.5 (26F)

Example 19

A compound represented by Formula(S) was obtained by the following method.

4.99 g of the compound(S) (in Formula (S), Rf$_1$ is a PFPE chain represented by Formula (4-1), and in three Rf$_1$'s, h indicating an average degree of polymerization represents 3.2 and i indicating an average degree of polymerization represents 3.2) was obtained in the same operation as in Example 16 except that the compound represented by Formula (7-3) was used instead of the compound represented by Formula (7-1a) in the step of synthesizing the compound represented by Formula (15).

$^1$H-NMR and $^{19}$F-NMR measurement of the obtained compound(S) were performed, and the structure was identified from the following results.

$^1$H-NMR (acetone-D$_6$): δ [ppm]=3.40-4.00 (24H), 4.10-4.20 (12H), 6.30-6.70 (4H), 7.30-7.8 (8H)

$^{19}$F-NMR (acetone-D$_6$): δ [ppm]=−55.5 to −51.5 (13F), −78.5 (4F), −80.5 (4F), −91.0 to −88.5 (26F)

Example 20

A compound represented by Formula (T) was obtained by the following method.

A compound (a number-average molecular weight of 700 and a molecular weight distribution of 1.1) represented by HOCH$_2$CF$_2$O(CF$_2$CF$_2$O)$_h$(CF$_2$O)$_i$CF$_2$CH$_2$OH (in the formula, h indicating an average degree of polymerization is 3.2 and i indicating an average degree of polymerization is 3.2) and 4-bromo-1-butene were reacted, and then m-chloroperbenzoic acid was reacted to obtain an intermediate represented by Formula (24).

4.32 g of the compound (T) (in Formula (T), Rf$_1$ is a PEPE chain represented by Formula (4-1), and in three Rf$_1$'s, h indicating an average degree of polymerization represents 3.2 and i indicating an average degree of polymerization represents 3.2) was obtained in the same operation as in Example 16 except that the compound represented by Formula (24) was used instead of the compound represented by Formula (23) in Example 16.

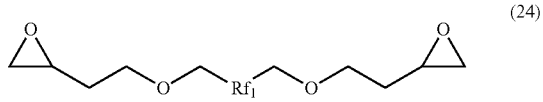

(24)

(in Formula (24), Rf$_1$ is a PEPE chain represented by Formula (4-1), in Rf$_1$, b indicating an average degree of polymerization represents 3.2 and i indicating an average degree of polymerization represents 3.2)

$^1$H-NMR and $^{19}$F-NMR measurement of the obtained compound (T) were performed, and the structure was identified from the following results.

$^1$H-NMR (acetone-D$_6$): δ [ppm]=1.20-1.80 (4H), 1.90-2.05 (4H), 3.40-4.00 (28H), 4.10-4.20 (12H), 6.30-6.70 (4H)

$^{19}$F-NMR (acetone-D$_6$): δ [ppm]=−55.5 to −51.5 (13F), −78.5 (4F), −80.5 (4F), −91.0 to −88.5 (26F)

Example 21

A compound represented by Formula (U) was obtained by the following method.

4.65 g of the compound (U) (in Formula (U), Rf$_1$ is a PFPE chain represented by Formula (4-1), and in three Rf$_1$'s, h indicating an average degree of polymerization represents 3.2 and i indicating an average degree of polymerization represents 3.2) was obtained in the same operation as in Example 16 except that the compound represented by Formula (7-1b) was used instead of the compound represented by Formula (7-1a) in the step of synthesizing the compound represented by Formula (15).

$^1$H-NMR and $^{19}$F-NMR measurement of the obtained compound (U) were performed, and the structure was identified from the following results.

$^1$H-NMR (acetone-D$_6$): δ [ppm]=1.90-2.05 (4H), 3.40-4.00 (40H), 4.10-4.20 (12H), 6.30-6.70 (4H)

$^{19}$F-NMR (acetone-D$_6$): δ [ppm]=−55.5 to −51.5 (13F), −78.5 (4F), −80.5 (4F), −91.0 to −88.5 (26F)

Example 22

A compound represented by Formula (V) was obtained by the following method.

4.41 g of the compound (V) (in Formula (V), Rf$_1$ is a PFPE chain represented by Formula (4-1), and in three Rf$_1$'s, h indicating an average degree of polymerization represents 3.2 and i indicating an average degree of polymerization represents 3.2) was obtained in the same operation as in Example 16 except that the compound represented by Formula (7-1c) was used instead of the compound represented by Formula (7-1a) in the step of synthesizing the compound represented by Formula (15).

$^1$H-NMR and $^{19}$F-NMR measurement of the obtained compound (V) were performed, and the structure was identified from the following results.

$^1$H-NMR (acetone-Da): δ [ppm]=1.20-1.80 (4H), 1.90-2.05 (4H), 3.40-4.00 (28H), 4.10-4.20 (12H), 6.30-6.70 (4H)

$^{19}$F-NMR (acetone-D$_6$): δ [ppm]=−55.5 to −51.5 (13F), −78.5 (4F), −80.5 (4F), −91.0 to −88.5 (26F)

Example 23

A compound represented by Formula (W) was obtained by the following method.

4.11 g of a compound (W) (in Formula (W), Rf$_1$ is a PFPE chain represented by Formula (4-1), and in three Rf$_1$'s, h indicating an average degree of polymerization represents 3.2 and i indicating an average degree of polymerization represents 3.2) was obtained in the same operation as in Example 11 except that, in the step of reacting the compound represented by Formula (20) and the compound represented by Formula (16), an intermediate obtained by reacting the compound represented by Formula (15) and the compound represented by Formula (23) was used instead of the compound represented by Formula (16).

$^1$H-NMR and $^{19}$F-NMR measurement of the obtained compound (W) were performed, and the structure was identified from the following results.

$^1$H-NMR (acetone-D$_6$): δ [ppm]=1.90-2.05 (2H), 3.40-4.00 (31H), 4.10-4.20 (12H), 6.30-6.70 (2H)

$^{19}$F-NMR (acetone-D$_6$): δ [ppm]=−55.5 to −51.5 (13F), −78.5 (4F), −80.5 (4F), −91.0 to −88.5 (26F)

Example 24

A compound represented by Formula (X) was obtained by the following method.

4.31 g of the compound (X) (in Formula (X), Rf$_1$ is a PFPE chain represented by Formula (4-1), and in three Rf₁'s, h indicating an average degree of polymerization represents 3.2 and i indicating an average degree of polymerization represents 3.2) was obtained in the same operation as in Example 23 except that the compound represented by Formula (21) was used instead of the compound represented by Formula (20).

$^1$H-NMR and $^{19}$F-NMR measurement of the obtained compound (X) were performed, and the structure was identified from the following results.

$^1$H-NMR (acetone-$D_6$): δ [ppm]=1.90-2.05 (2H), 2.40-2.60 (2H), 3.40-4.00 (28H), 4.10-4.20 (12H), 5.40-6.10 (3H), 6.30-6.70 (2H)

$^{19}$F-NMR (acetone-$D_6$): δ [ppm]=−55.5 to −51.5 (13F), −78.5 (4F), −80.5 (4F), −91.0 to −88.5 (26F)

Example 25

A compound represented by Formula (Y) was obtained by the following method.

4.89 g of the compound (Y) (in Formula (Y), $Rf_2$ is a PFPE chain represented by Formula (4-2), and in three $Rf_2$'s, j indicating an average degree of polymerization represents 2.6) was obtained in the same operation as in Example 16 except that the compound (a number-average molecular weight of 700 and a molecular weight distribution of 1.1) represented by $HOCH_2CF_2CF_2(OCF_2CF_2CF_2)_jOCF_2CF_2CH_2OH$ (in the formula, j indicating an average degree of polymerization is 2.6) was used instead of $HOCH_2CF_2O(CF_2CF_2O)_h(CF_2O)CF_2CH_2OH$.

$^1$H-NMR and $^{19}$F-NMR measurement of the obtained compound (Y) were performed, and the structure was identified from the following results.

$^1$H-NMR (acetone-$D_6$): δ [ppm]=1.90-2.05 (4H), 3.40-4.00 (28H), 4.10-4.20 (12H), 6.30-6.70 (4H).

$^{19}$F-NMR (acetone-$d_6$): δ [ppm]=−84.0 to −83.0 (26F), −86.4 (8F), −124.3 (8F), −130.0 to −129.0 (13F)

Table 1 and Table 2 show $R^1$ (amide group and organic group), structures of $R^2$, $R^3$, $R^{3'}$, $R^4$, and $R^5$, $R^6$ (amide group and organic group), and the number n when the compounds (A) to (Y) of Examples 1 to 25 obtained in this manner were applied to Formula (1).

TABLE 1

| Compound | $R^1$ Amide group | $R^1$ Organic group | $R^2$ | $R^3$, $R^{3'}$ | $R^4$ | $R^5$ | $R^6$ Amide group | $R^6$ Organic group | n |
|---|---|---|---|---|---|---|---|---|---|
| (A) | (5-1) | —CH₂CH₂— | (2-1) p1 = 1 | (4-1) | (3-1) | (2-3) p2 = 1 | (5-1) | —CH₂CH₂— | 1 |
| (B) | (5-2) | —CH₂CH₂— | (2-1) p1 = 1 | (4-1) | (3-1) | (2-3) p2 = 1 | (5-2) | —CH₂CH₂— | 1 |
| (C) | (5-2) | —(CH₂)₄— | (2-1) p1 = 1 | (4-1) | (3-1) | (2-3) p2 = 1 | (5-2) | —(CH₂)₄— | 1 |
| (D) | (5-2) | —(CH₂)₆— | (2-1) p1 = 1 | (4-1) | (3-1) | (2-3) p2 = 1 | (5-2) | —(CH₂)₆— | 1 |
| (E) | (5-1) | -pC₆H₄— | (2-1) p1 = 1 | (4-1) | (3-1) | (2-3) p2 = 1 | (5-1) | -pC₆H₄— | 1 |
| (F) | (5-2) | -pC₆H₄— | (2-1) p1 = 1 | (4-1) | (3-1) | (2-3) p2 = 1 | (5-2) | -pC₆H₄— | 1 |
| (G) | (5-1) | —CH₂CH₂— | (2-1) p1 = 2 | (4-1) | (3-1) | (2-3) p2 = 2 | (5-1) | —CH₂CH₂— | 1 |
| (H) | (5-1) | —CH₂CH₂— | (2-1) p1 = 1 | (4-1) | (3-1) | (2-3) p2 = 2 | (5-1) | —CH₂CH₂— | 1 |
| (I) | (5-1) | —CH₂CH₂— | (2-1) q1 = 2 | (4-1) | (3-1) | (2-4) q2 = 2 | (5-1) | —CH₂CH₂— | 1 |
| (J) | (5-1) | —CH₂CH₂— | (2-1) p1 = 1 | (4-1) | (3-3) s = 2 | (2-3) p2 = 1 | (5-1) | —CH₂CH₂— | 1 |
| (K) | (5-1) | —CH₂CH₂— | (2-1) p1 = 1 | (4-1) | (3-1) | (2-3) p2 = 1 | — | —CH₂CH₂OH | 1 |
| (L) | (5-1) | —CH₂CH₂— | (2-1) p1 = 1 | (4-1) | (3-1) | (2-3) p2 = 2 | — | allyl group | 1 |
| (M) | (5-1) | —CH₂CH₂— | (2-1) p1 = 1 | (4-1) | (3-1) | (2-3) p2 = 1 | — | phenyl group | 1 |

TABLE 2

| Compound | R¹ Amide group | R¹ Organic group | R² | R³, R³' | R⁴ | R⁵ | R⁶ Amide group | R⁶ Organic group | n |
|---|---|---|---|---|---|---|---|---|---|
| (N) | (5-1) | —CH$_2$CH$_2$— | (2-1) p1 = 1 | (4-2) | (3-1) | (2-3) p2 = 1 | (5-1) | —CH$_2$CH$_2$— | 1 |
| (O) | (5-1) | —CH$_2$CH$_2$— | (2-1) p1 = 1 | (4-3) | (3-1) | (2-3) p2 = 1 | (5-1) | —CH$_2$CH$_2$— | 1 |
| (P) | (5-1) | —CH$_2$CH$_2$— | (2-1) p1 = 1 | (4-1) | (3-1) | (2-3) p2 = 1 | (5-1) | —CH$_2$CH$_2$— | 2 |
| (Q) | (5-2) | —CH$_2$CH$_2$— | (2-1) p1 = 1 | (4-1) | (3-1) | (2-3) p2 = 1 | (5-2) | —CH$_2$CH$_2$— | 2 |
| (R) | (5-2) | —(CH$_2$)$_4$— | (2-1) p1 = 1 | (4-1) | (3-1) | (2-3) p2 = 1 | (5-2) | —(CH$_2$)$_4$— | 2 |
| (S) | (5-1) | -pC$_6$H$_4$— | (2-1) p1 = 1 | (4-1) | (3-1) | (2-3) p2 = 1 | (5-1) | -pC$_6$H$_4$— | 2 |
| (T) | (5-1) | —CH$_2$CH$_2$— | (2-1) p1 = 1 | (4-1) | (3-2) r = 2 (3-3) s = 2 | (2-3) p2 = 1 | (5-1) | —CH$_2$CH$_2$— | 2 |
| (U) | (5-1) | —CH$_2$CH$_2$— | (2-1) p1 = 2 | (4-1) | (3-1) | (2-3) p2 = 2 | (5-1) | —CH$_2$CH$_2$— | 2 |
| (V) | (5-1) | —CH$_2$CH$_2$— | (2-2) q1 = 2 | (4-1) | (3-1) | (2-4) q2 = 2 | (5-1) | —CH$_2$CH$_2$— | 2 |
| (W) | (5-1) | —CH$_2$CH$_2$— | (2-1) p1 = 1 | (4-1) | (3-1) | (2-3) p2 = 1 | — | —CH$_2$CH$_2$OH | 2 |
| (X) | (5-1) | —CH$_2$CH$_2$— | (2-1) p1 = 1 | (4-1) | (3-1) | (2-3) p2 = 2 | — | allyl group | 2 |
| (Y) | (5-1) | —CH$_2$CH$_2$— | (2-1) p1 = 1 | (4-2) | (3-1) | (2-3) p2 = 1 | (5-1) | —CH$_2$CH$_2$— | 2 |

Comparative Example 1

A compound represented by the following Formula (AA) was synthesized by the method described in Patent Document 1.

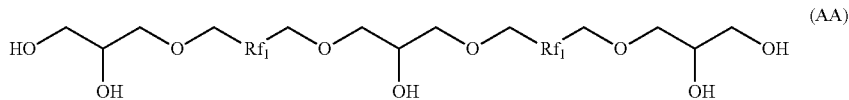

(in Formula (AA), Rf$_1$ is a PFPE chain represented by Formula (4-1), and in two Rf$_1$'s, h indicating an average degree of polymerization is 7.0, and i is 0)

Comparative Example 2

A compound represented by the following Formula (AB) was synthesized by the method described in Patent Document 2.

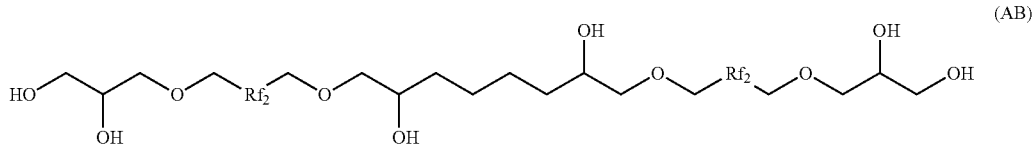

(in Formula (AB), Rf$_2$ is a PFPE chain represented by Formula (4-2), and in two Rf$_2$'s, j indicating an average degree of polymerization is 4.0)

Comparative Example 3

A compound represented by the following Formula (AC) was synthesized by the method described in Patent Document 3.

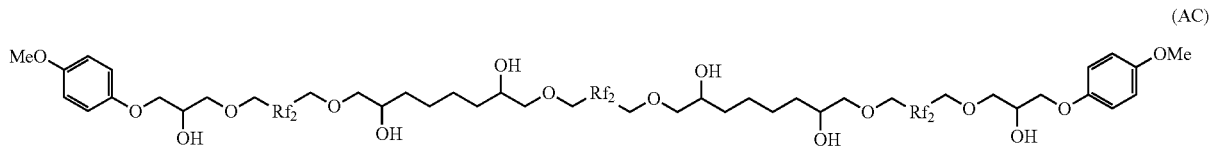

(in Formula (AC), $Rf_2$ is a PEPE chain represented by Formula (4-2), and in three $Rf_2$'s, j indicating an average degree of polymerization is 4.0)

Comparative Example 4

A compound represented by the following Formula (AD) was synthesized by the method described in Patent Document 4.

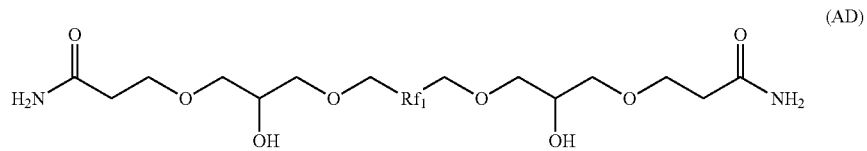

(in Formula (AD), $Rf_1$ is a PFPE chain represented by Formula (4-1), and in $Rf_1$, h and i indicating an average degree of polymerization are both 4.5)

The number-average molecular weight (Mn) of the compounds of Examples 1 to 25 and Comparative Examples 1 to 4 obtained in this manner was measured by the above method. The results are shown in Table 3.

Next, a lubricating layer forming solution was prepared using the compounds obtained in Examples 1 to 25 and Comparative Examples 1 to 4 by the following method. Then, using the obtained lubricating layer forming solution, a lubricating layer of the magnetic recording medium was formed by the following method to obtain magnetic recording media of Examples 1 to 25 and Comparative Examples 1 to 4.

"Lubricating Layer Forming Solution"

The compounds obtained in Examples 1 to 25 and Comparative Examples 1 to 4 were each dissolved in a fluorine-based solvent Vertrel (registered trademark) XF (product name, commercially available from Du Pont-Mitsui Fluorochemicals Co., Ltd.) and diluted with Vertrel XF so that the film thickness when applied onto the protective layer was 9.0 Å to 9.5 Å, and thereby a lubricating layer forming solution was obtained.

"Magnetic Recording Medium"

A magnetic recording medium in which an adhesive layer, a soft magnetic layer, a first underlayer, a second underlayer, a magnetic layer, and a protective layer were sequentially provided on a substrate with a diameter of 65 mm was prepared. The protective layer was made of carbon.

The lubricating layer forming solutions of Examples 1 to 25 and Comparative Examples 1 to 4 were applied onto the protective layer of the magnetic recording medium in which respective layers up to the protective layer were formed by a dipping method. Here, the dipping method was performed under conditions of an immersion speed of 10 mm/sec, an immersion time of 30 sec, and a lifting speed of 1.2 mm/sec.

Then, the magnetic recording medium to which the lubricating layer forming solution was applied was put into a thermostatic chamber and subjected to a thermal treatment for removing the solvent in the lubricating layer forming solution and improving the adhesion between the protective layer and the lubricating layer at 120° C. for 10 minutes, and thus, a lubricating layer was formed on the protective layer to obtain a magnetic recording medium.

(Film Thickness Measurement)

The film thickness of the lubricating layer of the magnetic recording media of Examples 1 to 25 and Comparative Examples 1 to 4 obtained in this manner was measured using FT-IR (product name: Nicolet iS50, commercially available from Thermo Fisher Scientific). The results are shown in Table 3.

Next, the magnetic recording media of Examples 1 to 25 and Comparative Examples 1 to 4 were subjected to the following wear resistance test, chemical substance resistance test, and corrosion resistance test.

(Wear Resistance Test)

Using a pin-on-disk-type friction and wear tester, an alumina sphere having a diameter of 2 mm as a contact was slid on the lubricating layer of the magnetic recording medium at a load 40 gf and a sliding speed 0.25 m/sec, and the friction coefficient of the surface of the lubricating layer was measured. Then, the sliding time until the friction coefficient of the surface of the lubricating layer sharply increased was measured. The sliding time until the friction coefficient sharply increased was measured four times for the lubricating layer of each magnetic recording medium, and the average value (time) thereof was used as an index of the wear resistance of a lubricant coating.

Table 3 shows the results of the magnetic recording media using the compounds of Examples 1 to 25 and the compounds of Comparative Examples 1 to 4. The wear resistance was evaluated based on the sliding time until the friction coefficient sharply increased as follows.

A (excellent): 650 sec or longer
B (good): 550 sec or longer and shorter than 650 sec
C (acceptable): 450 sec or longer and shorter than 550 sec
D (poor): shorter than 450 sec Here, the time until the friction coefficient sharply increased could be used as an index of the wear resistance of the lubricating layer for the following reasons. This is because wear of the lubricating layer of the magnetic recording medium proceeds when the magnetic recording medium is used, and when the lubricating layer disappears due to wear, the contact and the protective layer come into direct contact with each other, and the friction coefficient sharply increases. The time until the friction coefficient sharply increased is thought to be correlated with the friction test.

(Chemical Substance Resistance Test)

The contamination of the magnetic recording medium due to environmental substances that produced contamination substances under a high temperature environment was examined by the following method. Si ions were used as the environmental substances, and an amount of Si adsorbed was measured as the amount of the contamination substances that contaminated the magnetic recording medium produced from the environmental substances.

Specifically, the magnetic recording medium to be evaluated was held under a high temperature environment with a temperature of 85° C., and a humidity of 0% in the presence of siloxane-based Si rubber for 240 hours. Next, the amount of Si adsorbed present on the surface of the magnetic recording medium was analyzed and measured using secondary ion mass spectrometry (SIMS), and the degree of contamination with Si ions was evaluated as the amount of Si adsorbed. The amount of Si adsorbed was evaluated based on the following evaluation criteria using a numerical value when the result of Comparative Example 1 was set as 1.00. The results are shown in Table 3.

"Evaluation Criteria"

A (excellent): the amount of Si adsorbed was less than 0.70

B (good): the amount of Si adsorbed was 0.70 or more and less than 0.90

C (acceptable): the amount of Si adsorbed was 0.90 or more and less than 1.10

D (poor): the amount of Si adsorbed was 1.10 or more (Corrosion Resistance Test)

The magnetic recording medium was exposed under conditions of a temperature of 85° C., and a relative humidity of 90% for 48 hours. Then, the number of corroded locations on the magnetic recording medium was measured using an optical surface analysis device (Candela 7140 commercially available from KLA-Tencor), and evaluated based on the following evaluation criteria. The results are shown in Table 3.

"Evaluation Criteria"

A (excellent): less than 150

B (good): 150 or more and less than 250

C (acceptable): 250 or more and less than 1,000

D (poor): 1,000 or more

TABLE 3

|  | Compound | Molecular weight | Film thickness (Å) | Wear resistance | Chemical substance resistance | Corrosion resistance |
|---|---|---|---|---|---|---|
| Example 1 | (A) | 2380 | 9.2 | A | B | B |
| Example 2 | (B) | 2412 | 9.1 | A | B | B |
| Example 3 | (C) | 2466 | 9.1 | A | B | B |
| Example 4 | (D) | 2520 | 9.3 | A | B | B |
| Example 5 | (E) | 2461 | 9.4 | B | A | A |
| Example 6 | (F) | 2494 | 9.3 | B | A | A |
| Example 7 | (G) | 2502 | 9.5 | B | B | B |
| Example 8 | (H) | 2429 | 9.4 | B | B | B |
| Example 9 | (I) | 2381 | 9.1 | A | B | A |
| Example 10 | (J) | 2219 | 9.1 | A | B | B |
| Example 11 | (K) | 2318 | 9.5 | B | B | B |
| Example 12 | (L) | 2381 | 9.0 | A | B | B |
| Example 13 | (M) | 2361 | 9.1 | A | B | B |
| Example 14 | (N) | 2369 | 9.3 | A | B | B |
| Example 15 | (O) | 2391 | 9.1 | A | B | B |
| Example 16 | (P) | 3466 | 9.3 | A | B | B |
| Example 17 | (Q) | 3493 | 9.2 | A | B | B |
| Example 18 | (R) | 3555 | 9.4 | A | B | B |
| Example 19 | (S) | 3452 | 9.1 | B | A | A |
| Example 20 | (T) | 3438 | 9.2 | A | B | A |
| Example 21 | (U) | 3515 | 9.3 | B | B | B |
| Example 22 | (V) | 3419 | 9.0 | A | B | A |
| Example 23 | (W) | 3374 | 9.4 | B | B | B |
| Example 24 | (X) | 3457 | 9.2 | A | B | B |
| Example 25 | (Y) | 3462 | 9.3 | A | B | B |
| Comparative Example 1 | (AA) | 1199 | 9.0 | C | C | C |
| Comparative Example 2 | (AB) | 3236 | 9.1 | C | D | D |
| Comparative Example 3 | (AC) | 3660 | 9.3 | C | C | C |
| Comparative Example 4 | (AD) | 1268 | 9.4 | B | C | D |

As shown in Table 3, the magnetic recording media of Examples 1 to 25 were evaluated as A (excellent) or B (good) in all evaluation items. Accordingly, it was confirmed that the lubricating layers of the magnetic recording media of Examples 1 to had favorable wear resistance and chemical substance resistance and a strong effect of inhibiting corrosion of the magnetic recording medium.

Particularly, the lubricating layers of the media of Examples 1 to 4, 9, 10, 14 to 18, 20, 22, and 25 using the pounds (A) to (D), (I), (J), (N) to (R), (T), (V), and (Y) had favorable The compounds used in the above exam the same numbers of hydroxyl groups contained in $R^2$ and $R^5$, had symmetrical structure with $R^4$ at the center when a was 1, and bad a symmetrical structure with the molecule center $R^{3'}$ at the center when a was 2. Therefore, it was thought that better wear resistance was obtained because the compound easily uniformly wet and spread on the protective layer, and the coatability became favorable.

In addition, all of the compounds (A) to (D), (I), (J), (N) to (R), (T), (V), and (Y) had high fluidity because $R^1$ and $R^6$ were represented by Formula (6-1) or Formula (6-2) and they had a linear aliphatic amide. Therefore, in the magnetic recording media of Examples 1 to 4, 9, 10, 14 to 18, 20, 22, and 25, even if a part of the lubricating layer was deformed due to wear and the fluorine-containing ether compound in the lubricating layer moved to another location, it had a strong ability to return to its original position. As a result, it was presumed that particularly excellent wear resistance was obtained.

In addition, the magnetic recording media of Examples 1 to 4, 9, 10, 14 to 18, 20, 22, and 25 had better wear resistance than the magnetic recording media of Examples 7, 8, and 21 using the compounds (G), (H), and (U) in which $R^1$ and $R^5$ were represented by Formula (6-1), and the total number of hydroxyl groups contained in $R^2$ and $R^5$ was 3 or more. This was thought to be due to the fact that the total number of hydroxyl groups contained in $R^2$ and $R^5$ was 2 in the compounds (A) to (D), (I), (J), (N) to (R), (T), (V), and (Y), and therefore, compared to the compound in which the total number was 3 or more, there were fewer hydroxyl groups involved in adsorption between the lubricating layer and the protective layer, the fluidity of the molecule was higher, and thus, the above returning ability was stronger.

In addition, the magnetic recording media of Examples 12, 13, and 24 using the compounds (L), (M), and (X) in which $R^1$ was represented by Formula (6-1) and $R^6$ was an allyl group or a phenyl group had favorable wear resistance. This was thought to be because appropriate adhesion to the protective layer was obtained by the linear aliphatic amide of $R^1$ and the fluidity was imparted to the fluorine-containing ether compound by $R^6$ which has no amide bond.

In addition, the magnetic recording media of Examples 5, 6, and 19 using the compounds (E), (F), and(S) in which $R^1$ and $R^6$ in Formula (1) were represented by either Formula (6-3) or Formula (6-4) had an amount of Si adsorbed of less than 0.70, favorable chemical substance resistance, and favorable corrosion resistance. This was presumed to be due to the following reasons.

In the compounds (E), (F), and(S), since $R^1$ and $R^6$ had a relatively rigid aromatic amide, the movement of the molecule was restricted to some extent. Accordingly, in the fabricating layer using the compounds (E), (F), and(S), for example, compared to the compound in which $R^1$ and $R^6$ had an aliphatic amide, the amide of $R^1$ and $R^6$ and the hydroxyl group of $R^2$ and $R^5$ bad a very low ability to inhibit each other's interaction with the protective layer. Therefore, it was presumed that the amide of $R^1$ and $R^6$ and the hydroxyl group of $R^2$ and $R^5$ were likely to be involved in binding with the active sites on the protective layer.

In addition, $R^1$ and $R^6$ of the compounds (E), (F), and(S) had a planar structure composed of carbon having $sp^2$ hybrid orbital, oxygen, and nitrogen, ranging from an aromatic ring to an amide skeleton. Therefore, it was presumed that the interaction between the aromatic amide of $R^1$ and $R^6$ of the compounds (E), (F), and (S) and the protective layer was stronger than the interaction between the aliphatic amide of $R^1$ and $R^6$ and the protective layer, In addition, the compounds (E), (F), and(S) had the same numbers of hydroxyl groups contained in $R^2$ and $R^5$, had a symmetrical structure with $R^1$ at the center when n was 1, and had a symmetrical structure with the molecule center $R^{3'}$ at the center when n way 2. Therefore, it was thought that the compound easily uniformly wet and spread on the protective layer, and the coatability became favorable.

In this way, in the magnetic recording media of Examples 5, 6, and 19, the number of polar groups that were not involved in binding between the lubricating layer and the active sites on the protective layer was small, and the interaction between the aromatic amide and the protective layer was appropriately strong. Therefore, it was thought that polar groups that were not involved in binding between the lubricating layer and the active sites on the protective layer were prevented from attracting environmental substances that produce contamination substances, and particularly, favorable chemical substance resistance was obtained.

In addition, in the magnetic recording media of Examples 5, 6, and 19, an aromatic ring was introduced into $R^1$ and $R^6$, and thus, the lubricating layer containing the fluorine-containing ether compound had favorable hydrophobicity. Therefore, it was thought that intrusion of water, which causes corrosion of the magnetic recording medium, was effectively prevented, and particularly excellent corrosion resistance was obtained.

In the magnetic recording media of Examples 9 and 22 using the compounds (1) and (V) in which $R^2$ in Formula (1) was Formula (2-2), which was a structure in which one methylene group was added to a glycerin skeleton (—$OCH_2CH(OH)CH_2O$—), and $R^5$ was Formula (2-4), which was a structure in which one methylene group was added to a glycerin skeleton, corrosion resistance was favorable.

In addition, in the magnetic recording medium of Example 20 using the compound (T) in which two $R^4$'s in Formula (1) were Formula (3-2) and Formula (3-3), which were structures in which one methylene group was added to a glycerin skeleton, corrosion resistance was favorable, In the compounds (I), (T), and (V), $R^4$ or $R^2$ and $R^5$ had a structure in which one methylene group was added to a glycerin skeleton. Therefore, the lubricating layer containing the fluorine-containing ether compound had favorable hydrophobicity and effectively prevented intrusion of water, which causes corrosion of the magnetic recording medium. Therefore, it was thought that, in the magnetic recording media of Examples 9, 20, and 22, particularly excellent corrosion resistance was obtained.

On the other hand, in the magnetic recording medium of Comparative Example 1 using the compound (AA) in which a glycerin structure was provided at the center of a chain structure, and a perfluoropolyether chain and an end group having two hydroxyl groups were bonded in that order to both sides thereof, the wear resistance, chemical substance resistance, and corrosion resistance test results were all "C (acceptable)".

In addition, in the magnetic recording medium of Comparative Example 2 using the compound (AB) in which an alkyl chain having two hydroxyl groups and having 8 carbon atoms was arranged at the center of a chain structure, and a perfluoropolyether chain and an end group having two hydroxyl groups were bonded in that order to both sides thereof, the wear resistance test result was "C (acceptable)", and the chemical substance resistance and corrosion resistance test results were "D (poor)".

This was thought to be because, in the magnetic recording media of Comparative Examples 1 and 2, due to a strong interaction between the hydroxyl group and the protective layer in the compound (AA) of the compound (AB), the adhesion between the lubricating layer and the protective layer became too strong, the fluidity of the lubricating layer was impaired, and wear resistance was insufficient.

In addition, in the lubricating layer in the magnetic recording media of Comparative Examples 1 and 2, there were many hydroxyl groups that were not involved in binding to the active sites on the protective layer in the compound (AA) or the compound (AB). Therefore, it was thought that Si and/or water easily mixed between the lubricating layer and the protective layer, and chemical substance resistance and corrosion resistance were insufficient.

In addition, in the magnetic recording medium of Comparative Example 3 using the compound (AC) which had a skeleton composed of three perfluoropolyether chains linked via an alkyl chain having two hydroxyl groups and having 8 carbon atoms, and a divalent linking group having one hydroxyl group and a methoxyphenyl group bonded in that order to both ends thereof, the wear resistance, chemical substance resistance, and corrosion resistance test results were all "C (acceptable)".

In the compound (AC), an alkyl chain having two hydroxyl groups and having 8 carbon atoms was arranged at both ends of a perfluoropolyether chain arranged at the center of the chain structure. Therefore, the lubricating layer in the magnetic recording medium of Comparative Example 3 had high hydrophilicity, and water easily mixed in from the lubricating layer. As a result, it was thought that corrosion resistance was insufficient.

In addition, in the compound (AC), a methoxyphenyl group with a weak adsorption force was arranged at both ends of a molecule. Therefore, in the magnetic recording medium of Comparative Example 3, the adhesion of the lubricating layer was insufficient, voids where Si can enter were created between the protective layer and the lubricating layer, and the protective layer was easily exposed. As a result, it was thought that chemical substance resistance and wear resistance were insufficient.

In addition, in the magnetic recording medium of Comparative Example 4 using the compound (AD) in which an end group having an amide bond was arranged at both ends of a perfluoropolyether chain arranged at the center of the chain structure via a linking group having a hydroxyl group, the chemical substance resistance test result was "C (acceptable)", and the corrosion resistance test result was "D (poor)".

In the compound (AD), a structure containing a polar group was not arranged at the center of the chain structure. Therefore, in the lubricating layer of the magnetic recording medium of Comparative Example 4, only both ends of the molecule of the compound (AD) were brought into contact with the protective layer, and the center of the chain structure was separated from the protective layer. Therefore, it was presumed that Si and/or water easily mixed between the protective layer and the lubricating layer, and the chemical substance resistance and corrosion resistance results were inferior to those of examples.

INDUSTRIAL APPLICABILITY

When the lubricant for a magnetic recording medium containing the fluorine-containing ether compound of the present invention is used, it is possible to form a lubricating layer having excellent adhesion, favorable chemical substance resistance and wear resistance, and a strong effect of inhibiting corrosion of the magnetic recording medium even if it has a thin thickness. The fluorine-containing ether compound can be suitably used as a material for a lubricant for a magnetic recording medium.

REFERENCE SIGNS LIST

10 Magnetic recording medium
11 Substrate
12 Adhesive layer
13 Soft magnetic layer
14 First underlayer
15 Second underlayer
16 Magnetic layer
17 Protective layer
18 Lubricating

The invention claimed is:
1. A fluorine-containing ether compound represented by the following Formula (1):

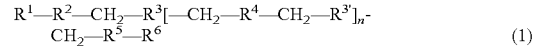

(in Formula (1), n is 1 or 2; $R^3$ and $R^{3'}$ are a perfluoropolyether chain; some or all of $R^3$ and one or two $R^{3'}$'s may be the same, or all of them may be different from each other; $R^4$ is a divalent linking group having one polar group; when n is 2, two $R^4$'s may be the same as or different from each other; $R^2$ and $R^5$ are a divalent linking group having one or more polar groups, and may be the same as or different from each other; $R^2$ has an oxygen atom at an end that is bonded to $R^1$; $R^5$ has an oxygen atom at an end that is bonded to $R^6$; $R^1$ and $R^6$ are an end group bonded to an oxygen atom at an end of $R^2$ or $R^5$, and may be the same as or different from each other; and $R^1$ and $R^6$ are an organic group having 1 to 50 carbon atoms, and at least one of $R^1$ and $R^6$ is a group in which a carbonyl carbon atom or nitrogen atom constituting an amide bond is bonded to a carbon atom of an organic group having 1 to 8 carbon atoms), wherein at least one of $R^1$ and $R^6$ in Formula (1) is a group in which a carbonyl carbon atom or nitrogen atom constituting an amide bond is bonded to a carbon atom of a phenyl group or an alkyl group having 1 to 6 carbon atoms, wherein, when n is 1, at least one of (i) to (iii) is satisfied, (i) at least one of $R^1$ and $R^6$ in Formula (1) is a group in which a carbonyl carbon atom or nitrogen atom constituting an amide bond is bonded to a carbon atom of an alkyl group having 1 to 6 carbon atoms, (ii) $R^4$ is a group in which one polar group is bonded to a carbon atom of an alkylene group having 3 carbon atoms, and (iii) $R^2$ in Formula (1) is a linking group represented by the following Formula (2-1) or (2-2), and $R^5$ in Formula (1) is a linking group represented by the following Formula (2-3) or (2-4):

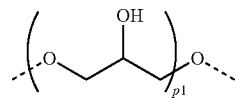

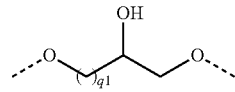

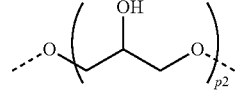

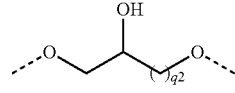

(in Formula (2-1), p1 represents an integer of 2 to 3),
(in Formula (2-2), q1 represents an integer of 2 to 4), (in Formula (2-3), p2 represents an integer of 2 to 3),
(in Formula (2-4), q2 represents an integer of 2 to 4).

2. The fluorine-containing ether compound according to claim 1, wherein n in Formula (1) is 2.

3. The fluorine-containing ether compound according to claim 1,
wherein the polar groups of $R^2$, $R^4$, and $R^5$ in Formula (1) are all hydroxyl groups.

4. The fluorine-containing ether compound according to claim 3,
wherein a total number of hydroxyl groups of $R^2$ and hydroxyl groups of $R^5$ in Formula (1) is 2 to 6.

5. The fluorine-containing ether compound according to claim 1,
wherein $R^1$ and $R^6$ in Formula (1) are a group in which a carbonyl carbon atom or nitrogen atom constituting an amide bond is bonded to a carbon atom of a phenyl group or an alkyl group having 1 to 6 carbon atoms.

6. The fluorine-containing ether compound according to claim 1,
wherein $R^2$ in Formula (1) is a linking group represented by the following Formula (2-1) or (2-2), and
wherein $R^5$ in Formula (1) is a linking group represented by the following Formula (2-3) or (2-4):

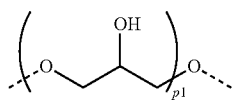 (2-1)

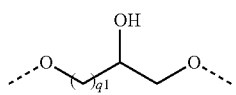 (2-2)

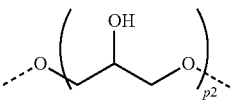 (2-3)

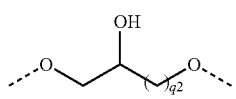 (2-4)

(in Formula (2-1), p1 represents an integer of 1 to 3)
(in Formula (2-2), q1 represents an integer of 2 to 4)
(in Formula (2-3), p2 represents an integer of 1 to 3)
(in Formula (2-4), q2 represents an integer of 2 to 4).

7. The fluorine-containing ether compound according to claim 1,
wherein $R^3$ and one or two $R^{3'}$'s in Formula (1) are all the same, and $R^1$—$R^2$— and $R^6$—$R^5$— are the same.

8. The fluorine-containing ether compound according to claim 1,
wherein $R^4$ in Formula (1) is a linking group represented by any of the following Formulae (3-1) to (3-3):

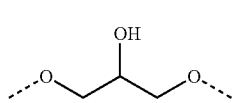 (3-1)

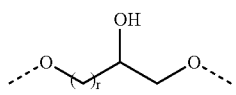 (3-2)

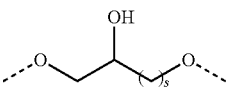 (3-3)

(in Formula (3-2), r is an integer of 2 to 4)
(in Formula (3-3), s is an integer of 2 to 4).

9. The fluorine-containing ether compound according to claim 1,
wherein $R^3$ and one or two $R^{3'}$'s in Formula (1) each independently represent a perfluoropolyether chain represented by the following Formula (4):

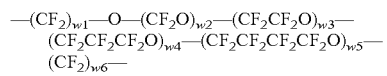 (4)

(in Formula (4), w2, w3, w4, and w5 indicate an average degree of polymerization, and each independently represent 0 to 20, provided that w2, w3, w4, and w5 are not all 0 at the same time; w1 and w6 are an average value indicating the number of $CF_2$'s, and each independently represent 1 to 3; and an arrangement order of repeating units in Formula (4) is not particularly limited).

10. The fluorine-containing ether compound according to claim 1,
wherein $R^3$ and one or two $R^{3'}$'s in Formula (1) are each independently any one selected from among perfluoropolyether chains represented by the following Formulae (4-1) to (4-4):

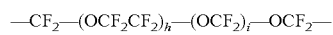 (4-1)

(in Formula (4-1), h and i indicate an average degree of polymerization, h represents 1 to 20, and i represents 0 to 20)

 (4-2)

(in Formula (4-2), j indicates an average degree of polymerization, and represents 1 to 15)

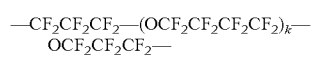 (4-3)

(in Formula (4-3), k indicates an average degree of polymerization, and represents 1 to 10)

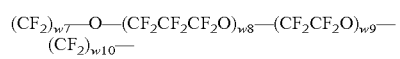 (4-4)

(in Formula (4-4), w8 and w9 indicate an average degree of polymerization, and each independently represent 1 to 20; and w7 and w10 are an average value indicating the number of $CF_2$'s, and each independently represent 1 to 2).

11. The fluorine-containing ether compound according to claim 1,
wherein a number-average molecular weight thereof is in a range of 500 to 10,000.

12. A lubricant for a magnetic recording medium comprising the fluorine-containing ether compound according to claim 1.

13. A magnetic recording medium in which at least a magnetic layer, a protective layer, and a lubricating layer are sequentially provided on a substrate,
wherein the lubricating layer contains the fluorine-containing ether compound according to claim 1.

14. The magnetic recording medium according to claim 13,
wherein the lubricating layer has an average film thickness of 0.5 nm to 2.0 nm.

15. The fluorine-containing ether compound according to claim 1,
wherein at least one of $R^1$ and $R^6$ is selected from a group consisting of Formulae (6-1) to 6-12)

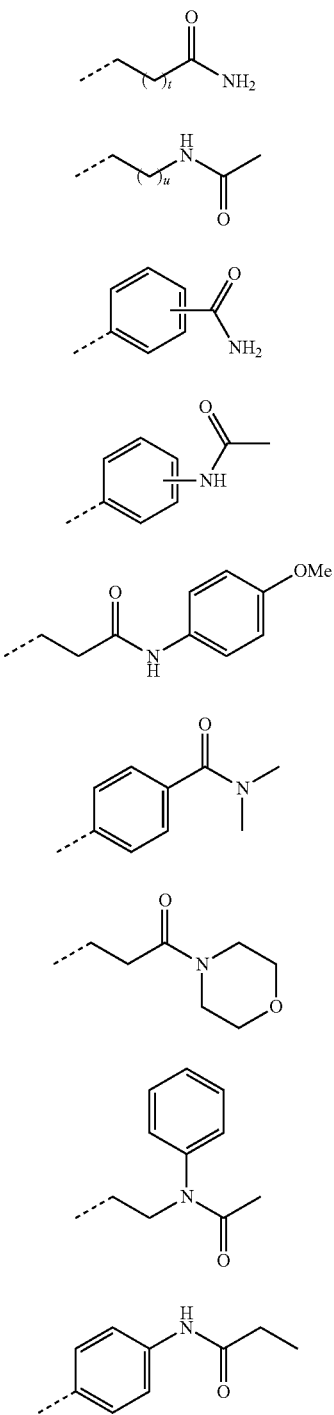

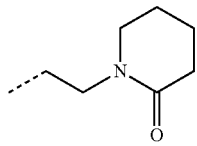

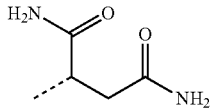

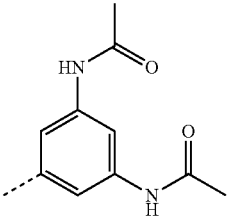

(in Formula (6-1), t represents an integer of 0 to 7)

(in Formula (6-2), u represents an integer of 0 to 7).

16. The fluorine-containing ether compound according to claim 1,
wherein, when n=1, groups shown by general formulae (6-3), (6-4), (6-6), (6-9) and (6-12) are excluded from $R^1$ and $R^6$

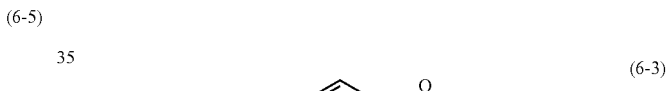

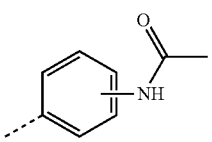

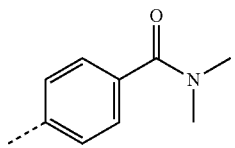

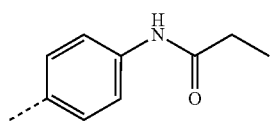

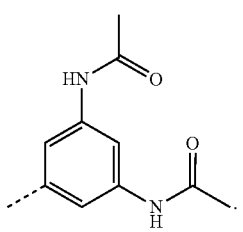

17. The fluorine-containing ether compound according to claim 1,
wherein $R^4$ is a group in which one polar group is bonded to a carbon atom of an alkylene group having 3 to 4 carbon atoms and both ends are oxygen atoms.

\* \* \* \* \*